US008391282B1

(12) United States Patent
Lu et al.

(10) Patent No.: US 8,391,282 B1
(45) Date of Patent: Mar. 5, 2013

(54) SYSTEMS AND METHODS FOR OVERLAID SWITCHING NETWORKS

(76) Inventors: Haw-minn Lu, San Diego, CA (US); Alan Huang, Menlo Park, CA (US)

( * ) Notice: Subject to any disclaimer, the term of this patent is extended or adjusted under 35 U.S.C. 154(b) by 403 days.

(21) Appl. No.: 12/247,198

(22) Filed: Oct. 7, 2008

Related U.S. Application Data

(63) Continuation-in-part of application No. 10/786,874, filed on Feb. 24, 2004, now Pat. No. 7,440,448, which is a continuation-in-part of application No. 09/897,263, filed on Jul. 2, 2001, now Pat. No. 6,901,071, and a continuation-in-part of application (Continued)

(51) Int. Cl.
*H04L 12/50* (2006.01)
(52) U.S. Cl. ......... 370/386; 370/388; 370/248; 370/387
(58) Field of Classification Search ............... None
See application file for complete search history.

(56) References Cited

U.S. PATENT DOCUMENTS

| | | | |
|---|---|---|---|
| 4,967,340 A | 10/1990 | Dawes | |
| 5,552,962 A | 9/1996 | Feustel et al. | |
| 5,648,963 A | 7/1997 | Miyake et al. | |
| 5,825,517 A | 10/1998 | Antoniades et al. | |
| 5,841,775 A * | 11/1998 | Huang | 370/422 |
| 6,049,542 A | 4/2000 | Prasad | |
| 6,052,373 A * | 4/2000 | Lau | 370/399 |
| 6,069,876 A | 5/2000 | Lander et al. | |
| 6,456,838 B1 * | 9/2002 | Wang et al. | 370/380 |
| 6,563,819 B1 * | 5/2003 | Park | 370/388 |
| 6,784,802 B1 | 8/2004 | Stanescu | |
| 6,901,071 B2 * | 5/2005 | Lu | 370/388 |
| 6,937,032 B2 | 8/2005 | Adamian | |
| 7,075,942 B2 * | 7/2006 | Lu | 370/419 |
| 7,123,612 B2 * | 10/2006 | Lu | 370/388 |
| 7,388,875 B1 * | 6/2008 | Lu | 370/419 |
| 7,440,448 B1 * | 10/2008 | Lu et al. | 370/380 |
| 7,519,003 B2 | 4/2009 | Koziy et al. | |
| 7,613,177 B1 * | 11/2009 | Lu | 370/360 |
| 7,912,019 B1 * | 3/2011 | Lu et al. | 370/338 |
| 7,929,522 B1 * | 4/2011 | Lu et al. | 370/388 |
| 2002/0004390 A1 | 1/2002 | Cutaia et al. | |
| 2003/0002437 A1 * | 1/2003 | Lu | 370/228 |
| 2003/0152071 A1 * | 8/2003 | Lu | 370/380 |
| 2003/0163754 A1 * | 8/2003 | Lu | 714/4 |

OTHER PUBLICATIONS

Patel, et al., "Performance of processor-memory interconnections for multiprocessors", IEEE Transactions on Computers, Oct. 1981, pp. 771-780, vol. 30, No. 10, IEEE, US.

Goke, et al., "Banyan Network for partitioning multiprocessor systems," First Annual International Symposium on Computer Architecture, Dec. 1973, pp. 21-28, ACM Press, US.

Kumar, et al., "Augmented shuffle-exchange multistage interconnection networks". Computer, Jun. 1987, pp. 30-40, vol. 20, No. 6, IEEE, US.

(Continued)

*Primary Examiner* — Robert Wilson

(57) ABSTRACT

An overlaid switching network is derived by overlaying perpendicularly one multistage interconnection network with a second multistage interconnection network. The new network is formed by placing a switching element corresponding to the position of switching elements in either multistage interconnection network. Each switching element in the overlaid network has the ports defined by the two multistage interconnection networks as does its interconnection networks. A special case occurs when the number of rows and columns of the first multistage interconnection network is the number of columns and rows of the second multistage interconnection network, respectively. The overlaid switching networks also inherit their upgradeability from the multistage interconnection networks from which they are derived, such as in the case of a redundant blocking compensated cyclic group multistage network.

6 Claims, 72 Drawing Sheets

Related U.S. Application Data

No. 10/074,174, filed on Feb. 10, 2002, now Pat. No. 7,123,612, and a continuation-in-part of application No. 10/075,086, filed on Feb. 10, 2002, now Pat. No. 7,075,942.

(60) Provisional application No. 60/450,133, filed on Feb. 25, 2003.

(56) References Cited

OTHER PUBLICATIONS

Adams, et al., "The Extra Stage Cube: A Fault-Tolerant Interconnection Network for Supersystems," IEEE Transactions on Computers, May 1982, pp. 443-454, vol. 31, No. 5, IEEE, US.

Benes, Permutation Groups, Complexes, and Rearrangeble Connecting Networks, Bell System Telephone Journal, Jul. 1964, pp. 1619-1640, vol. 44, AT&T, US.

Hamid, et al., "A new fast control mechanism for Benes rearrangable interconnection network useful for supersystems,". Transactions of the Institute of Electronics, Information and Communication Engineers, Oct. 1987, p. 997-1008, vol. E70, No. 10, IEICE, Japan.

Dudgeon, et al., "Multidimensional Signal Processing," 1984, pp. 60-111, Prentice Hall, Englewood Cliffs, New Jersey.

Oppenhiem, et al., "Digital Signal Processing," 1975, pp. 284-328, Prentice Hall, Englewood Cliffs, New Jersey.

Cizek, et al. "Tradeoff Between Cost and Reliability in Packet Switching MultiStage Interconnection Networks," AFRICON '92 Proceedings., 3rd AFRICON Conference, Sep. 22-24, 1992, pp. 365-368, IEEE, South Africa (Reprinted US).

Agrawal, "Testing and Fault-Tolerance of Multistage Interconnection Networks," Computer, Apr. 1982, pp. 41-53, vol. 15, No. 4, IEEE, US.

Bhuyan, et al., "Design and Performance of Generalized Interconnection Networks." IEEE Transactions on Computers, Dec. 1983, pp. 1081-1090, vol. 32, No. 12, IEEE, US.

Blake, et al., "Multistage Interconnection Network Reliability," IEEE Transactions on Computers, Nov. 1989, pp. 1600-1603, vol. 38, No. 11, IEEE, US.

Chin, et al., "Packet Switching Networks for Multiprocessors and Data Flow Computers," IEEE Transactions on Computers, Nov. 1984, pp. 991-1003, vol. 33, No. 11, IEEE, US.

Kumar, et al.,"Failure Dependent Performance Analysis of a Fault-Tolerant Multistage Interconnection Network," IEEE Transactions on Computers, Dec. 1989, pp. 1703-1713, vol. 38, No. 12, IEEE, US.

Tzeng, et al.,"Realizing Fault-Tolerant Interconnection Network via Chaining," IEEE Transactions on Computers, Apr. 1988, pp. 458-462, vol. 37. No. 4, IEEE, US.

Varma, et al., "Fault-Tolerant Routing in Multistage Interconnection Networks," IEEE Transactions on Computers, Mar. 1989, pp. 385-393, vol. 38, No. 3, IEEE, US.

Park, et al., "The Cyclic Banyan Network: A Fault Tolerant Multistage Interconnection Network with the Fully-Adaptive Self-routing", 1995, 7th IEEE Symposium on Parallel and Distributed Processing, p. 702-710.

\* cited by examiner

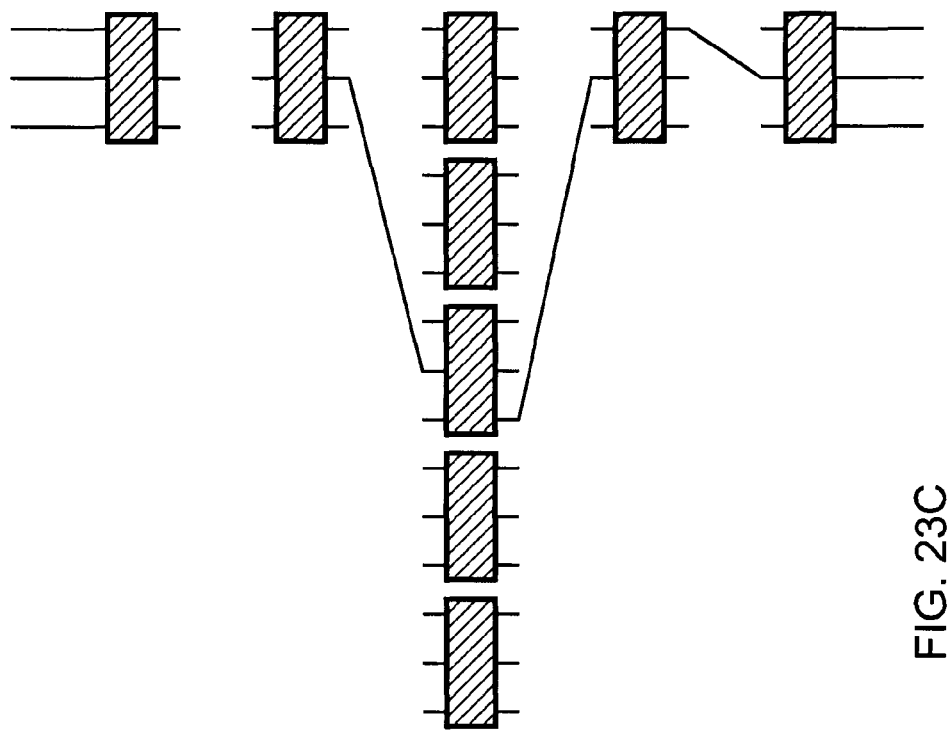
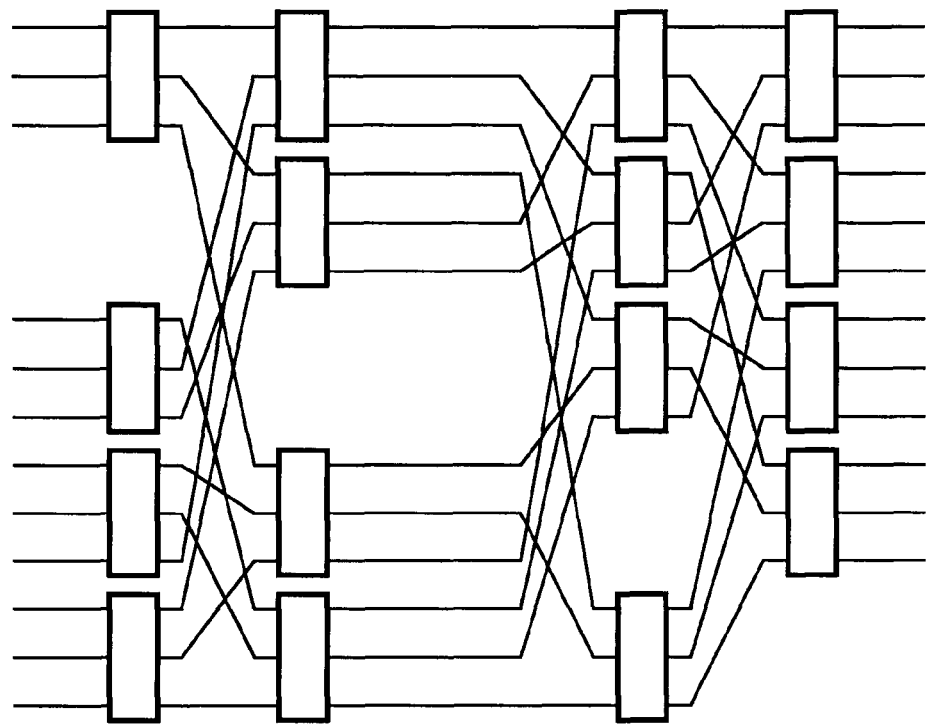
FIG. 23C

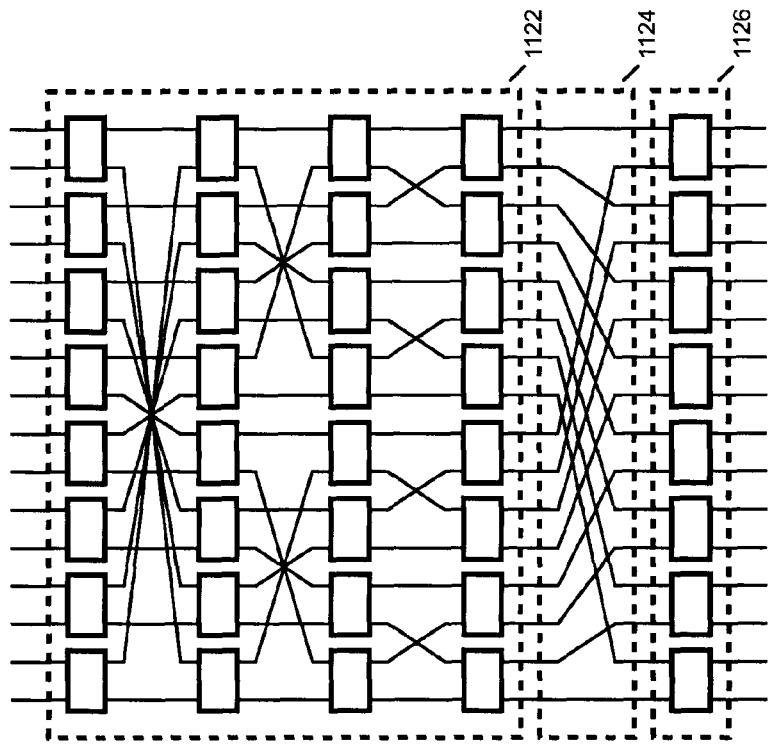
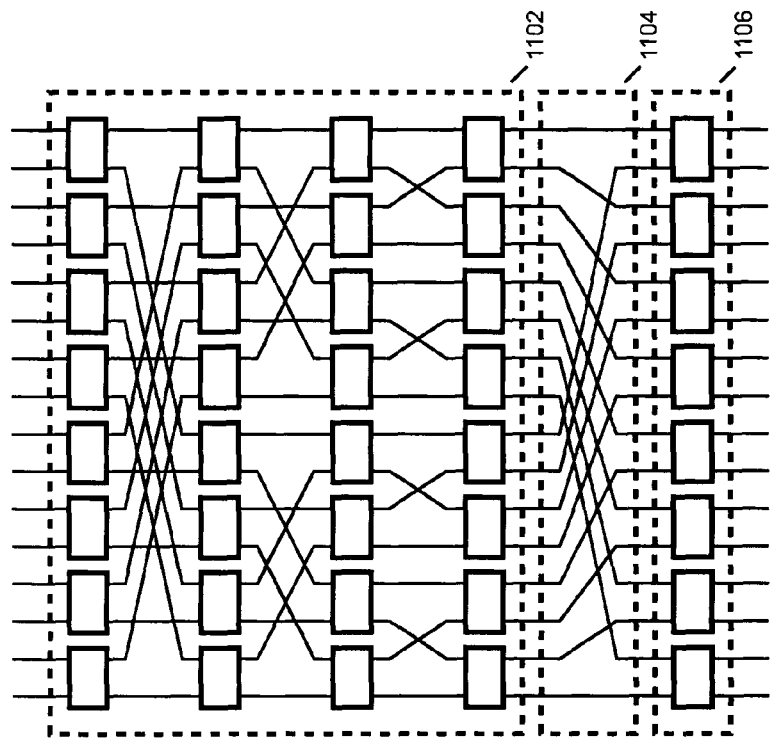

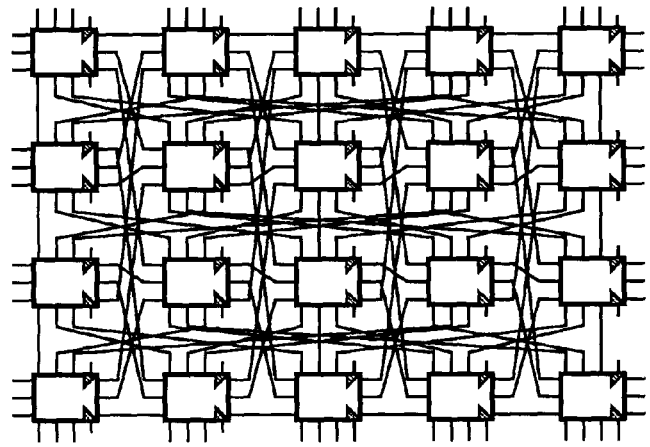
FIG. 37B
FIG. 37C
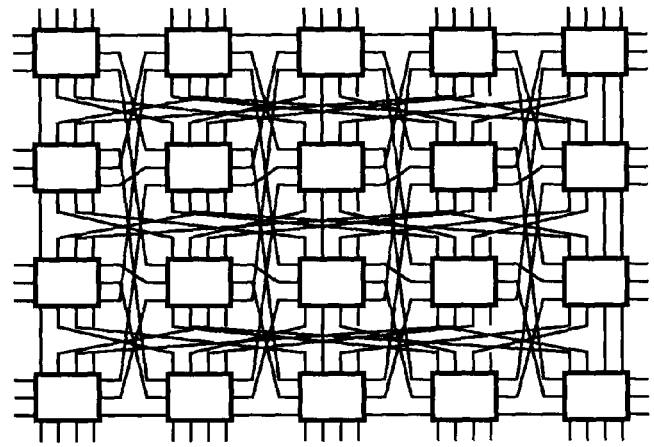
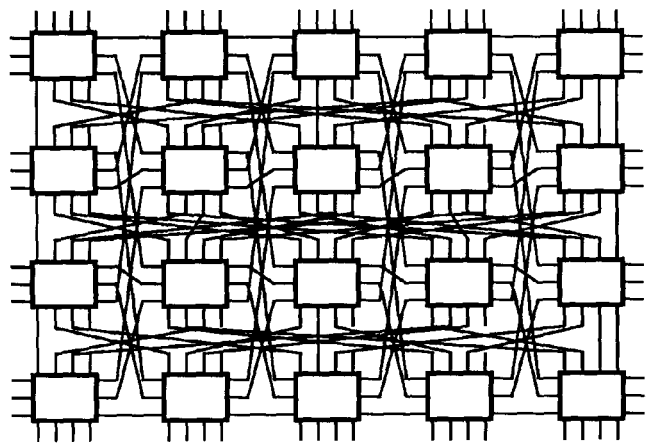
FIG. 37D

```
repeat until done {
    determine next connection to be established;
    if a completely new connection is to be made between two vacant ports {
        indicate both port lights with "connect";
        wait until technician has made the connection;
        verify correct connection is made, otherwise indicate "error" on both ports;
    } else {
        if connection needs to be broken select a port to disconnect {
            indicate the light for desired port to "disconnect";
            wait until technician has disconnected the connector;
            if technician disconnected wrong port indicate "error" at the port disconnected;
        }
        if connection can be made {
            indicate port light to be connected with "connect";
            wait until technician has made the connection;
            verify correct connection is made, otherwise indicate "error" on that port;
        }
    }
}
```

FIG. 42

SYSTEMS AND METHODS FOR OVERLAID SWITCHING NETWORKS

RELATED APPLICATIONS

This application is a continuation-in-part of U.S. patent application Ser. No. 10/786,874, entitled "Systems and Methods for Upgradeable Scalable Switching", filed on Feb. 24, 2004, which is incorporated herein by reference in its entirety as if set forth in full. The parent application claims priority under 35 U.S.C. §119 to U.S. Provisional Patent Application Ser. No. 60/450,133 entitled, "Systems and Methods for Upgradeable Scalable Switching and its Applications," filed on Feb. 25, 2003, which is incorporated herein by reference in its entirety as if set forth in full. This parent application is also a continuation-in-part of U.S. Pat. No. 6,901,071 issued on May 31, 2005, which is incorporated herein by reference in its entirety as if set forth in full. This parent application is also a continuation-in-part of U.S. Pat. No. 7,123,612 issued on Oct. 17, 2006, which is incorporated herein by reference in its entirety as if set forth in full. This parent application is also a continuation-in-part of U.S. Pat. No. 7,075,942, issued Jul. 11, 2006, which is incorporated herein by reference in its entirety as if set forth in full.

BACKGROUND OF THE INVENTION

1. Field of Invention

The field of invention relate generally to communications switching networks and more particularly to systems and methods for upgrading scalable switching networks.

2. Description of Related Art

Switching networks with regular structure have been explored for many years. Conspicuous among them are the so-called fixed radix networks, which typically comprise n stages of $r^n$ switching elements with each switching element having a fanin and fanout of r, where r is the radix. The majority of past research has been focused on radix two networks that is where r=2. Goke and Lipovski in "Banyan Network for Partitioning Multiprocessor Systems," proposed the Banyan network illustrated in FIG. 1B and extended to other radixes such as a radix three network illustrated in FIG. 1C. This network actually finds its origin in the design of fast Fourier Transforms where it is also often termed a butterfly network. Patel in "Performance of Processor-Memory Interconnections for Multiprocessors" proposed the delta network shown in FIG. 1D. The network shown in FIG. 1E is often called a crossover network. Lawrie in "Parallel Processing with a Perfect Shuffle," uses the network shown in FIG. 1F, known as a perfect shuffle, which is often termed in the art as an Omega network. A nameless radix two network can be found in the bit order preserving fast Fourier transform architecture described in Oppenheim and Schaefer's text, *Digital Signal Processing*. This network is shown in FIG. 1G and is referred to as a bit-order persevering (BOP) network for the purpose of this disclosure.

These traditional radix networks offer functional connectivity, but lack redundancy and fault tolerance. Many methods and architectures have been developed to extend fixed radix networks to add redundancy and fault tolerance. Hamid, Shiratori and Noguchi in "A new fast control mechanism for Benes rearrangeable interconnection network useful for supersystems," extend the delta network with a second delta network into an architecture first suggested by Benes in "Permutation Groups, Complexes, and Rearrangeable Connecting Networks," as shown in FIG. 2A. This can be reconfigured to show two Banyan networks coupled together as shown in FIG. 2B.

Further, Adams and Siegel in "The Extra Stage Cube: A Fault-Tolerant Interconnection Network for Supersystems," teach the extra stage cube which resembles a Banyan network in FIG. 2C with an extra stage. Through the use of multiplexers 16 and demultiplexers 14, stage 10 and stage 12 can individually be enabled or bypassed giving fault tolerance to the entire network.

Kumar and Reddy in "Augmented shuffle-exchange multistage interconnection networks", add fault tolerance and path redundancy to a Banyan network offering additional lateral paths for signals to travel which is depicted in FIG. 2D, This augmented shuffle-exchange network (ASEN) increases fault tolerance and path redundancy at the expense of increased path blocking.

Another technique for augmenting fixed radix network designs is by overlaying a second network onto a preexisting design. By this method, the fault tolerance of a network can be increased. The simplest technique is dilation, which is simply the overlaying of the same network on itself. FIG. 3A shows a Banyan network like that depicted in FIG. 1B overlaid on top of a second identical Banyan network. In the traditional design, the external ports are not augmented in the process. However, some designs do incorporate it as shown in FIG. 3B. In either case, the resultant network does increase the ability to tolerate a failure in an internal connection, but fails to compensate for any potential failure in a switching element.

This dilation technique is further refined by overlaying an upside-down version of the same network on top of itself. FIG. 4A depicts a Banyan network like that of FIG. 1B except upside-down. Often in this technique, the connections depicted by the dotted lines are often considered overly redundant and are omitted. The result is the network shown in FIG. 4B. Once again the external ports are usually not augmented, but can be. This new network does compensate for failures in switching elements.

A final extension of multistage interconnection design is the seldom used multidimensional version of the multistage interconnection network. Though not well known in switching applications, multidimensional interconnections are frequently used in signal processing. Specifically, in the design of fast Fourier transforms (FFT) multistage interconnection networks are used. Since fixed radix networks, in particular the butterfly/Banyan, are the essential building blocks of the FFT. Multidimensional extensions of the butterfly are the essential building blocks of multidimensional FFT. This is discussed in great detail in any standard multidimensional signal processing text such as Dudgeon and Mersereau's Multidimensional Signal Processing.

SUMMARY OF INVENTION

In this disclosure, a switching network and systems comprising such a network are set forth. Basic building blocks can be constructed through modification of known networks such as the Banyan, Crossover, Delta and other networks. Additionally, these modified networks can inherit beneficial network properties in their topology by utilizing additional switching stages and for utilizing the interstage interconnection (ISIC) networks described as a single stage interconnection network in Huang in U.S. Pat. No. 5,841,775. In particular, many of these networks have the desirable scalability, fault-tolerance and upgradeability properties.

The redundant blocking compensated cyclic group (RB-CCG) networks and hybrids form the basic building blocks of more elaborate switching networks. One such class of networks are those formed from the Cartesian product of two switching networks. The Cartesian product of two switching networks can reduce the distance of the average connection between stages as compared to a similarly equipped "flat" switching network.

Another class of networks that can be formed from the basic building block networks is the overlaid network where two or more network topologies are overlaid to form an elaborate multidirectional network. In such an overlaid network the average latency between two external ports can be reduced.

Furthermore, routing of the RBCCG network in particular can be implemented using routing protocols and table look ups, but for some applications such as in very high performance small footprint applications, a formulaic routing method is required. Each element in an RBCCG network can route a packet based on the packet destination and the location of the switching element.

The switching networks with sufficient fault tolerance can be upgraded and/or reconfigured in a manner as to maintain full connectivity throughout the upgrade or reconfiguration process. Furthermore, the upgrading of the hybrid, Cartesian product and overlaid networks are described.

The methods of implementing a scalable switching network with upgrade capabilities are given with embodiments where software is used to assist a technician in upgrading a scalable switching network. In another embodiment, software coupled to indicator lights guide a technician in upgrading a scalable switching network. In another embodiment, a robotic instrument performs an upgrade using a patch panel. In another embodiment, switching elements are equipped with latched switches which enable a network to be laid out prior to an upgrade. In another embodiment, prefabricated interconnection can be inserted into a special interconnection box.

Although the present invention has been described below in terms of specific embodiments, it is anticipated that alteration and modifications thereof will no doubt become apparent to those skilled in the art. It is therefore intended that the following be interpreted as covering all such alterations and modifications as falling within the true spirit and scope of the invention.

BRIEF DESCRIPTION OF THE DRAWINGS

For a more complete understanding of the present invention, the objects and advantages thereof, reference is now made to the following descriptions taken in connection with the accompanying drawings in which:

FIG. 23C depicts the result of the downgrade process;

FIG. 29A shows a 32-port Banyan network augmented with an extra CGISIC network stage at the bottom of the network;

FIG. 29B shows a 32-port crossover network augmented with an extra CGISIC network stage at the bottom of the network;

FIG. 37A, FIG. 37B, FIG. 37C, FIG. 37D, FIG. 37E, and FIG. 37F show a fan-out upgrade of an overlaid double RBCCG network;

FIG. 42 is a pseudocode description of a method to guide a technician through a manual upgrade process using indicators;

DETAILED DESCRIPTION

Switching elements are any type of device configured to relay traffic through different paths depending on the destination address of the traffic. Depending on the context, the switching elements as well as the systems and methods recited within this disclosure, operate with both circuit switched networks, packet switched networks, and networks comprising circuit switched elements and packet switched elements. The switching elements include but aren't limited to routers and switches, such as an Asynchronous Transfer Mode (ATM) switch or Ethernet switch. A switching element comprises ports which are an interface by which traffic is allowed to flow.

Some switching elements can further have the capability of expanding in the number of ports. In some embodiments, the switching elements can have the number of ports expanded without requiring the switching element to be powered off and in fact, the switching elements can even relay traffic during the expansion process, known as a hot upgrade.

For example, a router often comprises a central networking processor and a plurality of line cards. The router is designed to allow line cards to be added and removed while the router is in operation. Line cards comprise at least one port. Therefore, the number of ports on this type of router can be changed while the router is in operation.

Figure 5A:
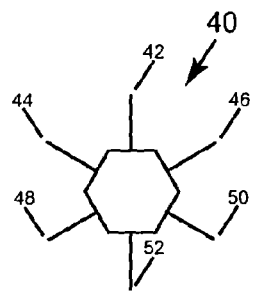
FIG. 5A and FIG. 5B show how arbitrary ports on a switching element can be logically labeled as top and bottom ports.
Figure 5B:
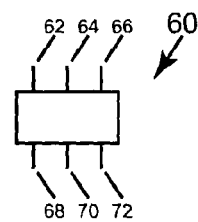
Figure 5C:
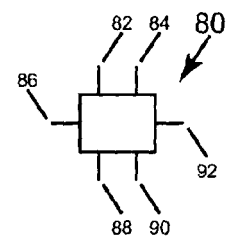
FIG. 5C shows further how arbitrary ports on a switching element can be logically labeled as top, bottom, left an right ports.

In discussing switching elements a distinction is drawn between a physical layout and a logical layout. In FIG. 5A, a switching element is depicted as having six ports 42, 44, 46, 48, 50 and 52. These ports can physically be accessed anywhere on the switching element; for example, it is common for switches to have all their ports located in the rear. Regardless of the physical layout, ports on a switching element can be logically located. For example, ports can be logically defined as a top port or a bottom port. In another logical embodiment, the same switching element can have ports logically defined as a top port, bottom port, left port or right port. For example, switching element 40 can logically be defined to look like switching element 60 in FIG. 5B, by logically mapping ports 42, 44, and 46 to top ports 62, 64, and 66, respectively and ports 48, 50 and 52 to bottom ports 68, 70 and 72. In another logical embodiment, switching element 40 can logically be defined to look like switching element 80 in FIG. 5C, by logically mapping port 42 to top port 82, port 44 to top port 84, port 46 to left port 86, port 48 to bottom port 88, port 50 to bottom port 90, and port 52 to bottom port 92.

Figure 5D:
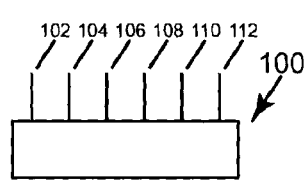
FIG. 5D and FIG. 5E show how one-dimensional ports on a switching element can be logically labeled as two-dimensional ports.
Figure 5E:
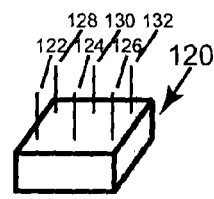

The mapping of physical to logical ports can be used to give multidimensional characteristics to a switching element. FIG. 5D shows a switching element 100 having ports 102, 104, 106, 108, 110, and 112, representing top ports 0, 1, 2, 3, 4, and 5. By mapping top ports 0, 1, 2, 3, 4, and 5 to top ports (0,0), (0,1), (0,2), (1,0), (1,1) and (1,2) as indicated in FIG. 5E by ports 122, 124, 126, 128, 130 and 132, respectively, the resultant logical switching element 120 exhibits two-dimensional characteristics. By extension, two dimensional local mapping can apply to defining bottom ports, left ports, right ports, front ports, and back ports. Clearly, logical mapping can result in higher dimensional characteristics of a switching element.

Figure 6A:
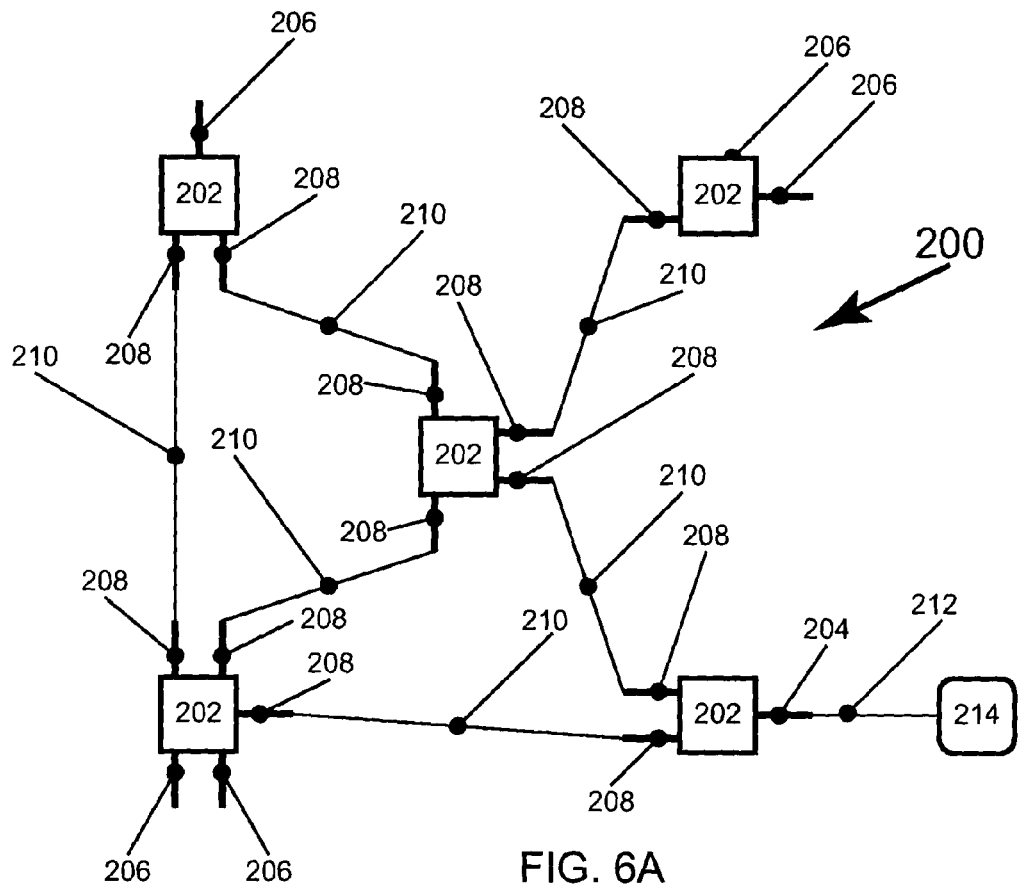
FIG. 6A defines basic terminology used relating to switching networks.

In describing a switching network, several terms are used in this disclosure. In addressing any switching network, an external port to a switching network is a port of a switching element which is intended to be connected to a device not part of the switching network. Likewise, an internal port to a switching network is a port of a switching element which is intended to be connected to another switching element within. Similarly, an external connection is a connection between a switching element of the switching network and a potential external device and an internal connection is a connection between two or more switching elements within the switching network. For example, in FIG. 6A, switching network 200 comprises a plurality of switching elements 202, where some of the switching elements 202 have external ports 206 and 204 and internal ports 208. Conversely, some of the switching elements 202 only have internal ports. In this example, there are a plurality of internal connections 210 and an external connection 212. An external port 204 need not be connected to an external device 214 as long as the port is intended to be connected to an external device. Furthermore, if the switching network is reconfigured, expanded or modified, an external port can be made converted to an internal port by simply connecting it to another switching element within the switching network. Likewise, an internal port can be made available to an external device thereby redefining the role to an external port. The distinction between internal and external is not intended to be a constraining property of the port, but merely as a logical allocation.

A switching network is termed functionally connected if for every pair of external ports, there is a path connecting them. For example, in FIG. 6B, switching network 220 is functionally connected. Every pair of external ports can be connected through switching network 220. For example, external ports 222 and 224 can be connected through path 226.

Figure 6C:
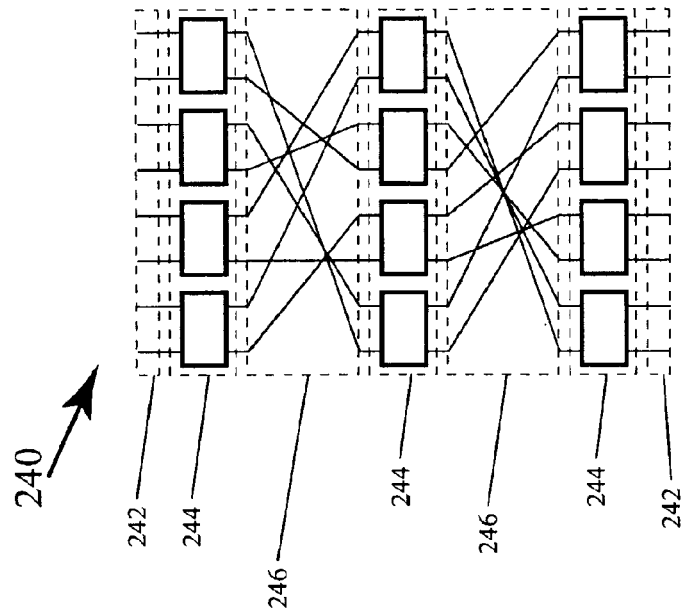
FIG. 6C defines various parts of a multistage switching network.
Figure 6B:
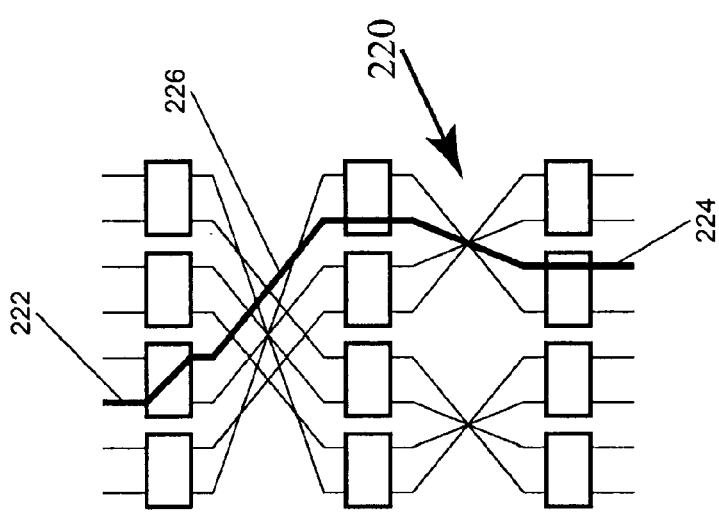
FIG. 6B defines the concept of functionally connected.

In FIG. 6C, the specific case of a multistage switching network 240, the network typically comprises a layer of external ports 242, two or more stages of switching elements 244, and an inter-stage interconnection (ISIC) network 246 connecting two adjacent stages comprising all connections between the two adjacent stages. In such referring to such a network, the number of stages is referred to as the height, H. In a one-dimensional stage, the width is referred to as the width, W.

Figure 7A:
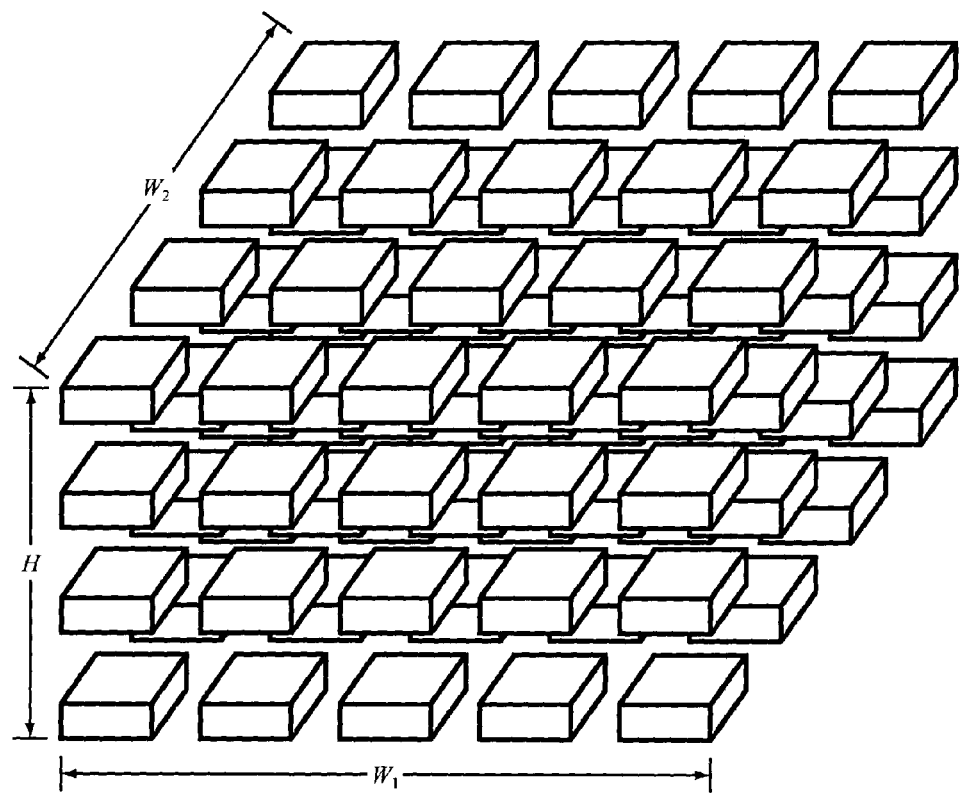
FIG. 7A shows a three dimensional layout of switching elements with height of H and widths of $W_1$ and $W_2$.
Figure 7B:
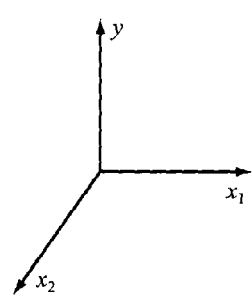
FIG. 7B shows the coordinate axis labeling for the given two-dimensional multistage interconnection network.

In higher dimensional stages, a width is ascribed to each coordinate axis. For example, FIG. 7A shows a multistage switching network with two-dimensional stages. It has H stages and is referred to as having a height of H. For ease of notation, the direction perpendicular to the stages (i.e. the direction traversed in order to count the number of stages) is referred to as the y axis, and each direction the stages occupy are referred to as the $x_i$ direction. In the example of FIG. 7A, each stage has widths of $W_1$ in the $x_1$ direction and $W_2$ in the $x_2$ direction as further depicted in FIG. 7B.

Figure 7C:
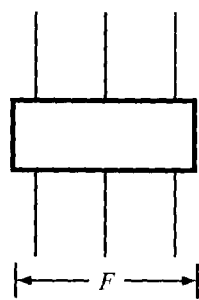
FIG. 7C shows the definition of the fanout variable F.
Figure 7D:
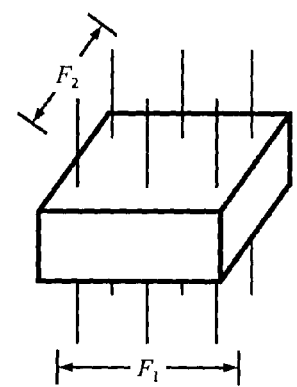
FIG. 7D shows the definition of the fanout variables $F_1$ and $F_2$ for the given two-dimensional multistage interconnection network.

The port width of a switching element is referred to in this disclosure as the fanout. This definition coincides historically with the definition of fanout in multistage interconnection networks. However, in practice, switching elements can include bidirectional ports; that is, traffic is allowed to flow in and out of each port, so this definition of fanout can differ from some meanings in the art. FIG. 7C depicts a switching element with a fanout of F; it has F top ports and F bottom ports. Similarly, if a stage of a multistage switching network is multidimensional, it can have various fanouts. For example, FIG. 7D shows a two-dimensional switching element with fanouts of $F_1$ in the $x_1$ direction and $F_2$ in the $x_2$ direction.

Figure 8A:
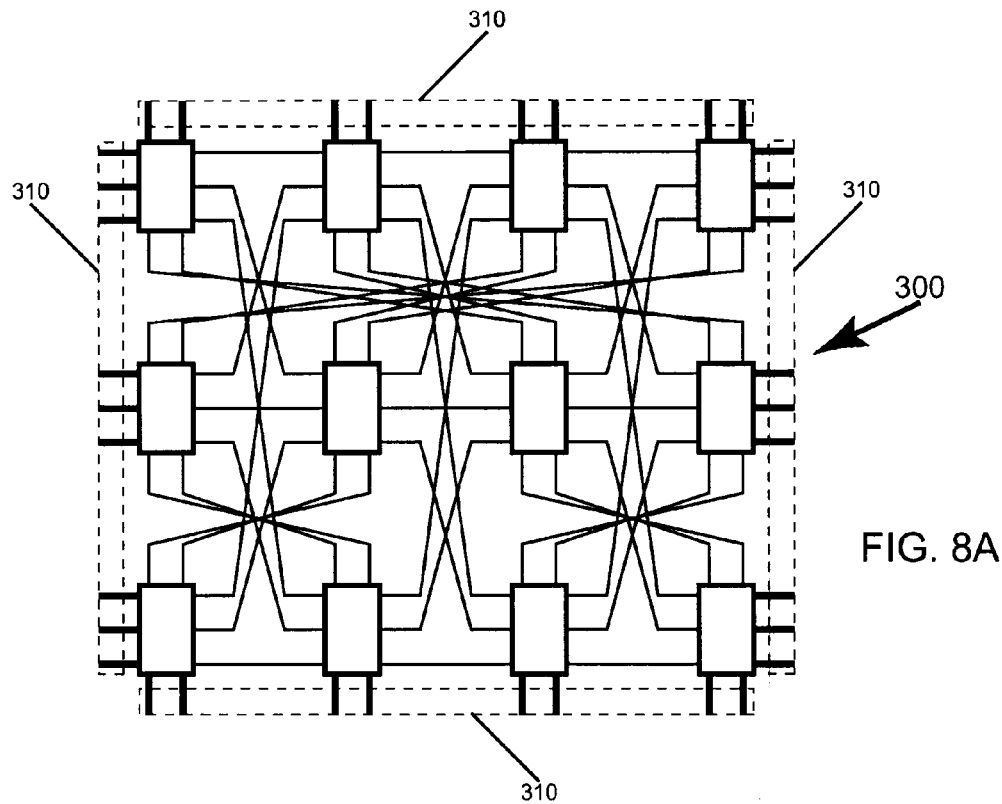
FIG. 8A, FIG. 8B and FIG. 8C defines various parts of an overlaid switching network.
Figure 8B:
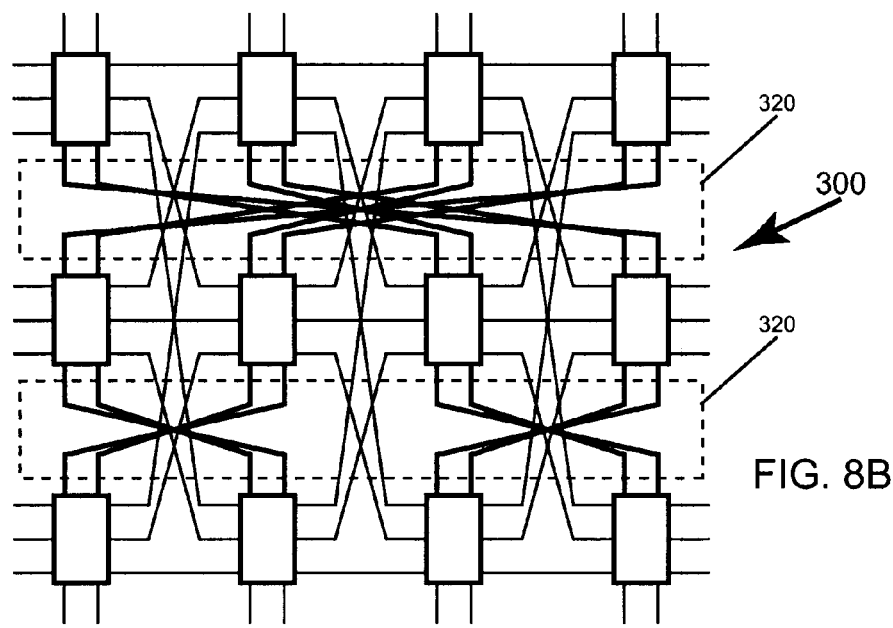
Figure 8C:
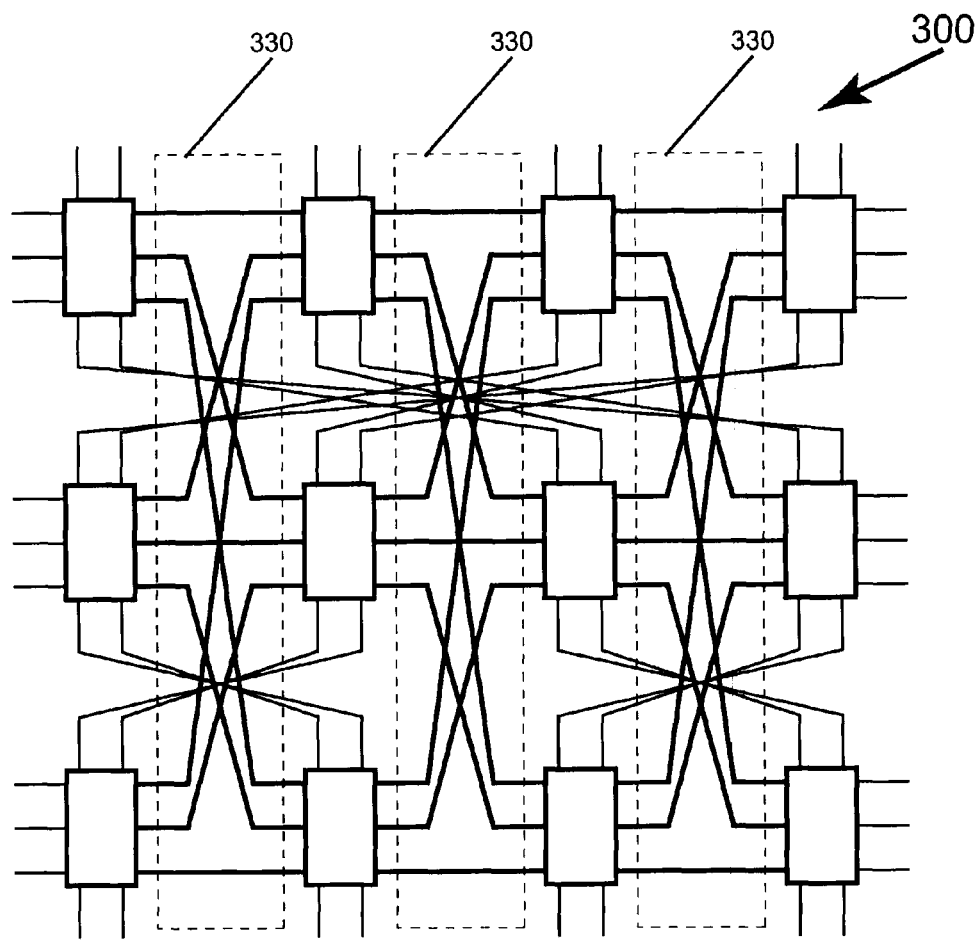

FIG. 8A, FIG. 8B and FIG. 8C depict an overlaid switching network 300 which is described in detail below, with external ports 320. It can be described in terms of rows and columns. Between rows can be an inter-row interconnection (IRIC) network 330 as indicated in FIG. 8B. Between the columns can be an inter-column interconnection (ICIC) network 330 as indicated in FIG. 8C.

As a convention in the diagrams, items are generally counted starting with 0 from top to bottom, left to right and, in the case of three dimensional drawings, front to back. For example, the stages of a multistage switching networks are numbered from top to bottom from 0 to H−1 with stage 0 at the top and the ports on the switching elements are numbered from left to right from 0 to F−1 with port 0 leftmost. Furthermore, the switching elements are numbered from left to right from 0 to W−1.

On occasion, it is convenient to refer to a port as belonging to a stage or ISIC network, that is a port belongs to a stage if it belongs to a switching element belonging to the stage. A port belongs to an ISIC network if it is a top port and the top ports of the stage to which it belongs is coupled to the ISIC network. Conversely, if the port is a bottom port, it belongs to an ISIC network if the bottom ports of the stage to which it belongs is coupled to the ISIC network. One should not by this convention a port need not be connected to belong to an ISIC network.

Figure 9:
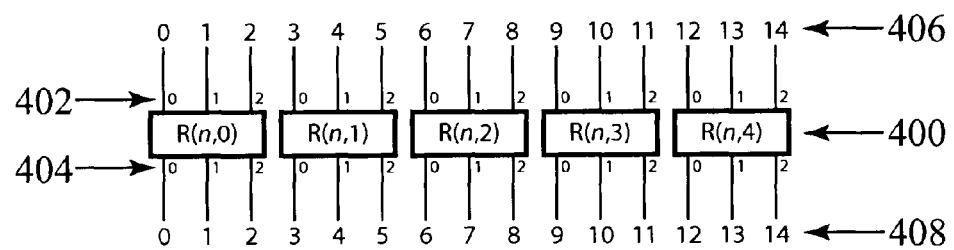
FIG. 9 shows the relationship between the numbering of the ports for each switching element and the number of ports for an entire row.

It is often convenient to number these ports from 0 to W×F−1. Notationally, each switching element can be labeled as R(n,W) indicating it is w+1 switching elements from the leftmost switching element in stage n+1. FIG. 9 depicts stage n+1 of switching elements, indicated as stage 400. In this example, F=3 and W=5 so the bottom and top ports for each switching element are numbered from 0 to 2, as indicated by 402 for the top ports and 404 for the bottom ports. If referring to the top ports and bottom ports of the stage, they are numbered from 0 to 14 as indicated by 406 and 408 respectively. Mathematically, the relationship is a simple equation, for instance, top port 2 of switching element R(n,4) would be top port 4F+2 of stage n. In discussion of higher dimensional switching networks, this concept can be extended to numbering of all ports of a two-dimensional stage. For instance, bottom port (1,3) of switching element R(n,2,3) would be bottom port ($2F_1+1,3F_2+3$) of the ISIC network.

Figure 10:
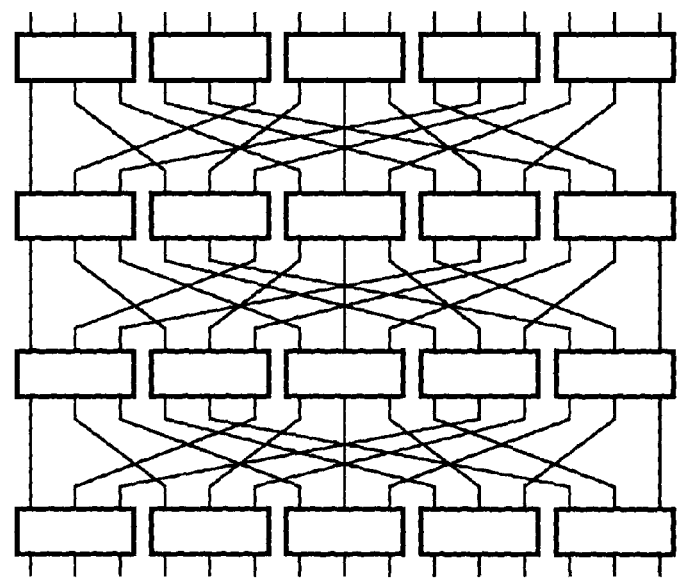
FIG. 10 shows a 30-port RBCCG network with 4 layers and width of 5 switching elements and per switching element fanout of 3.

By way of specific example, many of the switching networks described are redundant blocking compensated cyclic group (RBCCG) networks as described by Huang in U.S. Pat. No. 5,841,775; therefore, U.S. Pat. No. 5,841,775, entitled "Scalable Switching Networks," issued on Nov. 24, 1998 is incorporated herein by reference in its entirely as if set forth in full. Specifically, balanced RBCCG networks which have a stride value equal to the fanout such as the one depicted in FIG. 10 are used. The balanced RBCCG network depicted in FIG. 10 has a fanout of 3, a stride of 3, height of 4 and a width of 5. Each ISIC network in a balanced RBCCG is referred to as a cyclic group ISIC (CGISIC) network.

Since the Banyan network has no fault tolerance, the resultant network is not uniformly fault tolerant. It should also be noted that as a result, upgrade of such a network can not be achieved without disruption of service. Like the multidimensional design technique, the overlaying process of switching network design is intended to be a design process, and not a process to directly upgrade an existing infrastructure. However, it is possible if each switching element can be augmented with additional physical ports to use this method to reconfigure an existing network. A product of the overlaying process, a design can bolster the fault tolerance of a network and reduce latency in many cases. As is evident, the methods described herein can be applicable to more than two networks and in higher dimensions. For clarity, the embodiment of the overlaying process involving two networks is described in detail.

One embodiment of the overlaying process receives two multistage switching networks. One of the two networks is rotated by 90 degrees so that the top ports become left ports and the bottom ports become right ports (or equivalently top ports can become right ports and bottom ports can become left ports.) The two networks are registered so that wherever possible, switching elements are made to overlap. In an example where the first network has height H and width W, and the second network has height W and width H, the switching elements can be made to completely coincide. Once the two networks are registered and overlaid, whenever two switching elements overlap, a single switching element is defined at that location having the same ports as the two switching elements it replaces.

Figure 48:
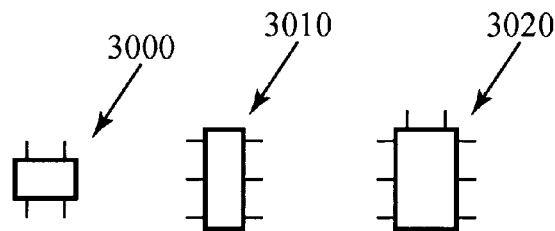
FIG. 48 shows how two switching elements that overlay in the overlay process are combined into one switching element.

FIG. 48 illustrates this process: switching element 3000 depicts a switching element with two top ports and two bottom ports. Switching element 3010 depicts a switching element from a rotated multistage interconnection network with three right ports and three left ports. If these two switching elements are overlaid, they are replaced by switching element 3020, which has two top ports, two bottom ports, three right ports and three left ports.

Furthermore, the ISIC networks of the first network become the IRIC networks of the resultant overlaid networks, and the ISIC networks of the second network become the ICIC networks of the resultant overlaid network.

In the example to follow, a first network and a second network are overlaid to form a resultant third network. In each situation, a variety of differing multistage interconnection networks are combined, illustrating the versatility of this technique.

Figure 49A:
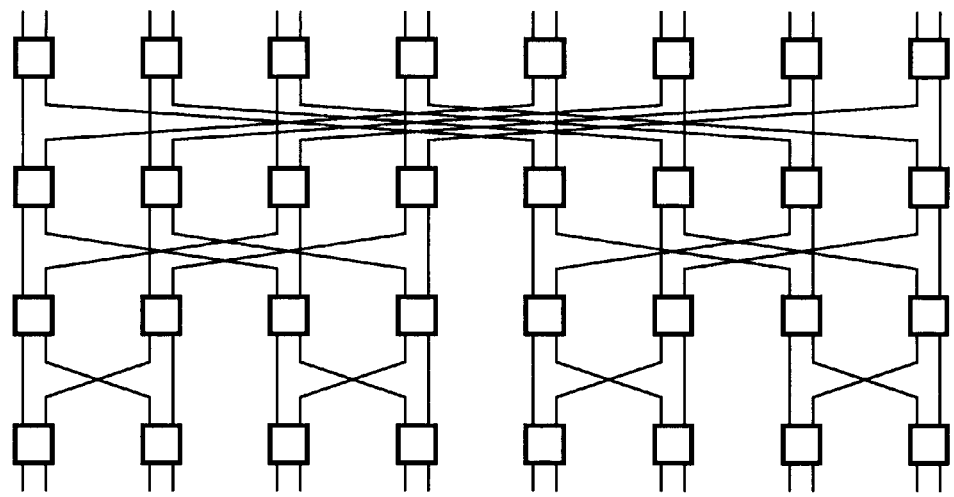
FIG. 49A, FIG. 49B and FIG. 49C show the process of a perpendicular overlay of a 32-port Banyan network and a 16-port, 8-stage RBCCG network.
Figure 49B:
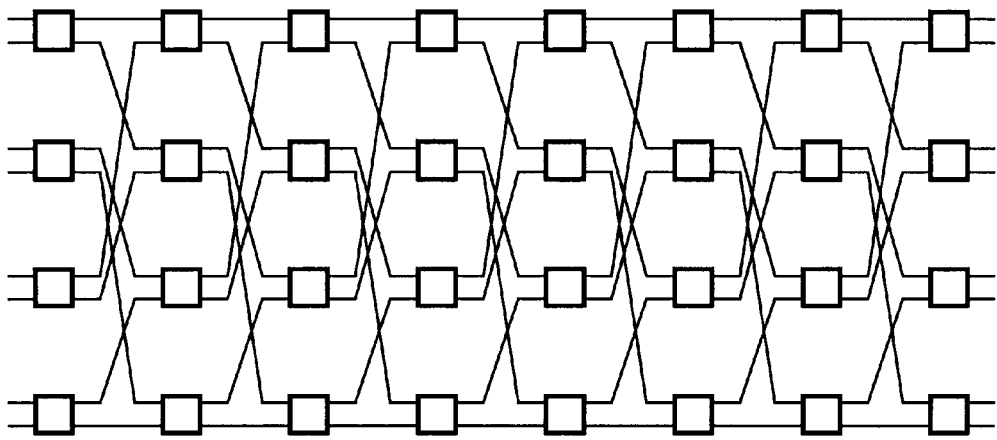
Figure 49C:
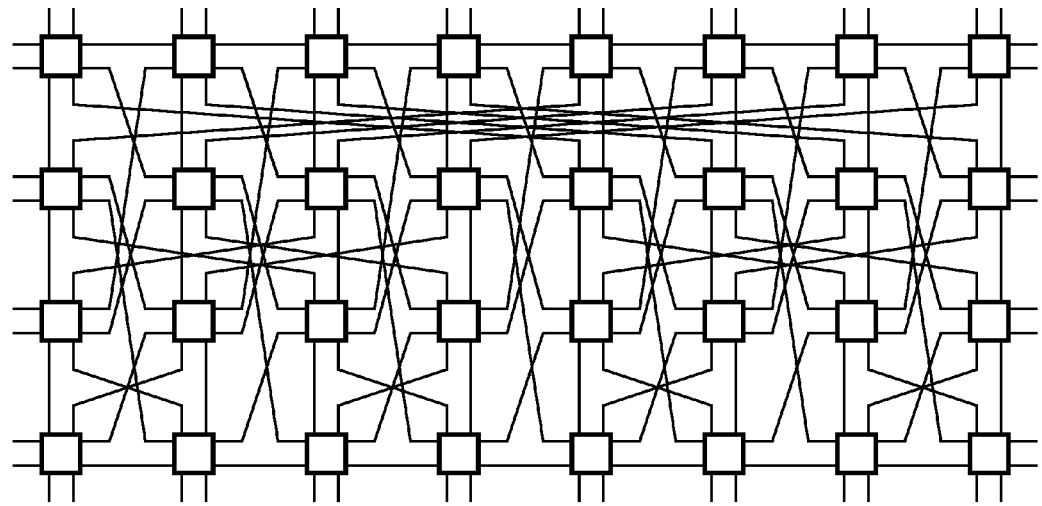
Figure 49D:
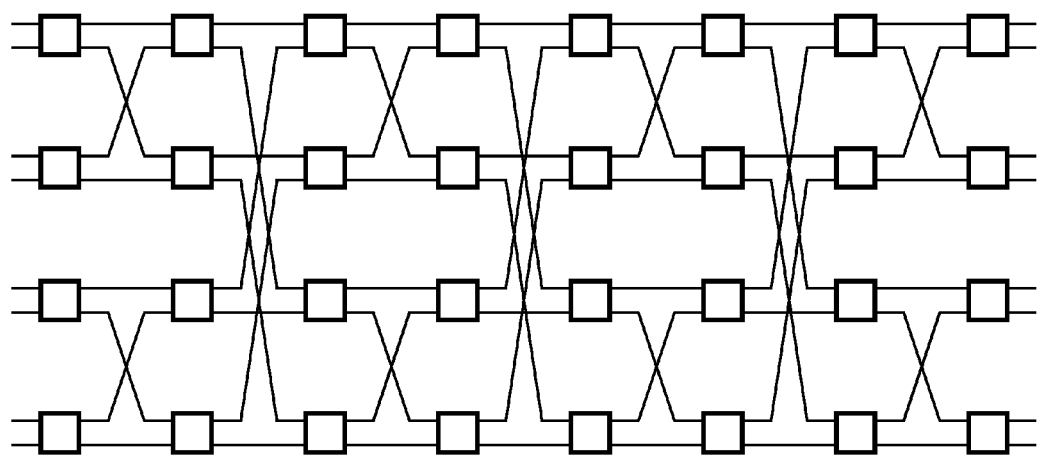
FIG. 49D and FIG. 49E show the process of a perpendicular overlay of a 32-port Banyan network and a 16-port, 8-stage multiple Banyan network.
Figure 49E:
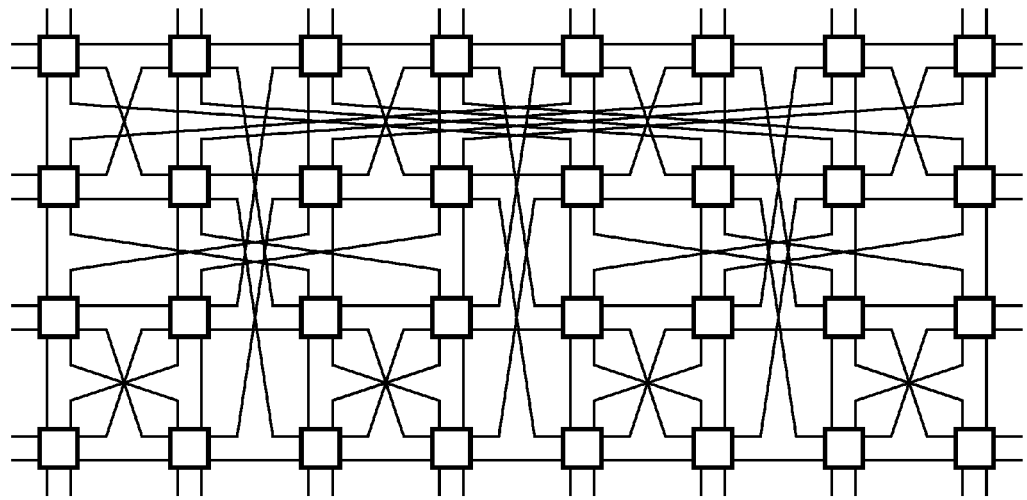

In one embodiment, the Banyan network shown in FIG. 49A with a 4 rows and 8 columns (having interconnection networks 101, 102, and 103 between stages) is overlaid on the balanced RBCCG network shown in FIG. 49B with 8 rows and 4 columns (having interconnection networks 104, 105, 106, 107, 108, 109, and 110 between stages) and fanout per switching element of 2, resulting in the overlaid switching network shown in FIG. 49C (having interconnection networks 101, 102, and 103 between rows and interconnection networks 104, 105, 106, 107, 108, 109, and 110 between columns). In another embodiment, the Banyan network shown in FIG. 49A with 4 rows and 8 columns is overlaid on the switching network shown in FIG. 49D comprising three Banyan networks coupled through a common stage of switching elements having 8 rows and 4 columns (having interconnection networks 114, 115, 116, 117, 118, 119, and 120 between stages) and fanout per switching element of 2, resulting in the overlaid switching network shown in FIG. 49E (having interconnection networks 101, 102, and 103 between rows and interconnection networks 114, 115, 116, 117, 118, 119, and 120 between columns).

Figure 50A:
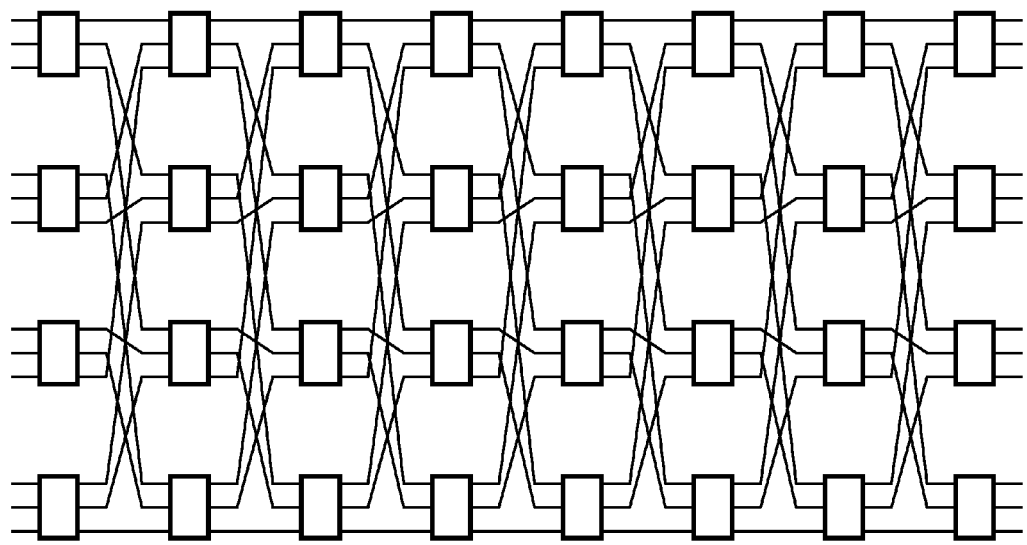
FIG. 50A and FIG. 50B show the process of a perpendicular overlay of a 32-port Banyan network and a 24-port, 8-stage RBCCG network.
Figure 50B:
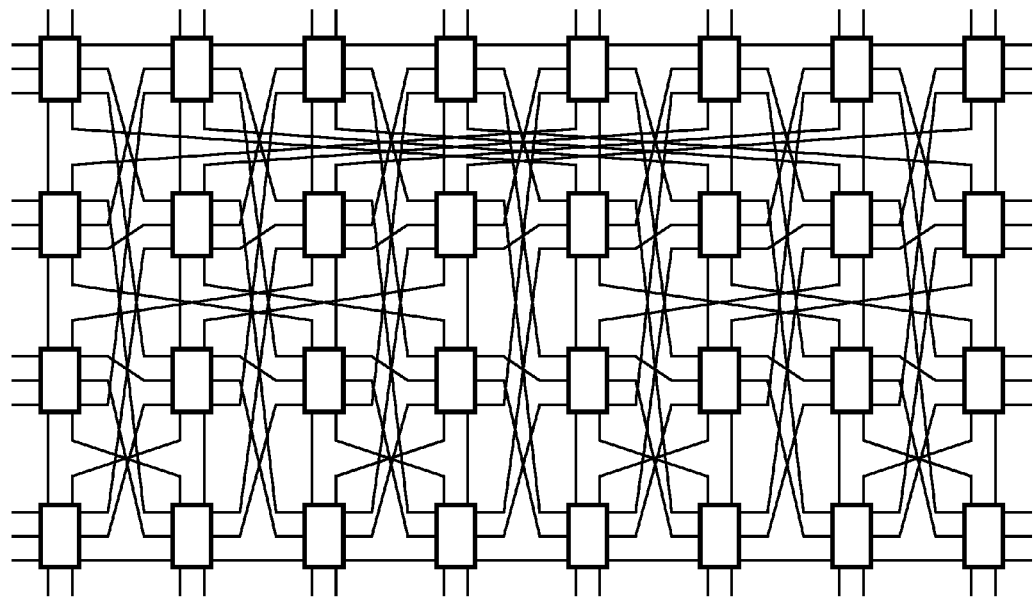
Figure 51A:
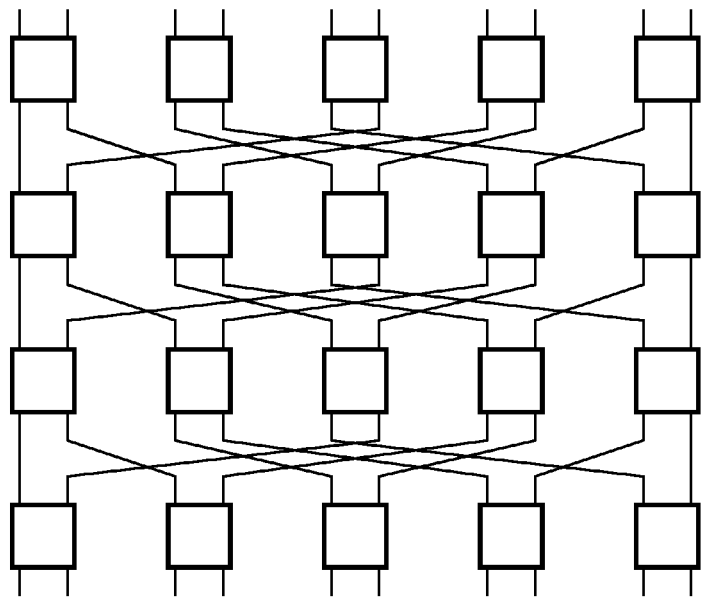
FIG. 51A, FIG. 51B and FIG. 51C show the process of a perpendicular overlay of a 20-port 4-stage RBCCG network and a 24-port, 5-stage RBCCG network.
Figure 51B:
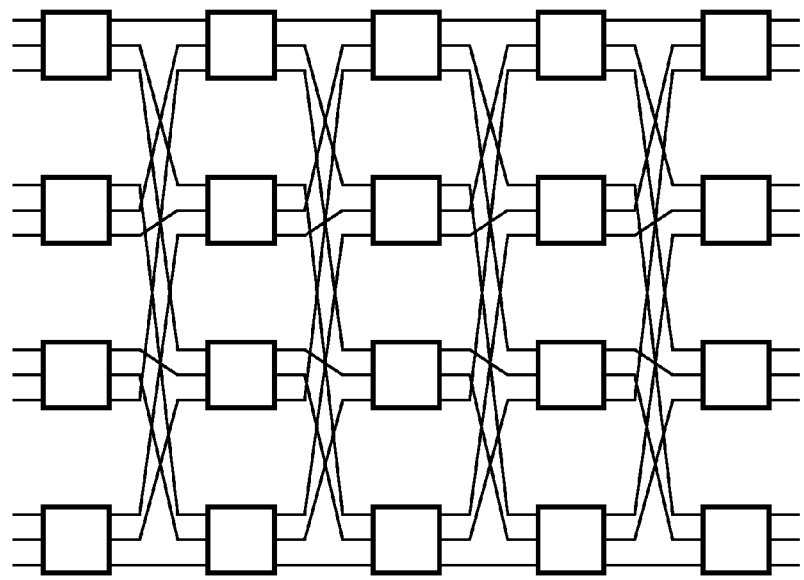
Figure 51C:
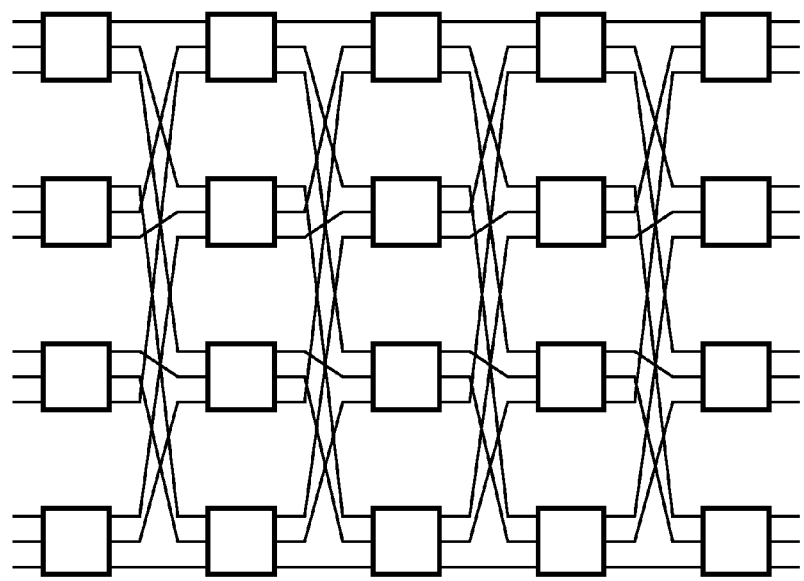
Figure 52A:
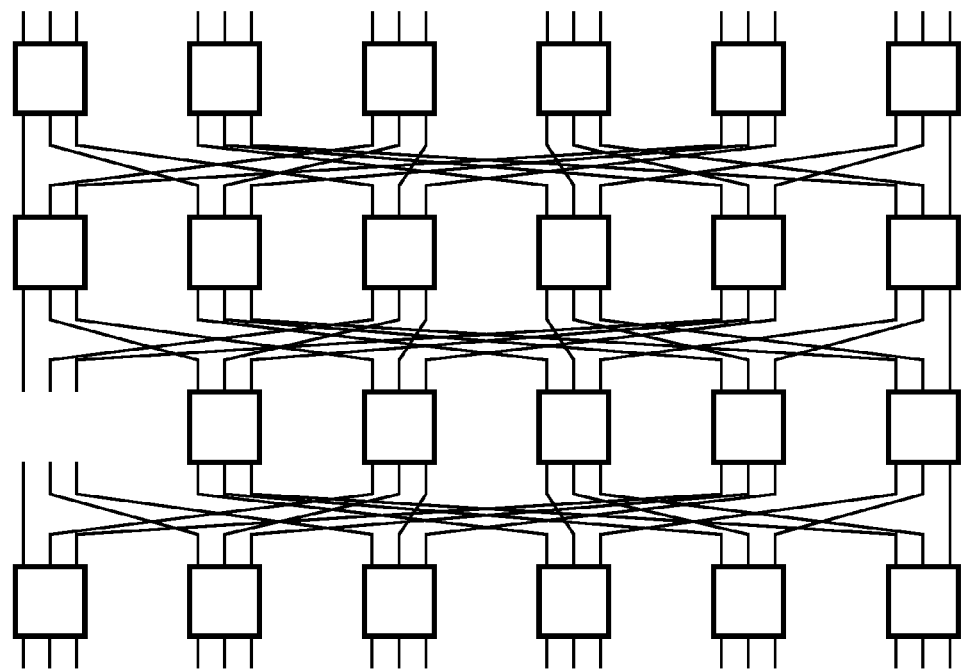
FIG. 52A, FIG. 52B and FIG. 52C show the process of a perpendicular overlay of a 36-port 4-stage RBCCG network and a 24-port, 6-stage RBCCG network.
Figure 52B:
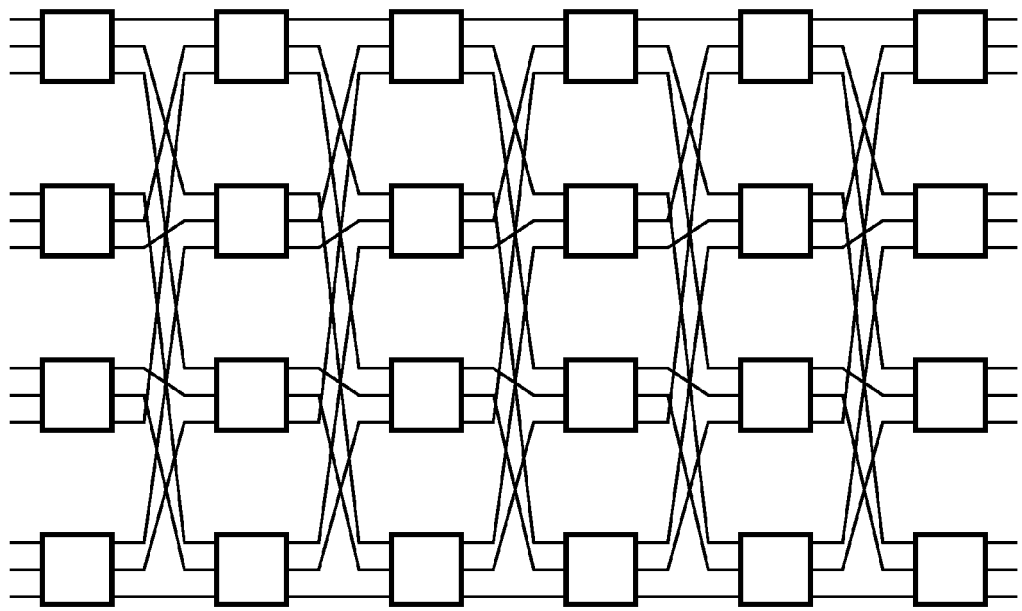
Figure 52C:
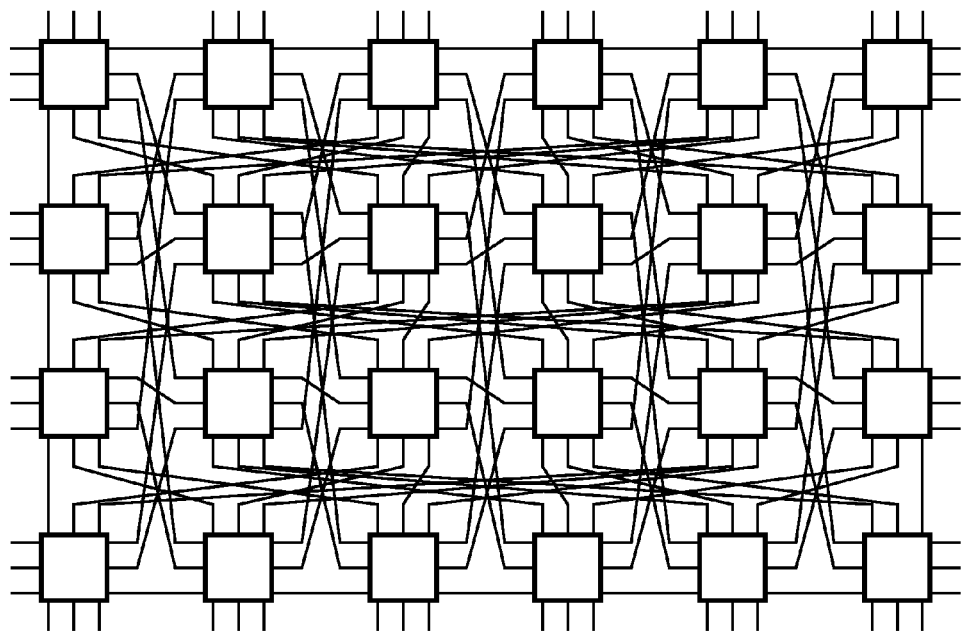
Figure 53A:
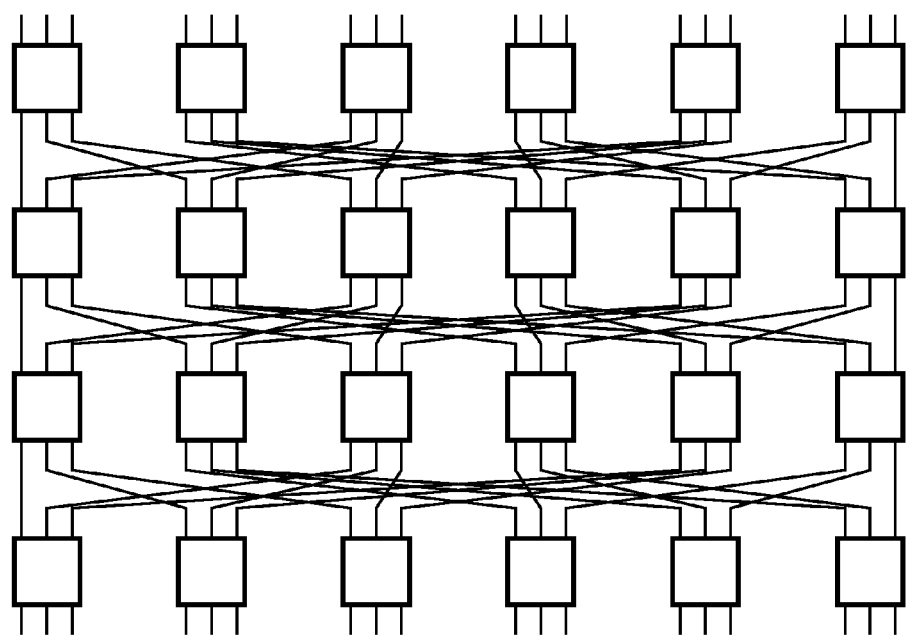
FIG. 53A, FIG. 53B and FIG. 53C show the process of a perpendicular overlay of a 36-port 4-stage RBCCG network and a 32-port, 6-stage RBCCG network.
Figure 53B:
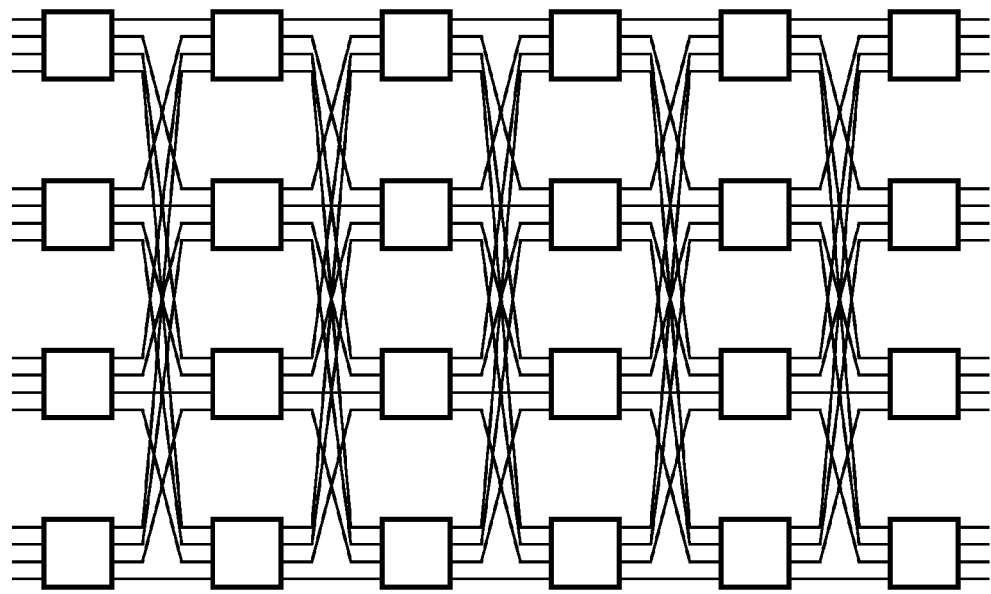
Figure 53C:
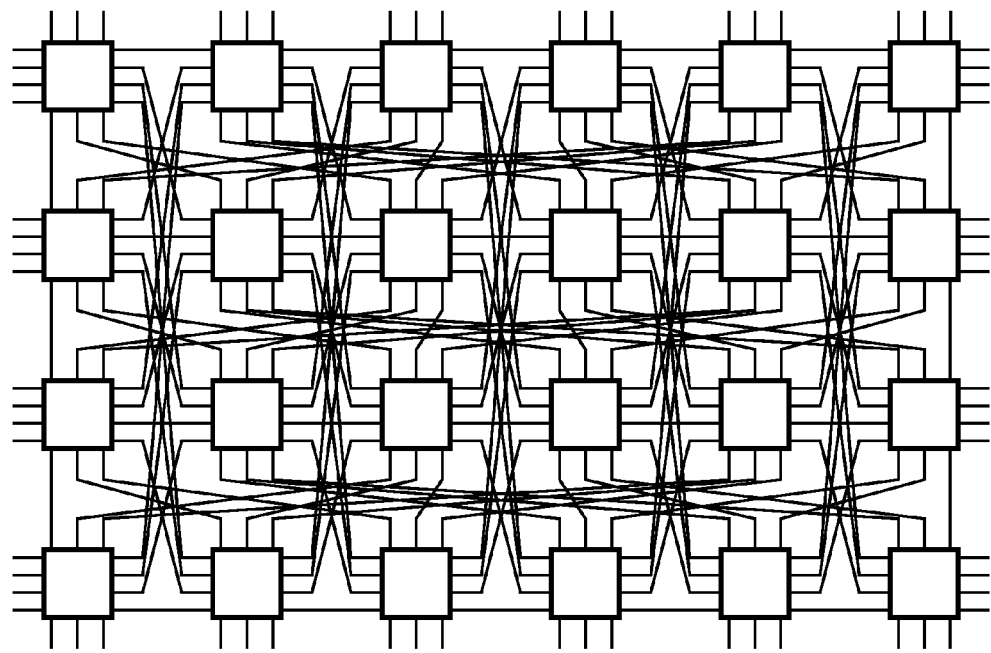
Figure 54A:
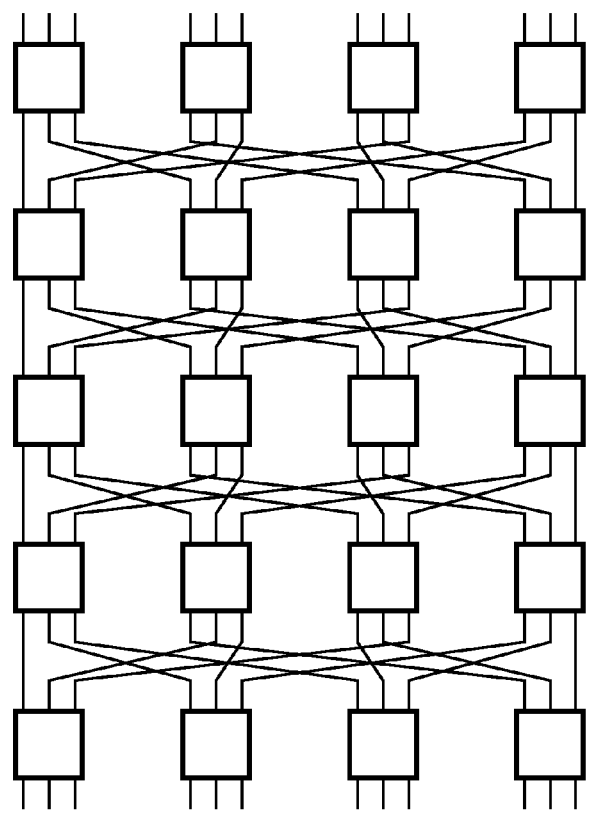
FIG. 54A, FIG. 54B, FIG. 54C, and FIG. 54D show the process of a perpendicular overlay of a 24-port 5-stage RBCCG network and an 18-port, 6-stage RBCCG network, with two types of registration.
Figure 54B:
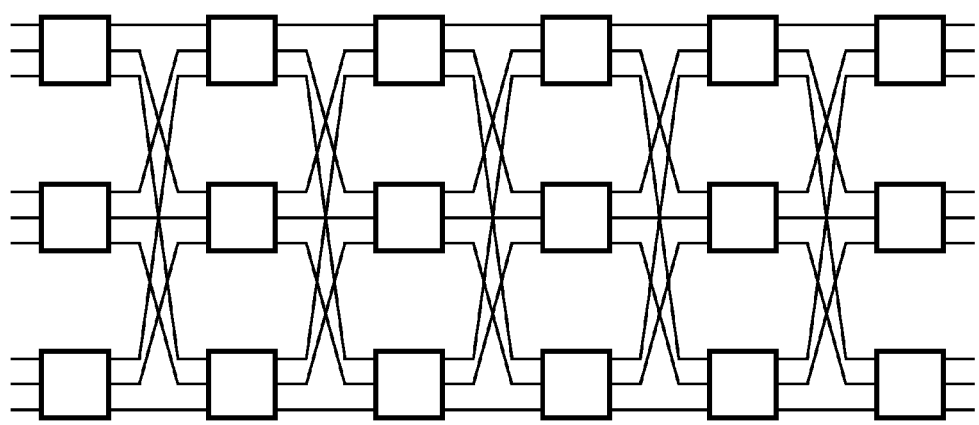
Figure 54C:
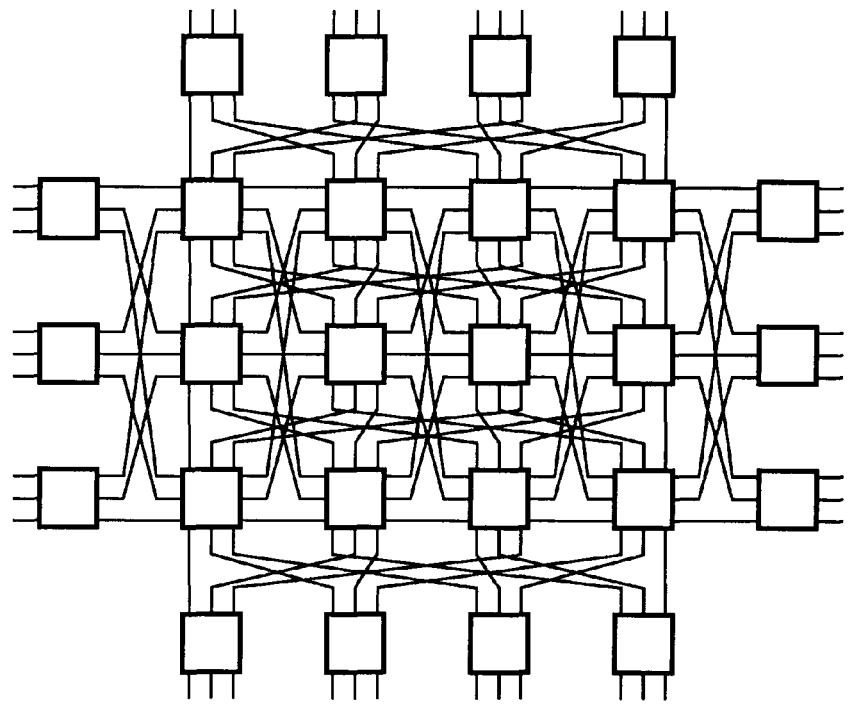
Figure 54D:
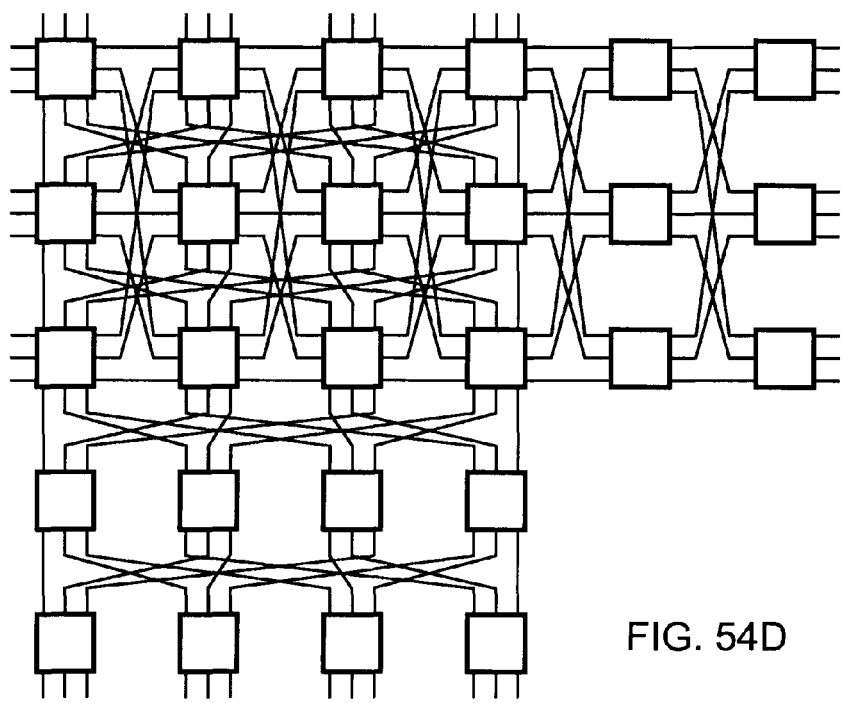

In another embodiment, the overlaying process is shown to be independent of the fanouts of the two networks being combined. For example, the Banyan network shown in FIG. 49A with 4 rows and 8 columns can be overlaid on the balanced RBCCG network (having interconnection networks 121, 122, 123, 124, 125, 126, and 127 between stages) shown in FIG. 50A having a different fanout to the Banyan network. The network having 8 rows and 4 columns and a fanout per switching element of 3. FIG. 50B illustrates the resultant overlaid switching network having interconnection networks 101, 102, and 103 between rows and interconnection networks 121, 122, 123, 124, 125, 126, and 127 between columns). In another embodiment, the balanced RBCCG network shown in FIG. 51A with 4 rows and 5 columns (having interconnection networks 201, 202, and 203 between stages) and fanout per switching element of 2 can be overlaid upon a 5 row, 4 column balanced RBCCG network (having interconnection networks 204, 205, 206 and 207 between stages) with fanout per switching element of 3 as shown in FIG. 51B, resulting in the overlaid switching network of FIG. 51C (having interconnection networks 201, 202, and 203 between rows and interconnection networks 204, 205, 206, and 207 between columns). In another embodiment, the balanced RBCCG network shown in FIG. 52A with 4 rows and 6 columns (having interconnection networks 251, 252, and 253 between stages) and fanout per switching element of 3 can be overlaid upon a 6 row, 4 column balanced RBCCG network (having interconnection networks 254, 255, 256, 257 and 258 between stages) with fanout per switching element of 3 as shown in FIG. 52B, resulting in the overlaid switching network of FIG. 52C (having interconnection networks 251, 252, and 253 between rows and interconnection networks 254, 255, 256, 257 and 258 between columns). In another embodiment, the balanced RBCCG network shown in FIG. 53A with 4 rows and 6 columns (having interconnection networks 251, 252, and 253 between stages) and fanout per switching element of 3 can be overlaid upon a 6 row, 4 column RBCCG network (having interconnection networks 264, 265, 266, 267 and 268 between stages) with fanout per switching element of 4 as shown in FIG. 53B, resulting in the overlaid switching network of FIG. 53C (having interconnection networks 251, 252, and 253 between rows and interconnection networks 264, 265, 266, 267 and 268 between columns). In another embodiment, the balanced RBCCG network shown in FIG. 54A with 5 rows and 4 columns (and having interconnection networks 301, 302, 303, and 304 between stages) and fanout per router of 3 can be overlaid onto the balanced RBCCG network shown in FIG. 54B with 3 rows and 6 columns (and having interconnection networks 305, 306, 307, 308, and 309 between stages). Depending on the manner the two networks are registered, a variety of new switching network designs are possible. FIG. 54C illustrates the resultant overlaid switching network (having interconnection networks 301, 302, 303, and 304 between rows and interconnection networks 305, 306, 307, 308, and 309 between columns) when the two networks are centered upon each other. FIG. 54D illustrates an alternate resultant overlaid switching network (having interconnection networks 301, 302, 303, and 304 between rows and interconnection networks 305, 306, 307, 308, and 309 between columns), based upon a different registration.

The many embodiments illustrated formed from the process of overlaying two RBCCG networks upon each other demonstrate the versatility of overlaying RBCCG networks upon a second RBCCG network. Clearly, unbalanced RBCCG networks could be utilized here for the first network, the second network or both networks. It is easy to find an RBCCG network with the proscribed height and width, and the selection of fanouts is arbitrary so that it can be selected to what suits the desired implementation best.

The product of the overlaying process results in switching networks that require more ports than either of the constituent switching network designs. However, the advantages gained include an overall reduction in latency. In the Banyan network, it requires four hops for traffic entering top port 0 of R(0,0) to exit bottom port 1 of R(3,1). In FIG. 49A, there is only one path, passing through R(0,0), R(1,0), R(2,0) and R(3,1). In FIG. 49C, there is a new path requiring only three hops, passing through R(0,0), R(1,0) and R(3,1). Though this savings is small, this is due to the fact that in this example there are not very many levels. However, looking at the RBCCG network in FIG. 49B, it requires eight hops for traffic moving left to right. For example, traffic entering left port 0 of R(0,0) to exit right port 1 of R(1,7) must take eight hops, regardless of the path chosen. However, in FIG. 49C there is now a path requiring only four hops, passing through R(0,0), R(1,5), R(2,6) and R(1,7). This is a significant savings in latency.

Another advantage is the addition of fault tolerance. By adding new internal connections, the network can tolerate more failures in connections and routers. In the case of the Banyan network which has no redundancy, it is clear from the preceding example of traffic entering top port 0 of R(0,0) and exiting bottom port 1 of R(3,1) that in the resultant architecture, there are more paths made available for that traffic. With more paths available, the architecture also reduces blocking, improving efficiency for isochronous traffic.

Figure 55A:
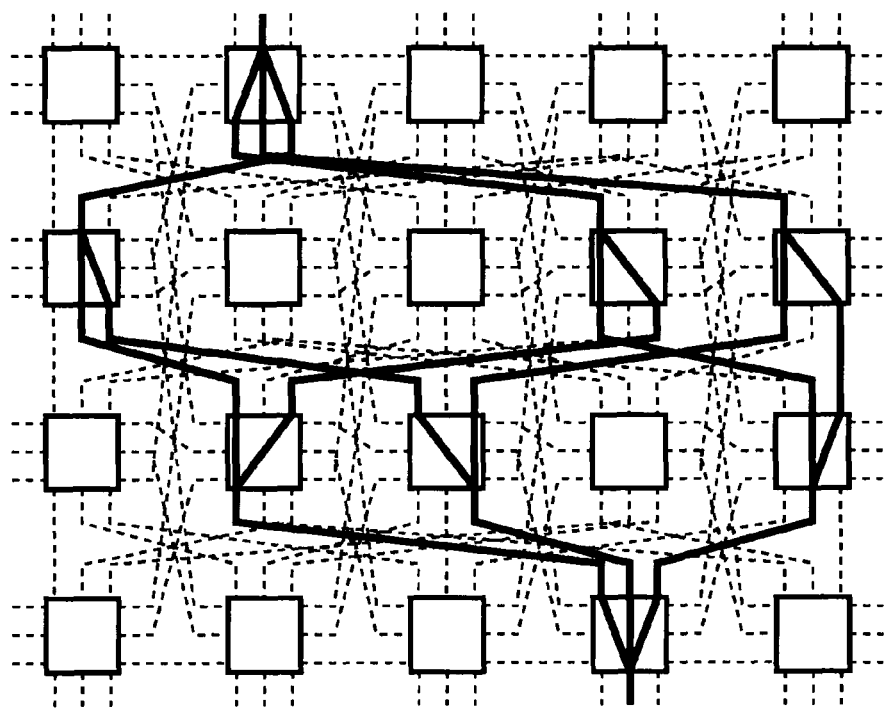
FIG. 55A and FIG. 55B show paths between two external ports with latencies of 3 hops and two hops, respectively.
Figure 55B:
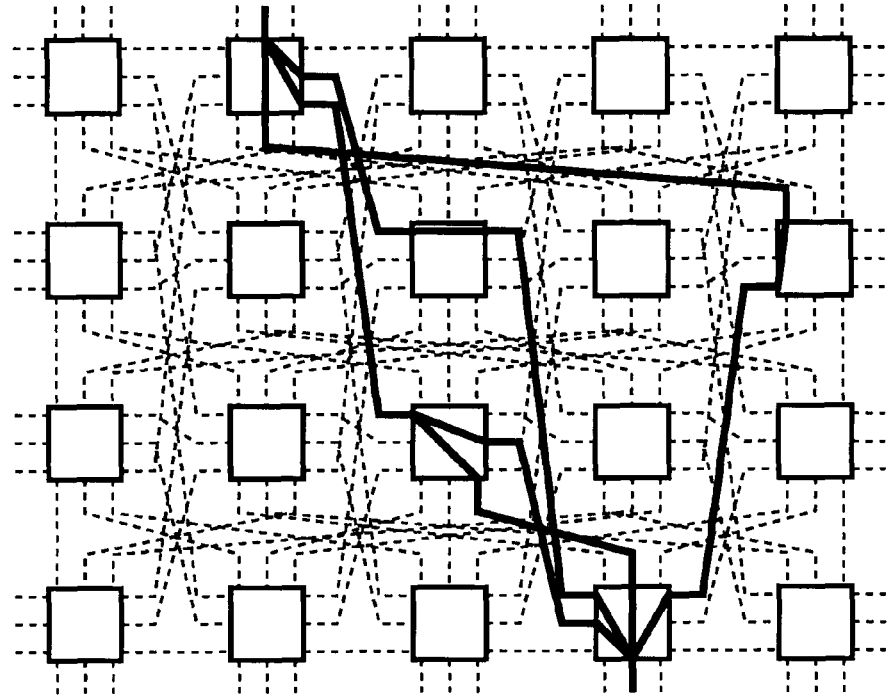

Furthermore, FIG. 55A and FIG. 55B further illustrate the advantages in improved latency and fault tolerance. FIG. 55A highlights the six paths from the two highlighted external ports that occur naturally as part of the IRIC networks flowing from top to bottom. FIG. 55B shows four additional paths which are shorter than the six "natural" paths. These four paths incorporate connections in the ICIC networks. The result is shorter latency options and additional paths. The added fault tolerance additionally facilitates the upgradeability of overlaid networks without disruption of service. Such upgrade methods are described below.

Another advantage is the number of external ports is related to the perimeter of the network rather than just the width alone, allowing the designer an extra degree of freedom in designing a network.

Figure 56A:
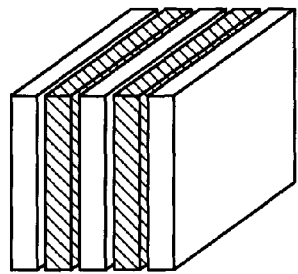
FIG. 56A, FIG. 56B, and FIG. 56C show three orientations of two-dimensional multistage interconnection networks for the purposes of overlaying networks.
Figure 56B:
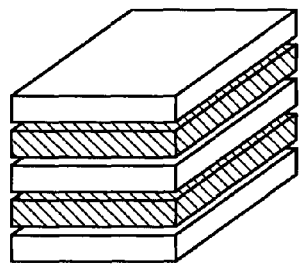
Figure 56C:
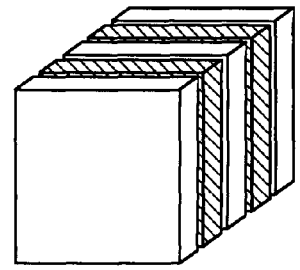

The perpendicular overlaid networks are fairly straightforward for planar designs such as those described above. The overlaying procedure can apply to higher dimensions as well. Additional degrees of freedom become available. FIG. 56A, FIG. 56B, and FIG. 56C show three orientations of two dimensional multistage switching networks with the interplane interconnection networks denoted in gray shading. Just as in the two dimensional overlaying, certain dimensions must match. For instance, the height, width and depth of a network must match the width, depth, and height of a second network or some other permutation of the three dimensions. There are too many degrees of freedom to enumerate all the possibilities here, but essentially two networks can be overlaid if there is some orientation for which the dimensions of the two "match." Since there are three orientations available in three dimensional space, two of the three networks could be overlaid as well as all three. As in the planar example, the fanouts of the respective two-dimensional multistage switching networks are independent of each other.

Figure 57A:
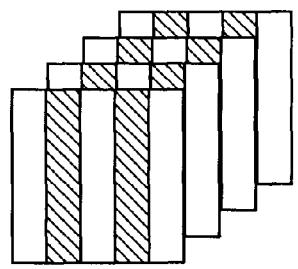
FIG. 57A, FIG. 57B, and FIG. 57C show how to combine one-dimensional multistage interconnections networks into a two-dimensional multistage interconnection network.
Figure 57B:
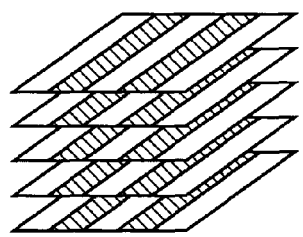
Figure 57C:
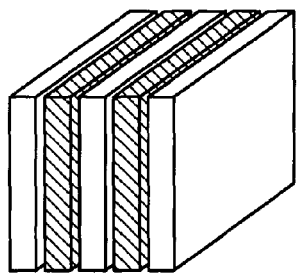

There are also techniques for generating a higher dimensional multistage interconnection network from a plurality of lower dimensional multistage interconnection network. FIG. 57A shows a 1-dimensional multistage interconnection network of height, H, width $W_1$ and per switching element fanout of $F_1$ being stacked with $N_1-1$ identical multistage interconnection networks, resulting in an rather uninteresting 2-dimensional multistage interconnection network of height H and widths $W_1$ and $N_1$, and fanouts per switching element of $F_1$ and 1. FIG. 57B shows a stack of $N_2$ multistage interconnection networks of height H and width $W_2$, and fanout per switching element of $F_2$. The two can be overlaid if $N_1=W_2 \times F_2$ and $N_2=W_1 \times F_1$. As shown in FIG. 57C. Again as in the preceding examples, the gray areas represent interconnection networks.

Figure 58A:
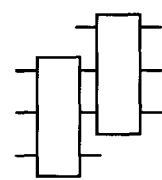
FIG. 58A, FIG. 58B and FIG. 58C show how to combine one-dimensional switching elements into two-dimensional switching elements.
Figure 58B:
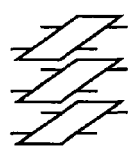
Figure 58C:
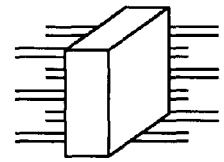

One detail is necessary to complete the overlay of the networks shown in FIG. 57A and FIG. 57B. FIG. 58A shows a stack of $F_2$ switching elements from the network in FIG. 57A. FIG. 58B shows a stack of $F_1$ switching elements from the network in FIG. 57B. In the overlaid result in FIG. 58C, those stacks of switching elements are replaced by a single two-dimensional switching element of total fanout of $2F_1 F_2$. The actual distribution of the fanouts across can be somewhat arbitrary, especially if these are used to construct three-dimensional overlays as described above. The important factor is that the data flows along the y-axis.

This last technique can be applied to arbitrary dimensions. However, the stacking and higher dimensional overlays result in smaller diameter networks for the number of external ports significantly reducing latency and increasing fault-tolerance. However, the requirement in hardware is also greatly increased, but this allows additional flexibility to the network designer.

As suggested by Huang in U.S. Pat. No. 5,841,775, modern routing protocols can be used to direct signals through the switching networks described above, especially dynamic routing protocols such as Open Shortest Path First (OSPF). These protocols enable the switching network to automatically adapt to faults in the network, and also to adapt to the changing topology of the network, should it be altered. This is an important property when performing upgrades by the methods as discussed below. The use of dynamic routing protocols during the upgrade process enables these scalable switching networks to be upgraded while in switching operation. In addition, the use of such protocols can give the network designer the freedom to derive complex routing formula for each potential network design. In particular, these protocols can be used in any of the above described network designs.

However, the drawback is that most of these dynamic routing protocols are designed to operate on ad hoc networks where there is no semblance of regularity, as such are often implemented by using substantial memory and large tables. In contrast, routing in many traditional fixed radix networks, particularly the radix two networks, is based on mathematical or algorithmic calculations rather than the table lookup techniques. Since many of the fixed radix networks were designed from sorting algorithms, many of the routing formulas are based on sorting techniques. For example, a switching element in the third stage can look at the third bit of the destination address and route the signal to the right if the bit is set and to the left of the bit is not set.

Consider the balanced RBCCG switching network with a stride equal to the fanout, a height of H, a width of W switching elements per stage, and a fanout of F comprises a plurality of CGISIC networks. Specifically, each CGISIC is generated by the following mapping, bottom port s of stage n is connected to top port d of stage N+1, (recall that according to FIG. 9 these port numbers are numbered from 0 to WF−1) where $d=((s \bmod W)F+(S/W)) \bmod (WF)$. Traffic can be routed through this balanced RBCCG switching network using the following formula, $p=((d-sF^{H-k}) \bmod W+ iW)/F^{H-k-1}$ where p is the port on switching element R(k,s) to which the signal should be directed to reach switching element R(H,d) and i can be any integer value for which the resultant p makes sense (i.e. $0 \leq p<F$). The division operation in the preceding formula is integer division, that is division where the remainder is discarded. The power of this formula lies in that each switching element, knowing its location within the switching network and the destination of the signal, can decide which output port it must route the signal to without the need for tables or information from other switching elements.

Figure 59:
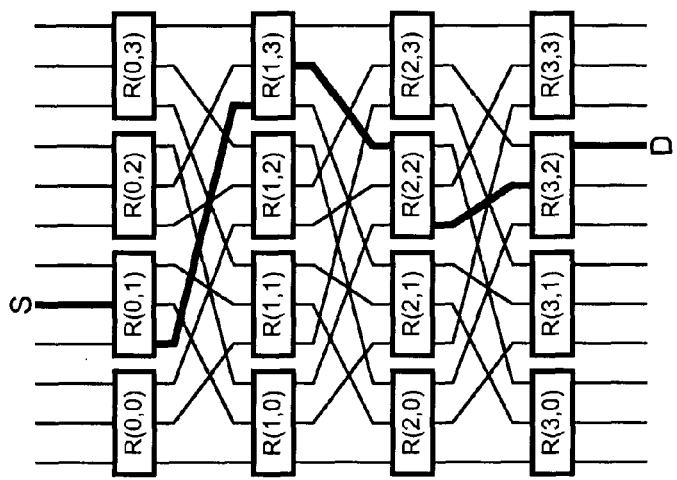
FIG. 59 shows an example path of a route from port S to port D.

The following is an example of an application of this routing algorithm. Depicted in FIG. 59 is a 24-port RBCCG switching network, To traverse from port S to port D, the signal must be routed between R(0,1) to R(3,2). At router R(0,1), the routing formula yields a solution for p of either 0, 1, or 2 meaning that the signal could be routed through any of the output ports, all of which are equally valid. If the signal is routed through port 0, it arrives at R(1,3), according to the routing formula to route from R(1,3) to R(3,2) yields only one possible value for p that of 1, so the signal must be routed through output port 1 to R(2,2). To route from R(2,2) the routing formula from R(2,2) to R(3,2) yields only the value of p=0 so the signal must be routed through output port 0 to R(3,2) where it is finally conveyed through output port 2 to destination D.

In some instances of applying the routing formula, several solutions for the output port can result. In such situations, a routing algorithm is free to select any solutions and allow the switching element in the next stage to carry out the next calculation. Though FIG. 59 describes one path from S to D, there are in fact five paths, which derive from the different choices of when multiple solutions exist. The first path as described above has the signal passed from S to R(0,1) where it traverses through output port 0 to R(1,3) where it traverses through output port 1 to R(2,2) where it traverses through output port 0 to R(3,2) where it is finally conveyed through output port 2 to destination D.

A second path has the signal traverses through output port 1 to R(1,0) where it traverses through output port 0 to R(2,0) where it traverses through output port 2 to R(3,2) where it is finally conveyed through output port 2 to destination D.

A third path has the signal passed from S to R(0,1) where, like in the second path, it traverses through output port 1 to R(1,0) where, unlike the second path, it traverses through output port 2 to R(2,2) where it traverses through output port 0 to R(3,2) where it is finally conveyed through output port 2 to destination D.

A fourth path has the signal passed from S to R(0,1) where it traverses through output port 2 to R(1,1) where it traverses through output port 1 to R(2,0) where it traverses through output port 2 to R(3,2) where it is finally conveyed through output port 2 to destination D.

A fifth path has the signal passed from S to R(0,1) where like in the fourth path, it traverses through output port 2 to R(1,1) where unlike in the fourth path, it traverses through output port 0 to R(2,3) where it traverses through output port 1 to R(3,2) where it is finally conveyed through output port 2 to destination D.

This gives an alternative routing technique for the RBCCG switching networks, allowing these switching networks to be used in applications where the switches are constrained to simple logic. In addition, this formula can be used as part of a formulaic routings algorithm for the hybrid architectures mentioned above. Additionally, since the interconnection mappings of the Cartesian product networks are separable (that is, they are independent in the various $x_1$ directions), this routing formula can be used to route based on each component of the address. For example, if the $x_1$ direction shows a Banyan interconnection pattern, and the $x_2$ direction is a RBCCG switching network, a Banyan formula can be used to calculate the $x_1$ component, $p_1$, of output port based on the $x_1$ component of the destination address. The routing formula given above for the RBCCG switching network can be given be used to determine which the $x_2$ component, $p_2$, of output port based on the $x_2$ component of the destination address, thereby yielding a resultant output port of $(p_1,p_2)$. This formula can also be used in various combinations to route in any of the overlaid networks where one of the networks overlaid is an RBCCG switching network.

In any of the preceding architectures, if a dynamic routing algorithm as used by protocols, such as Routing Information Protocol (RIP), OSPF, Exterior Gateways Protocol (EGP), and Border Gateway Protocol (BGP) is employed, the redundancy of the networks can be exploited to provide fault tolerance. Once a fault is detected through non-response, perhaps using a network management protocol such as Simple Network Management Protocol (SNMP), the dynamic routing algorithm can remove the entry from its routing tables and all traffic can be routed around the defective switching element or connection. When the defective switching element or connection is repaired, the repair can be detected, perhaps through the same network management protocol, and the dynamic routing algorithm can reintroduce the formerly defective elements back to its routing table and traffic can resume through the formerly defective element(s).

Having path redundancy, detecting faults and the ability to dynamically route traffic leads to automatic fault tolerance. For example, FIG. 60A depicts a 30-port balanced RBCCG switching network with five paths (shown in bold) from port S to port D. With dynamic routing described above, switching element R(0,2) would determine three paths out of switching element R(0,2), and depending on the routing algorithm, any one of those three paths can be taken. Depending on which path is taken, the corresponding switching element in stage 1 detects the remaining paths available to port D. For example, if the traffic gets routed by switching element R(0,2) to switching element R(1,3) two paths are available, so switching element R(1,3) can select either path.

Figure 60B:
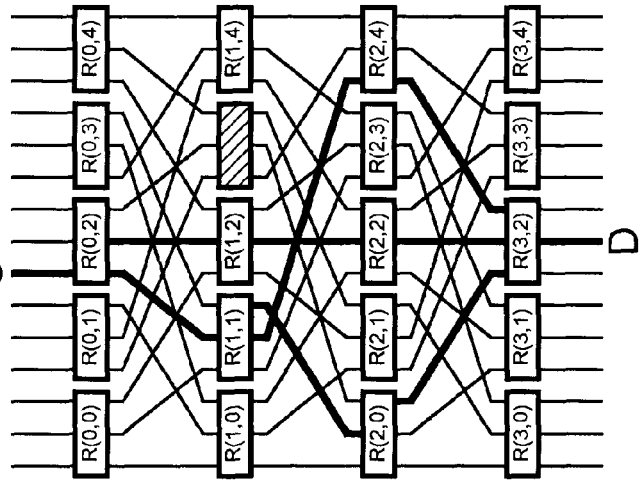
FIG. 60A and FIG. 60B show how path redundancy in a scalable switching network leads to fault tolerance.
Figure 60A:
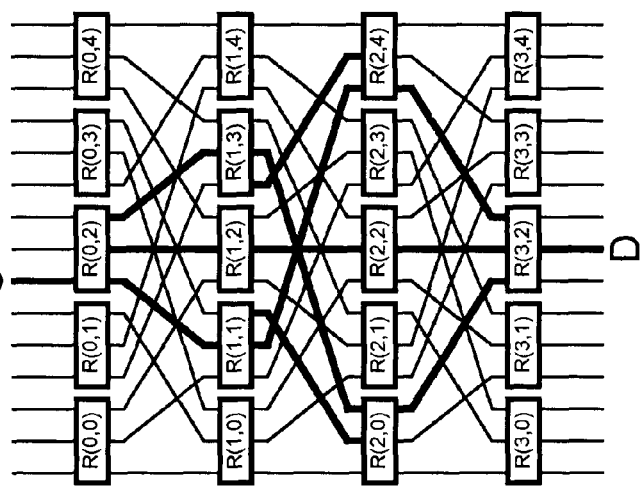

Suppose a breakdown occurs in switching element R(1,3) which is denoted by a hatched switching element in FIG. 60B. The neighboring switching elements R(0,1), R(0,2) and R(0,4) in stage 0, as well as switching elements R(2,0), R(2,1) and R(2,4) in stage 2, can become aware of the breakdown of switching element R(1,3) through a network management protocol. Once these switching elements remove R(1,3) from their own routing tables, the rest of the switching elements in the switching network become aware of the breakdown through the use of a dynamic routing protocol, which exchanges routing information with its neighbors. Using the example of FIG. 60B, there are now three paths (shown in bold) available from port S to port D. With the new updated routing information, switching element R(0,2) recognizes only two paths out of switching element R(0,2) that can reach port D.

When a multistage switching network such as a Banyan or crossover network is expanded, a new stage must be added as well as a doubling of its width. Adding a new stage requires that half of the external connections be disconnected in the process. This leads to an interruption in service.

Figure 11:
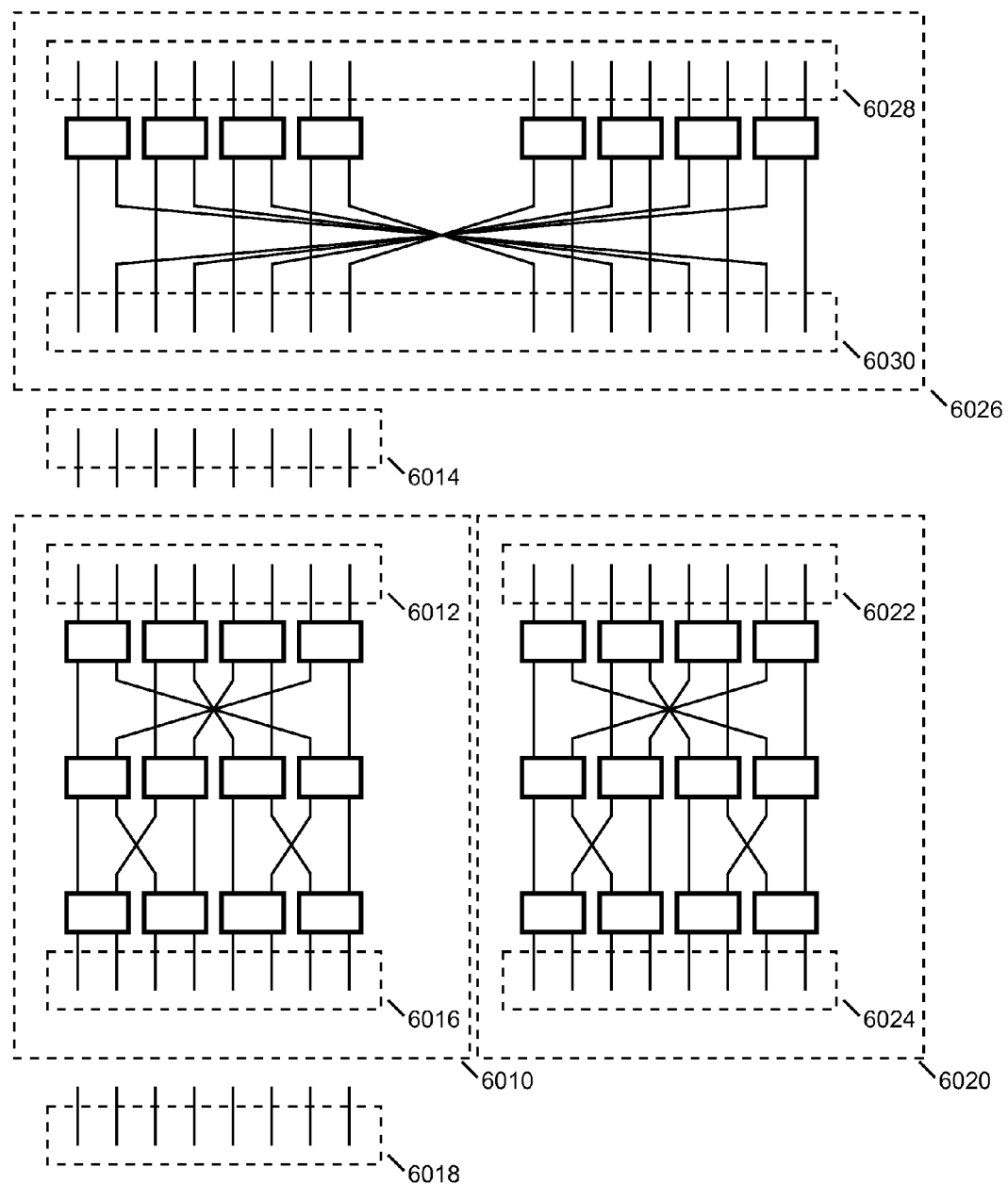
FIG. 11 shows a 32 port binary Butterfly multistage switching network with four stages.

A crossover network 6010 is shown in FIG. 11 with top ports 6012 connected to external connections 6014 and bottom ports 6016 connected to external connections 6018. A duplicate of this network 6020 with top ports 6022 and bottom ports 6024. A new stage 6026 with top ports 6028 and bottom ports 6030 are also shown.

In order to double number of external connections of the crossover network 6010, the connections between the top ports 6012 and external connections 6014 have to be broken and connected to the left half of new stage bottom ports 6030, and the external connections 6014 have to be connected to the left half of new stage top ports 6028. To complete the upgrade, the duplicate network top ports 6022 are connected to the right half of new stage bottom ports 6030. At this point, duplicate network bottom ports 6024 and right half of new stage top ports 6028 would be available for new external connections.

The problem is that the connections between the original network top ports 6012 and external connections 6014 have to be disconnected in the process. This leads to an interruption in service.

Figure 1A:
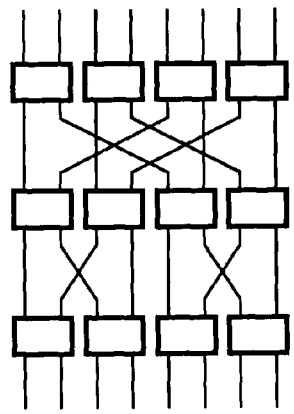
FIG. 1A shows a 16-port binary Banyan multistage switching network with three rows.
Figure 1B:
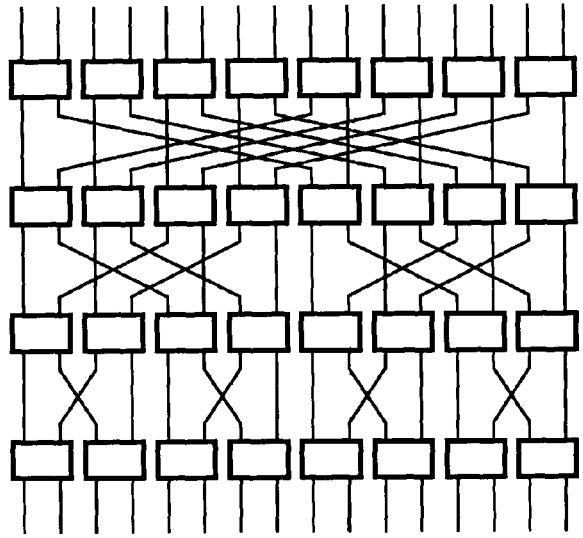
FIG. 1B shows a 32-port Banyan multistage switching network with four rows.
Figure 1C:
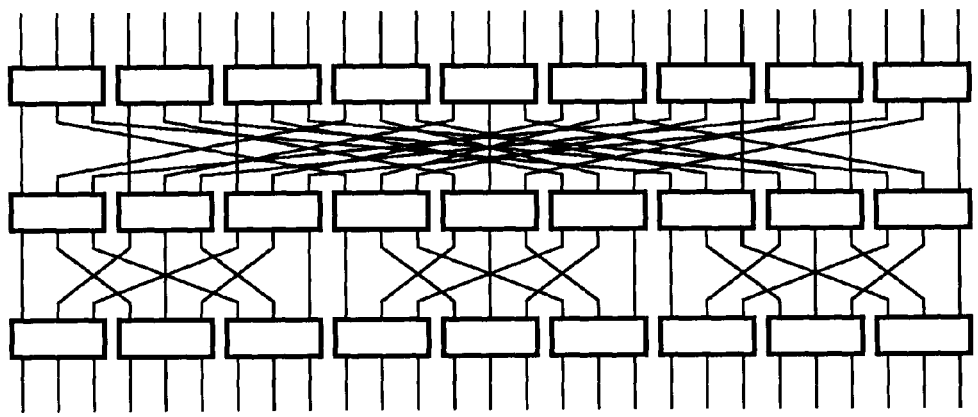
FIG. 1C shows a 54-port trinary Banyan multistage switching network with three rows.
Figure 1E:
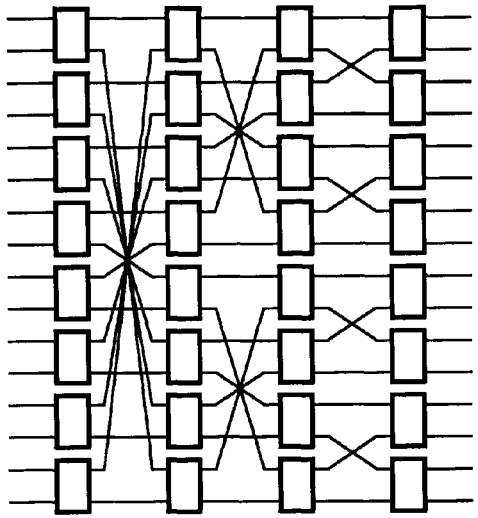
FIG. 1E shows a 32-port crossover multistage switching network with four rows.
Figure 1G:
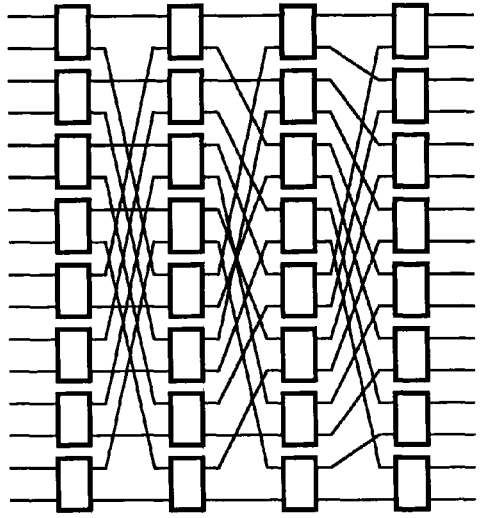
FIG. 1G shows a 32-port BOP multistage switching network with three four rows.
Figure 1D:
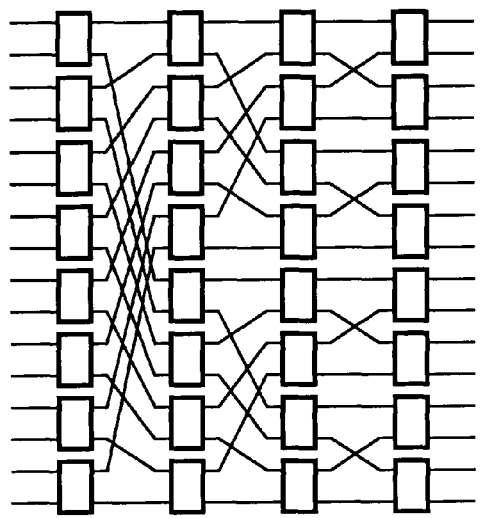
FIG. 1D shows a 32-port delta multistage switching network with four rows.
Figure 1F:
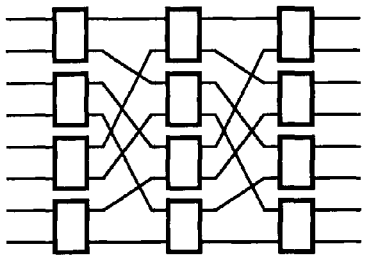
FIG. 1F shows a 16-port omega multistage switching network with three rows.
Figure 2B:
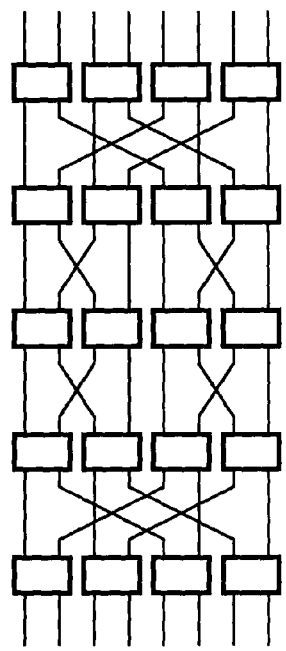
FIG. 2B shows a reconfigured 16-port Benes network that comprises two Banyan networks.
Figure 2D:
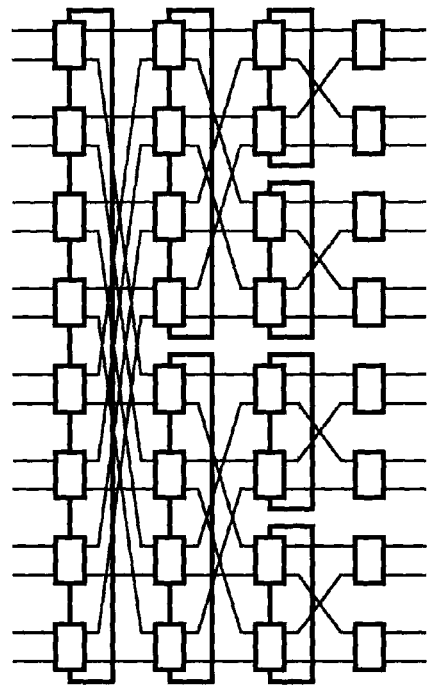
FIG. 2D shows a 32-port augmented shuffle-exchange network.
Figure 2A:
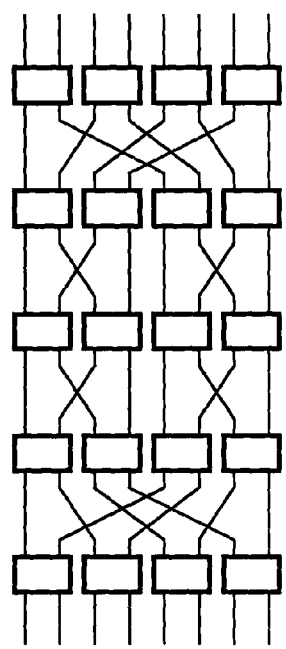
FIG. 2A shows a 16-port Benes network
Figure 2C:
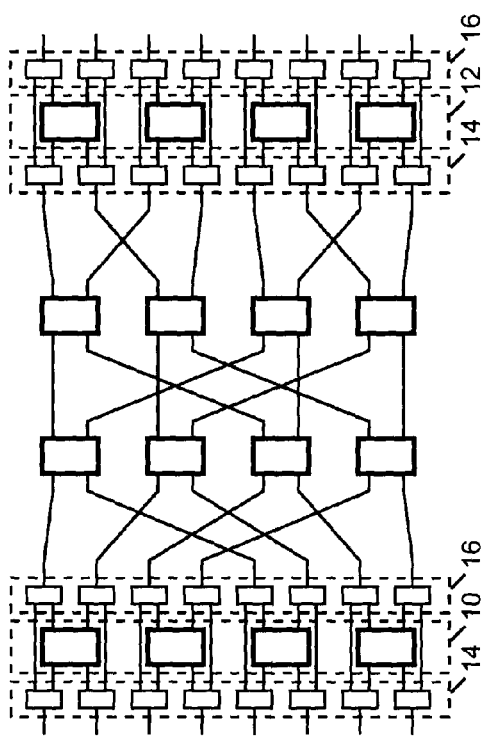
FIG. 2C shows a 16-port extra stage cube network.
Figure 3A:
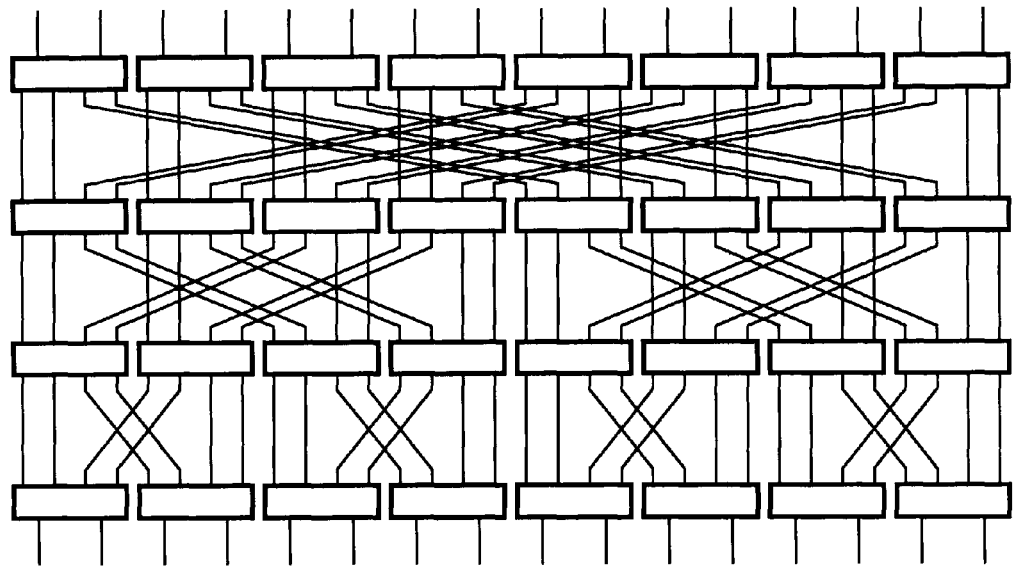
FIG. 3A shows a dilated Banyan network.
Figure 3B:
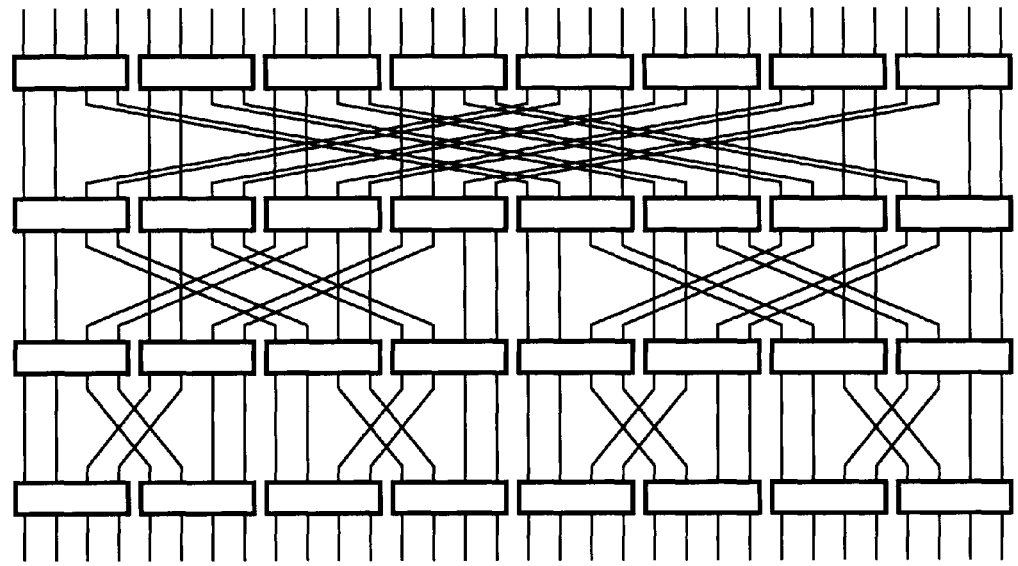
FIG. 3B shows a dilated Banyan network with 32 external ports added.
Figure 4A:
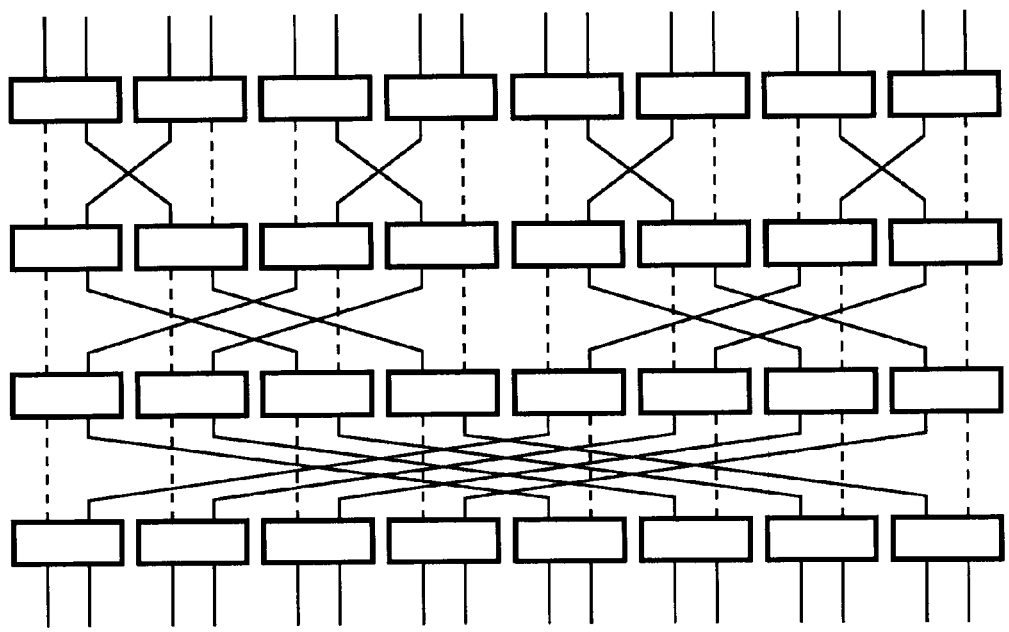
FIG. 4A shows an inverted 32-port Banyan network.
Figure 4B:
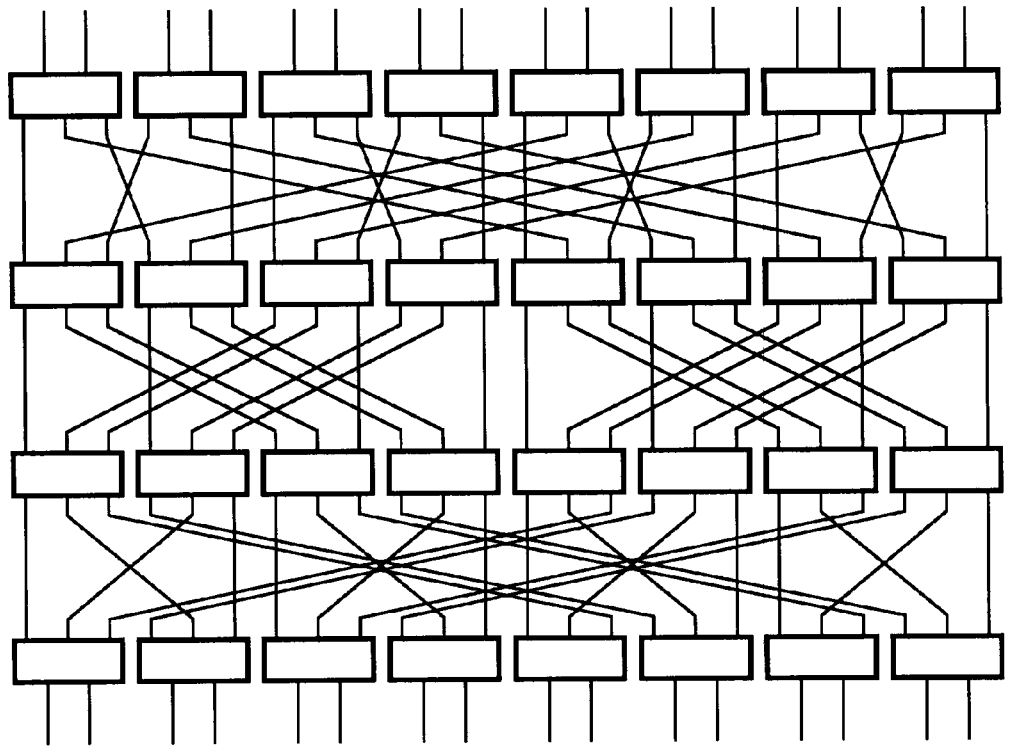
FIG. 4B shows a Banyan network overlaid on an inverted Banyan network.

As indicated above, in order for a crossover network or other radix two network to be upgradeable by adding an extra stage, it must simultaneously be expanded by width. Though many multistage switching networks are defined as radix two, many of those networks, such as the Banyan and delta networks, have a generalized radix architecture leading to arbitrary fanouts. This leads to the question as to whether or how one would upgrade from one radix to another. For example, can a 16-port binary Banyan network such as the one depicted in FIG. 1A be upgraded to the 54-port trinary Banyan network depicted in FIG. 1C by increasing the fanout of the switching elements from two to three, since both networks have the same number of stages?

There is no known investigation of the process of upgrading the fanout of Banyan networks. There are two likely reasons why such an upgrade path is undesirable. First, most implementations of switching networks using the Banyan architecture employ specific binary sorting algorithms to route traffic. Second, an upgrade of an n-stage $2^{n+1}$-port binary network to an n-stage $2\times3^n$-port trinary network or n-stage $2\times4^n$-port quaternary network would entail an exponential growth in the number of ports required. For example, the 3-stage networks discussed above would involve an upgrade from a 16-port binary network to a 54-port trinary network to possibly the 128-port quaternary network. For a 4-stage network, this upgrade path would progress from a 32-port binary network to a 162-port trinary network to a 512-port quaternary network. For a 5-stage network, this upgrade path would progress from a 64-port binary network to a 486-port trinary network to an astronomical 2048-port quaternary network. Given that these are among the smallest upgrade scenarios, it is likely there would be little need for such upgrades. However, with the methods disclosed below and in U.S. Pat. No. 7,075,942, such an upgrade can be performed if desired.

There are many processes involving redundant multistage networks which require the rewiring of ISIC networks, including but not limited to upgrades (width, stage, fanout, and combination of these), downgrade (i.e. the reverse process of upgrades), and reconfiguration between architectures. With suitable redundancy, these processes can be performed without interruption of service and with minimal degradation of service during the upgrade/reconfiguration process. Rather than cite all occurrences of upgrade with the compound expression upgrade/reconfiguration the term upgrade and reconfiguration are used interchangeably. It should be understood that either term should be construed to include any combination of upgrading, downgrading and reconfiguring of a scalable switching network.

It should be noted that the use of a dynamic routing protocol such as those mentioned above, along with a network management protocol which can detect failures, can enable the reconfiguration procedures to be performed on switching networks with sufficient redundancy without loss of functional connectivity. In a practical setting, an upgrade or reconfiguration can be performed in a contemplative and deliberate manner, rather than rushing to perform and upgrade during a limited scheduled maintenance window.

As a prerequisite to the reconfiguration process, it is often useful to have a post-reconfiguration switching network design, also referred to as a post-reconfiguration architecture, already derived so that during the reconfiguration process, the implementer of the process is aware of where each port is connected to in the pre-reconfiguration switching network and the post-reconfiguration switching network. In the event that the reconfiguration involves the removal of a stage, an intermediate reconfiguration switching network design, also referred to as an intermediate reconfiguration architecture, should also be derived. The intermediate reconfiguration architecture is best described by working backwards from the post-reconfiguration architecture and "splicing in" the stage that is being removed with the splicing process is set forth below. In the description of the reconfiguration process, whenever the post-reconfiguration switching network is mentioned, it should be construed to also include the intermediate reconfiguration network unless explicitly excluded.

Furthermore, when discussing connectivity in the post-reconfiguration switching network (or the intermediate reconfiguration network depending on context), it is useful to refer to a given port's corresponding port as the port to which the given port is connected to in the post-reconfiguration switching network. That is, a bottom port's corresponding port is the top port which connects to that bottom port in the post-reconfiguration switching network. Similarly, a top port's corresponding port is the bottom port which connects to that top port in the post-reconfiguration switching network.

Figure 12:
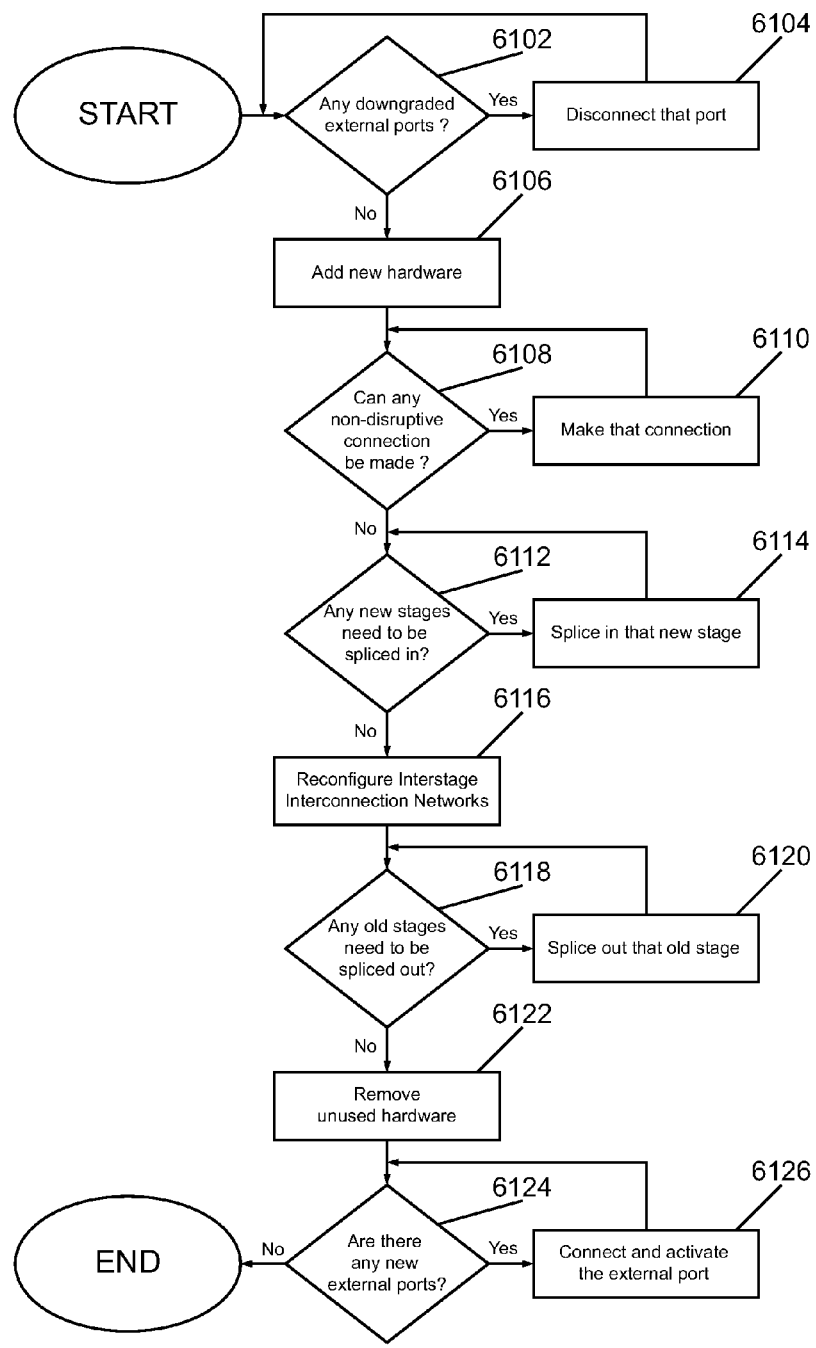
FIG. 12 shows the flowchart for the reconfiguration process between a pre-reconfiguration architecture and a post-reconfiguration architecture.

Though the following embodiment depicts the process in a certain order, many of the steps can be interchanged in order. FIG. 12 depicts the overall reconfiguration process. The process begins by determining at step 6102 whether there are any of the external ports that are to be removed during the reconfiguration process; if so, they are deactivated and disconnected at step 6104. These "downgraded" external ports, for example, can be coupled to switching elements which are being removed, or they can be removed as part of a fanout downgrade.

Figure 13:
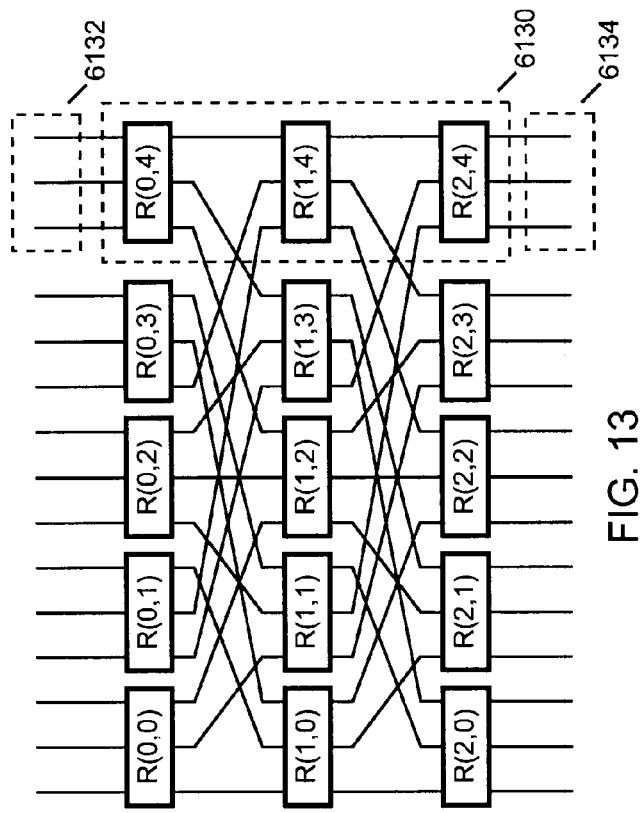
FIG. 13 shows a 30-port RBCCG switching network with 6 external ports attached to switching elements that are to be removed as part of a downgrade process.

For example, FIG. 13 shows a balanced RBCCG switching network being downgraded from a width of 5 switching elements per stage to 4 switching elements per stage. Column 6130 is the column of switching elements to be removed. External connections 6132 and 6134 therefore must be disconnected from their external connections as dictated by this step.

After all the downgraded external ports have been deactivated and disconnected, add new hardware is added at step 6106. It is not necessary to all new hardware at this point in the process and certainly hardware can be added as it is used. From the logical point of view, all hardware should be recognized as for where it is to be added in the post-reconfiguration switching network, that is, if the width is being upgraded, each switching element should be designated a position within each stage, or if the fanout is being downgraded which port is being ultimately removed should be designated. In one embodiment of the process, as soon as hardware is added to the switching network, it is activated so that traffic can be relayed by the new hardware even during the reconfiguration process.

Figure 14A:
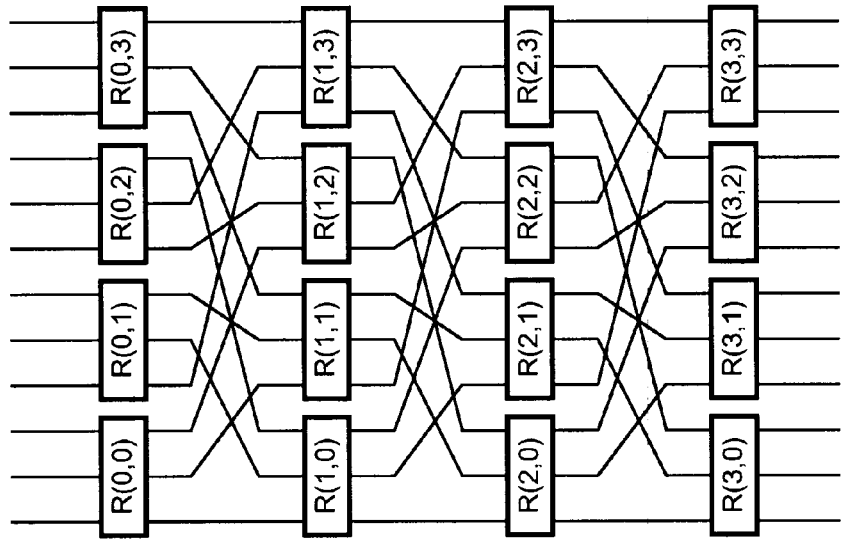
FIG. 14A, FIG. 14B, and FIG. 14C demonstrate the pre-configuration step while upgrading a 24-port RBCCG switching network to a 30-port RBBCG switching network.
Figure 14C:
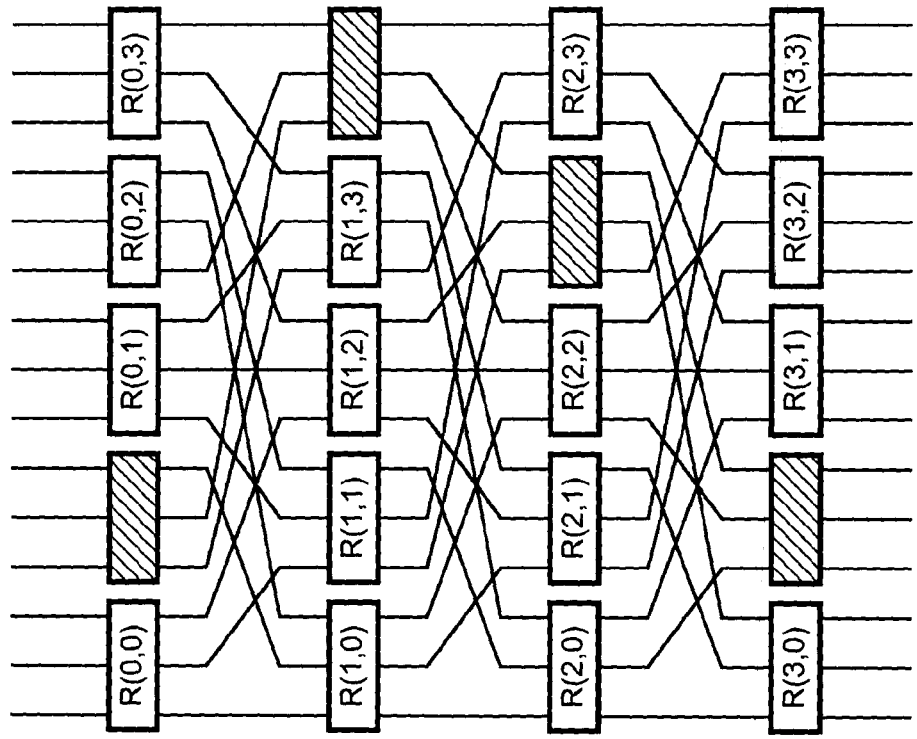
Figure 14B:
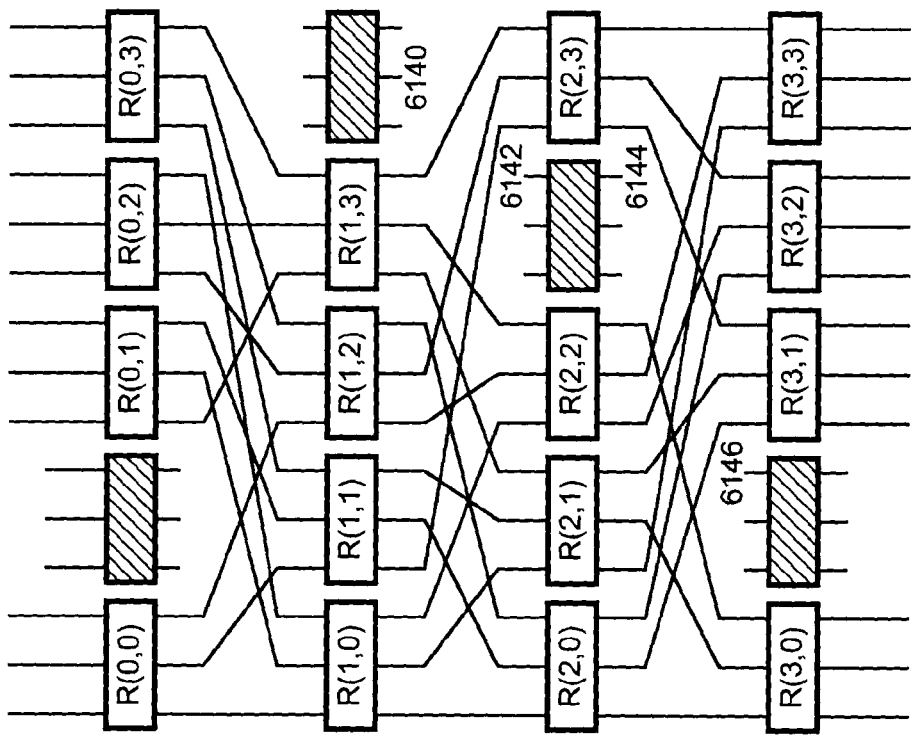

For example, FIG. 14A represents a 4 stage balanced RBCCG switching network that is to be upgraded from a width of 4 switching elements per stage to a width of 5. In accordance with this step, the hatched switching elements are inserted as shown in FIG. 14B. The post-reconfiguration switching network is shown in FIG. 14C.

Returning to FIG. 12, at step 6108 and step 6110, the optional step of pre-connecting unused ports is performed. At step 6108, a determination is made as to whether any of the unused ports can be connected to another unused port, that is, whether a port is unused as well as its corresponding port. Though optional, the pre-connection of these ports improves the path redundancy of the switching network, leading to better switching service during the reconfiguration process. The pre-connection step is described in greater detail below. Furthermore to bolster fault tolerance, one embodiment of this step connects an unused port to any other unused port.

At step 6112 and step 6114, any new stages that are added are spliced in. The splicing step is described in greater detail below.

At step 6116, all the ISIC networks are reconfigured, that is, they are rewired in accordance with the post-reconfiguration switching network or the intermediate reconfiguration switching network if the reconfiguration process involves a stage removal. During the rewiring step connections are described a broken, but in actuality it can be necessary to divert traffic away from the ports coupled to the connection. Often, the ports coupled to the connection can be shutdown or stopped. While decoupled from one port the connection can be moved to another port leaving the other end of the connection coupled to another port though the stage of the connection is that of being disconnected. Regardless the physical requirements, the rewiring process at the high level is described in terms of breaking connections and establishing connections. Additional steps are given at a lower level description of the process.

At step 6118 and step 6120, any stages that need to be removed are "spliced out." This operates in the reverse fashion as the splicing step described above.

At step 6122, all unused hardware can be removed. Regardless of physical removal, the unused hardware can no longer operate with the switching network.

At step 6124 and step 6126, any new external ports created through the reconfiguration process can be coupled to external connections and traffic is permitted to flow through them.

It should be noted that equivalences exist in the detail embodiments of reconfiguration process set forth below. For example, the mirror image of a network could be used or an upside down version, or other spatial transformation, rendering the choice of top or bottom, left or right somewhat arbitrary. For clarity in the embodiments below, a direction is selected so that the embodiments of the process can be demonstrated in detail.

Figure 15:
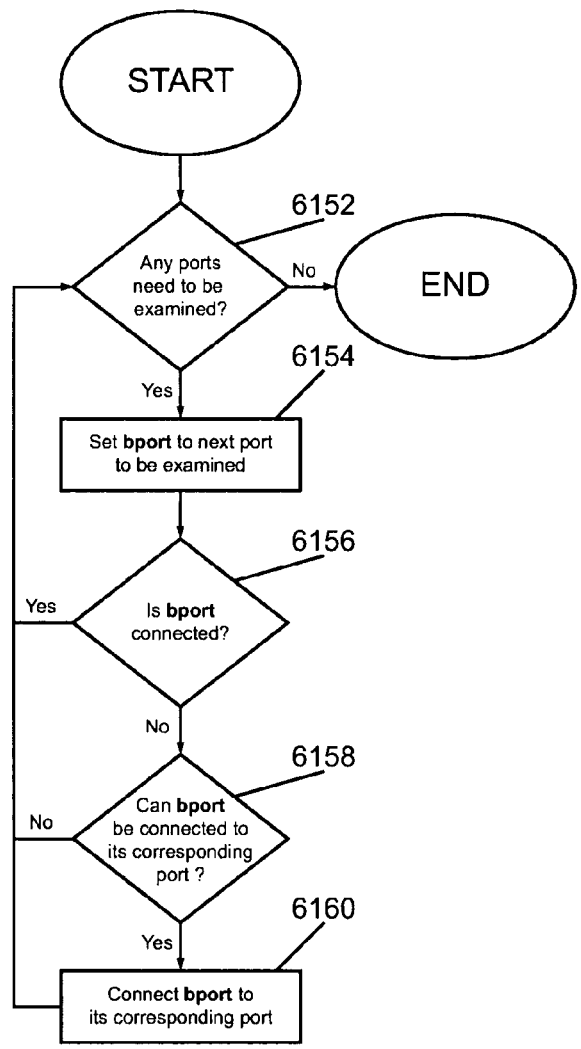
FIG. 15 shows the flowchart for the pre-configuration step used in the reconfiguration process.

FIG. 15 illustrates in detail the pre-connection step. At step 6152, a determination is made as to whether all bottom ports have been examined. At step 6154, a bottom port bport is selected according to an ordering. If bport is not connected to anything as determined at step 6156 and if bport's corresponding port is not connected to anything as determined at step 6158, bport is connected to its corresponding port in step 6160. Basically, this process selects a bottom port (or equivalently a top port), and it determines whether a connection can be made without breaking an existing connection. If so, that connection is made, then the process repeats until every bottom port has been examined. A common method of ordering the bottom ports is a raster scan order, where the bottom ports of the stages from top to bottom are examined, and from left to right within each stage. Though raster scan order is given as an example, the order of examination is arbitrary.

For example, in the upgrade described above where a switching network shown in FIG. 14A is upgraded to the post-reconfiguration switching network shown in FIG. 14C. It can be determined that bottom port 6140 and its corresponding port 6142 are both unused; therefore, they can be connected without any negative impact on the switching network. It can also be determined that top port 6146 and its corresponding port 6144 are both unused; therefore, they can also be connected without any negative impact on the switching network. It should also be noted that no such determinations can be made between stage 0 and stage 1.

Figure 16:
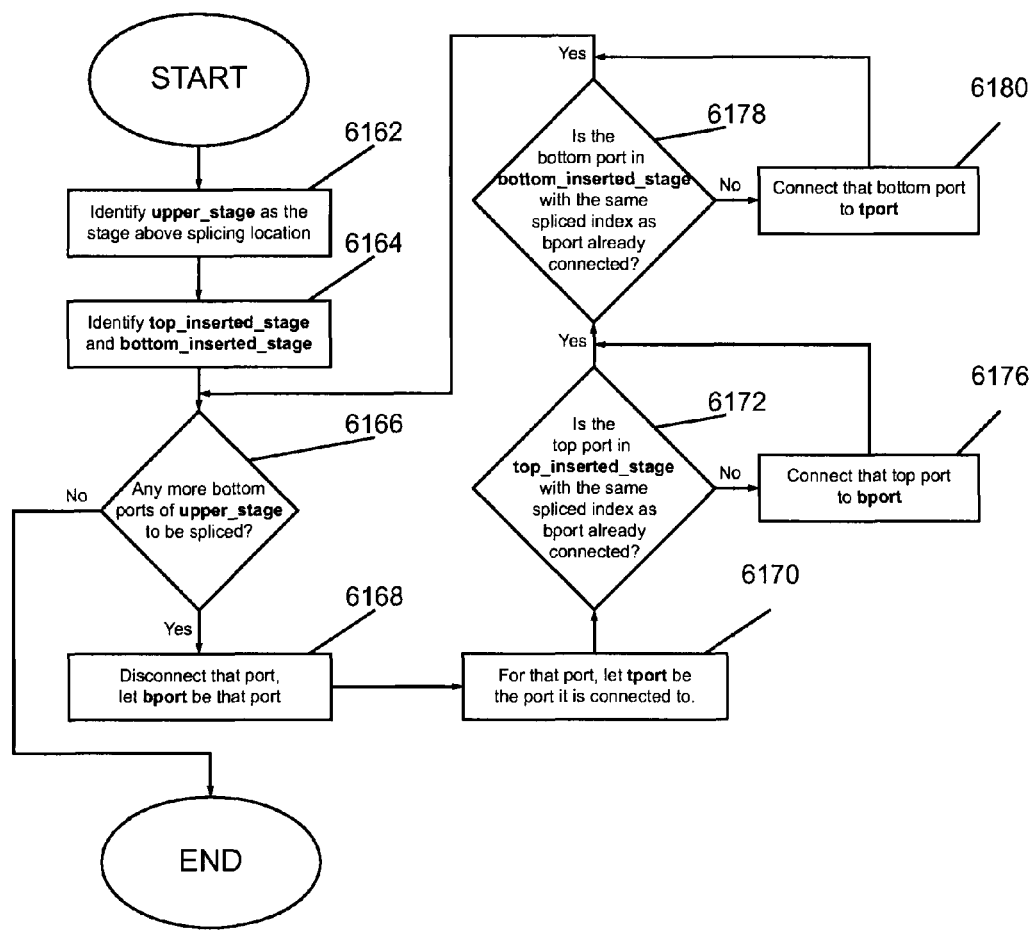
FIG. 16 shows flowchart for the splicing step used in the reconfiguration process.
Figure 17A:
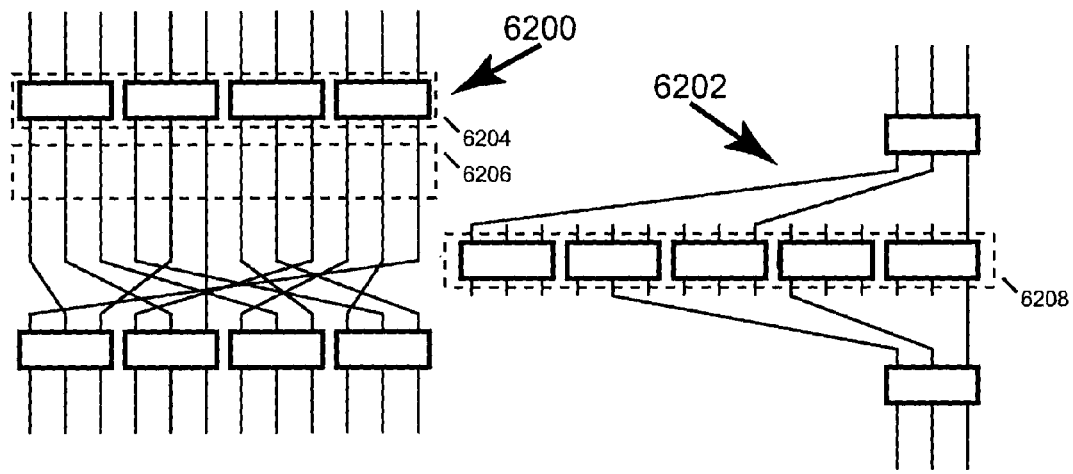
FIG. 17A, FIG. 17B, FIG. 17C, FIG. 17D show the splicing step, where new stages of switching elements are inserted into an existing architecture.

FIG. 16 illustrates in detail the splicing step. At step 6162, the location of the splice is selected and the stage above the splice location is labeled upper_stage. In FIG. 17A, two stages of a multistage switching network 6200 with a collection of pre-connected switching elements 6202 are prepared for splicing into switching network 6200, whereby stage 6208 is the stage to be spliced. The splicing location is indicated at 6206, and stage 6204 is designated as upper_stage.

At step 6164, the top stage and bottom stage of the new switching elements are identified as top_inserted_and bottom_inserted_stage. In the example in FIG. 17A, only one extra stage is added, so top_inserted_stage and bottom_inserted_stage are identified with stage 6208. In a second example in FIG. 17C, a two stage switching network 6222 is spliced into switching network 6220 at the position indicated by 6224. Stage 6226 is designated as the upper_stage. In this example, stage 6228 is designated as the top_inserted_stage and stage 6230 is designated as the bottom_inserted_stage.

At step 6166, the bottom ports of upper_stage are each spliced in, and the splicing process is repeated until all bottom ports of the upper_stage are spliced. The order of operation is arbitrary, but can include splicing the bottom ports from left to right.

At step 6168, the bottom port being spliced is labeled bport and is disconnected, and at step 6170, the top port that bport is connected to is labeled tport. For the splicing process, it is useful to define the splice index of a port as its position in the stage. For example, port 2 of switching element 1 where the switching elements have a fanout of 3 has a splice index of 4.

At step 6172, a determination is made as to whether the top port in top_inserted_stage with the same splice index as bport is connected (possibly from the pre-connection step). If it is not, that top port is connected to bport in step 6176.

A determination is made as to whether the bottom port in bottom_inserted_stage with the same splice index as bport is connected (possibly from the pre-connection step) at step 6178. If it is not, that bottom port is connected to tport in step 6180.

Figure 17B:
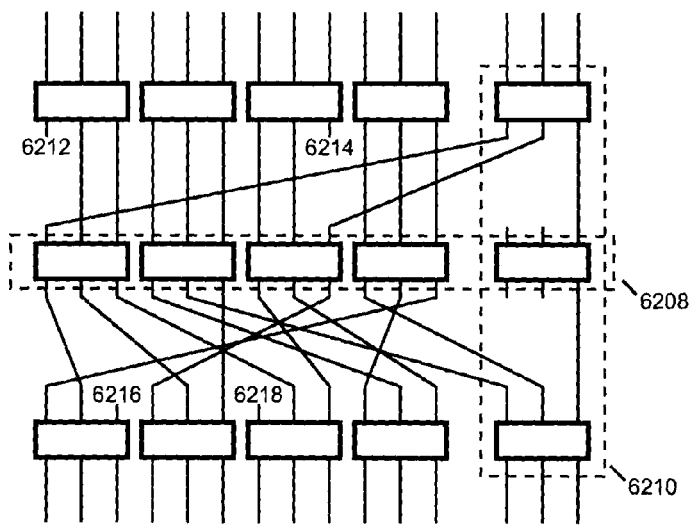
Figure 17C:
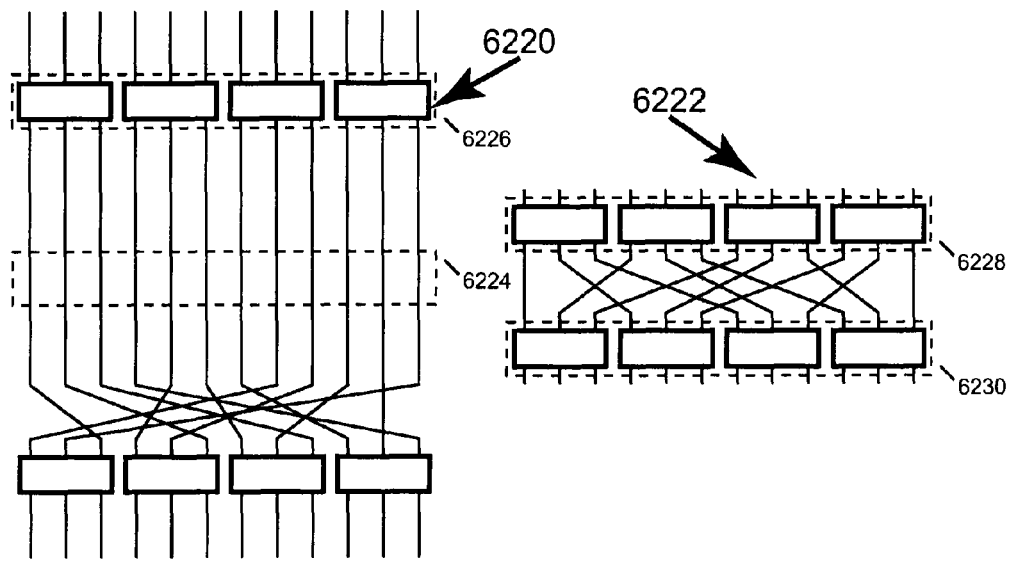

These steps are repeated until all bottom ports of upper_stage are spliced in. FIG. 17B shows the result of the completed splicing step. It should be noted that bottom ports 6212 and 6214 are not connected because port 6212 would have been connected to top port 0 of switching element 0 of stage 6208, which was connected previously in the pre-connection step. Likewise, port 6214 would have been connected, to top port 2 of switching element 2 of stage 6208 which was connected previously in the pre-connection step. In addition, top ports 6216 and 6218 are not connected, because top port 6216 would have been connected to bottom port 1 of switching element 1 of stage 6208, and top port 6218 would have been connected to bottom port 1 of switching element 3 of stage 6208, but both bottom ports were connected previously in the pre-connection step.

Figure 17D:
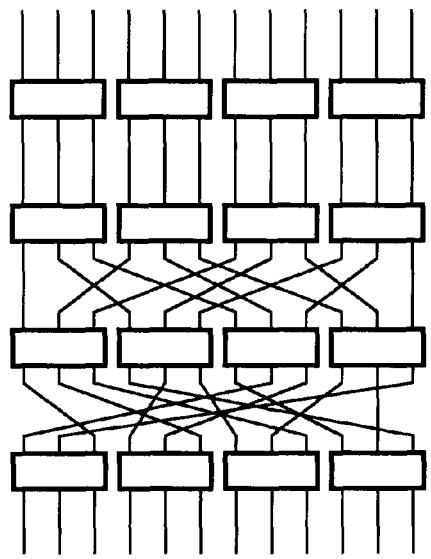

FIG. 17D shows the result of the complete splicing step into switching network 6220. In contrast, the result of this splicing is that all bottom ports in upper_stage are connected.

Figure 20A:
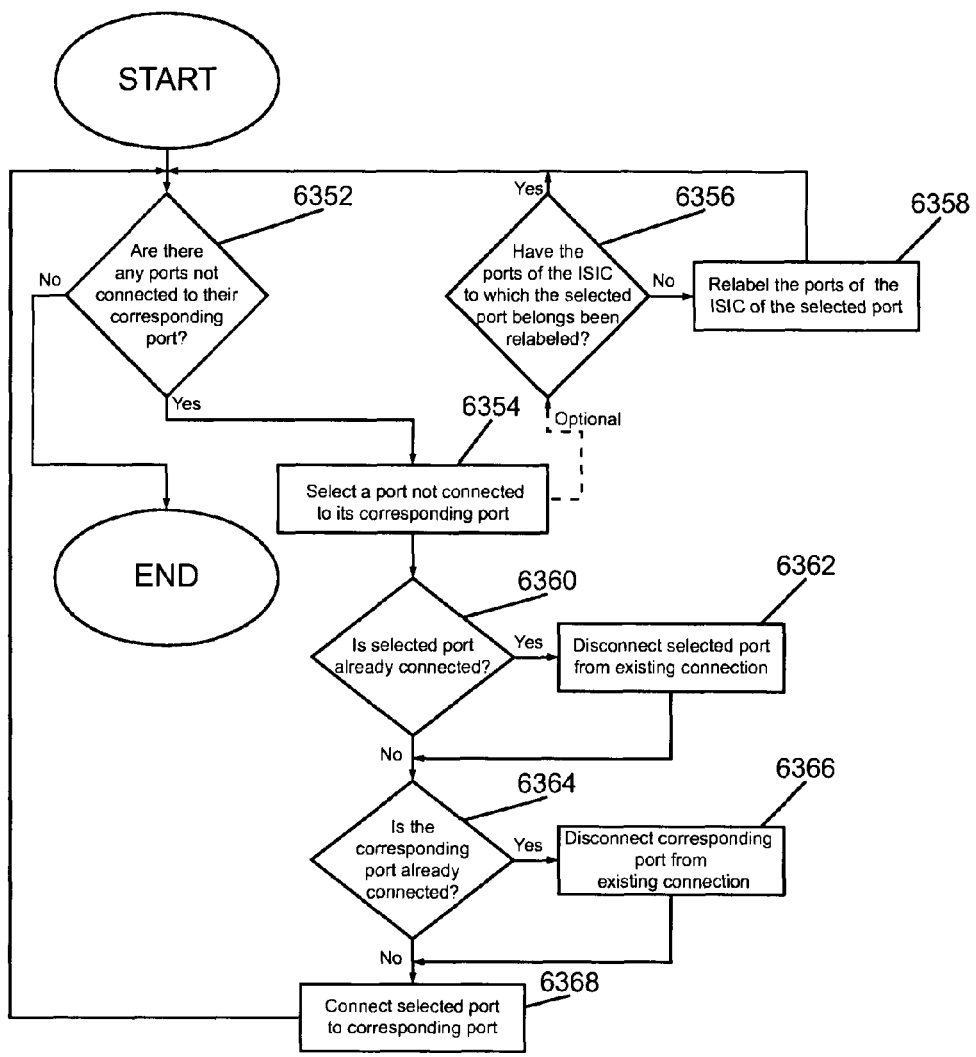
FIG. 20A and FIG. 20B show the flowcharts for the rewiring step used in the reconfiguration process.

The rewiring step which reconfigures all the ISIC networks to the post-reconfiguration architecture can be the most elaborate step in the reconfiguration process. There are many specific embodiments, some of which are disclosed here. FIG. 20A is a flow chart that diagrams the basic algorithm. At step 6352, a determination is made as to whether there are any ports not connected to their corresponding port; if none are found the rewiring step is complete. If there are such ports, one is selected at step 6354, and optionally, ports belonging to the ISIC network to which the selected port belong can be relabeled. In this context, a port belonging to the ISIC network to which a given port belongs means that if a given port is a bottom port, then all ports that are bottom ports of the same stage as the given port belong to the ISIC network; furthermore, all top ports of the stage below the stage to which the given port belongs also belong to the ISIC network. Similarly, if a given port is a top port, then all ports that are top ports of the same stage as the given port belong to the ISIC network; furthermore, all bottom ports of the stage above the stage to which the given port belongs also belong to the ISIC network. The relabeling step is described in detail below. In principle, the incremental substeps of the relabeling step can be interspersed with the incremental substeps of the remaining rewiring process. If no relabeling is performed, a determination is made at step 6360 as to whether the selected port is already connected; if so, it is disconnected in step 6362. Subsequently at step 6364, a determination is made as to whether the selected port's corresponding port is connected; if so, the corresponding port is disconnected at step 6366. Finally, the selected port is connected to its corresponding port, in effect rewiring the selected port. The process then repeats, until all ports are connected to their corresponding port. FIG. 20A details this rewiring process.

The selection of the port at each iteration can be accomplished by a variety of methods. For example, before the rewiring step, a list of all ports that are not connected to their corresponding port can be made, and the port selection follows that list by checking ports off as they are connected to their corresponding port.

Figure 20B:
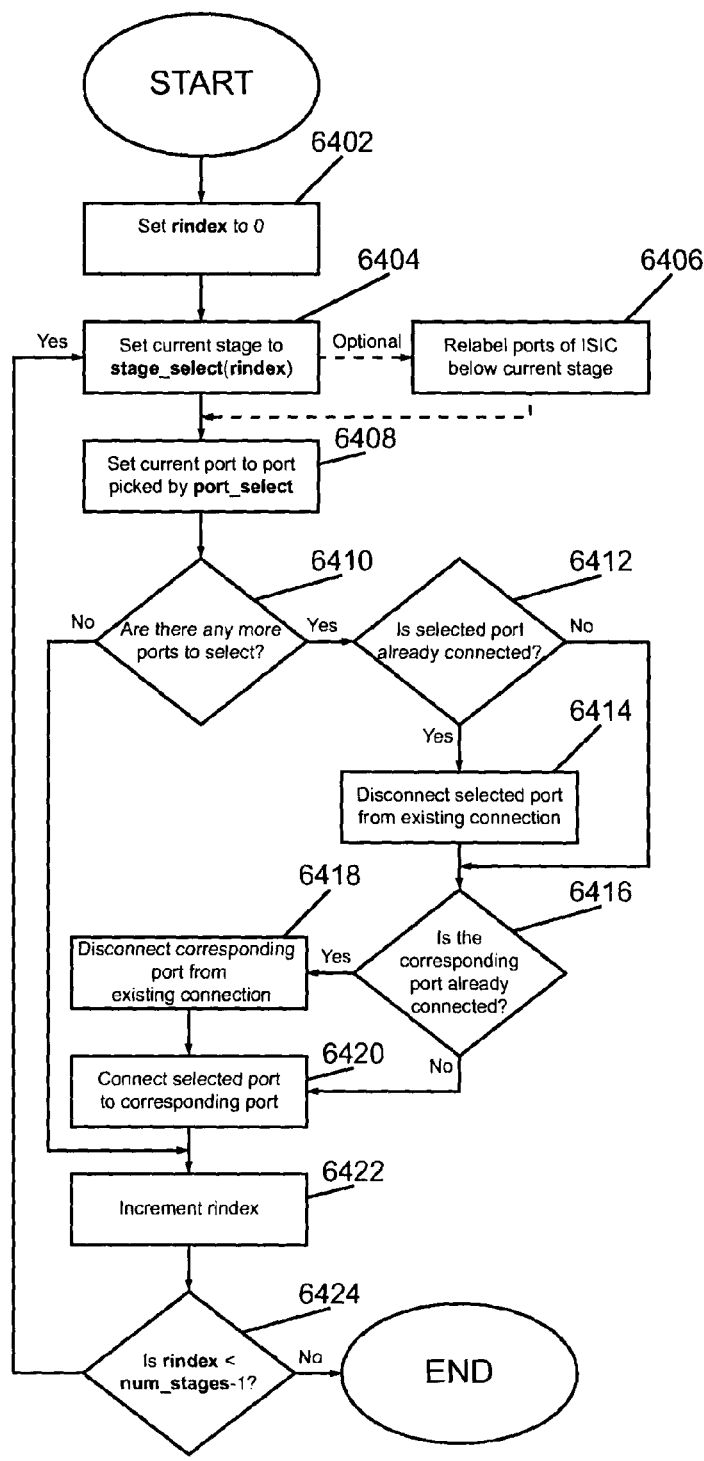

FIG. 20B breaks the process into a stage by stage rewiring. There is an index variable used to count the stages called rindex, which is initialized to zero at step 6402. At step 6404, a stage is selected by the function stage_select to be the current stage being rewired. Optionally, the ISIC network below the current stage is relabeled as set forth below. Next, at step 6408, the current port is selected by the function port_select. Typically the port_select function selects a bottom port of the current stage or a top port of the stage below the current stage. At step 6410, a determination is made as to whether there are any more bottom ports in the current stage or top ports in the stage below to select. If not, the rewiring step jumps ahead to step 6422. Otherwise, a determination is made at step 6412 as to whether the selected port is connected. If so, it is disconnected in step 6414. At step 6416, a determination is made as to whether the selected port's corresponding port is connected. If so, the corresponding port is disconnected at step 6418. At step 6420, the selected port is connected to its corresponding port. The process then repeats by returning to step 6404 until there are no more ports to be selected according to 6410. In this case, step 6422, the rindex variable is incremented and the process repeats for another stage until all the stages have been selected as determined in step 6424. Since each iteration on rindex represents the rewiring between the current stage and the stage below the current stage, the bottom most stage is never selected and the rindex variable never exceeds num_stages-1.

The relabeling substep within the rewiring step logically rewires a switching element rather than physically rewiring a switching element when conditions permit. For example, if bottom port 0 of a switching element is supposed to be connected to another switching element in the stage below, but bottom port 1 actually is connected to that switching element, it would be convenient to swap the two ports. Since the port numbering is performed logically, renumbering can be performed logically.

Figure 19A:
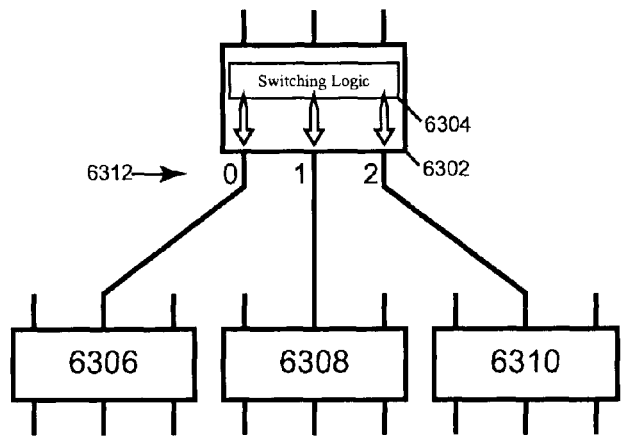
FIG. 19A and FIG. 19B show conceptually how ports might be relabeled to form the effect of exchanging two ports on the same switching element.
Figure 19B:
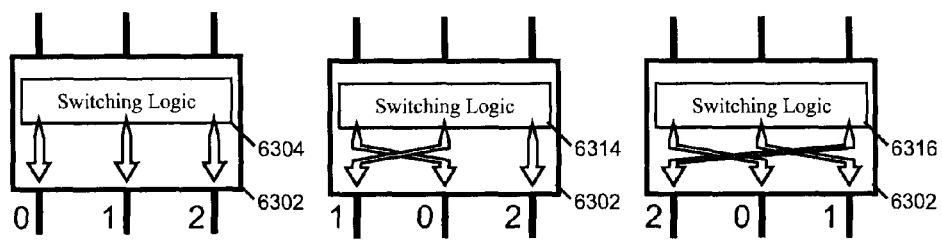
Figure 19C:
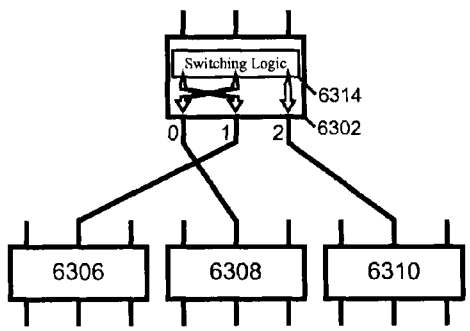
FIG. 19C and FIG. 19D show the logical effect of conceptually how ports might be relabeled to form the effect of exchanging two ports on the same switching element.
Figure 19D:
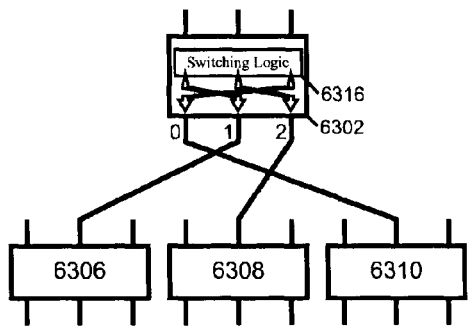

For example, FIG. 19A shows a switching element 6302 having switching logic 6304, and connected to switching elements 6306, 6308 and 6310. The logical port numbers are indicated at 6312. In FIG. 19B, the switching logic is reconfigured. For example, switching logic 6314 now reverses bottom port 0 and bottom port 1. Switching logic 6316 permutes all three bottom ports to the numbering indicated. By reconfiguring switching element 6302 to switching logic 6314, the logical connectivity of the four switching elements depicted in FIG. 19A becomes that depicted in FIG. 19C. Similarly, reconfiguring switching element 6302 to switching logic 6316 yields a logical connectivity as depicted in FIG. 19D.

Figure 18:
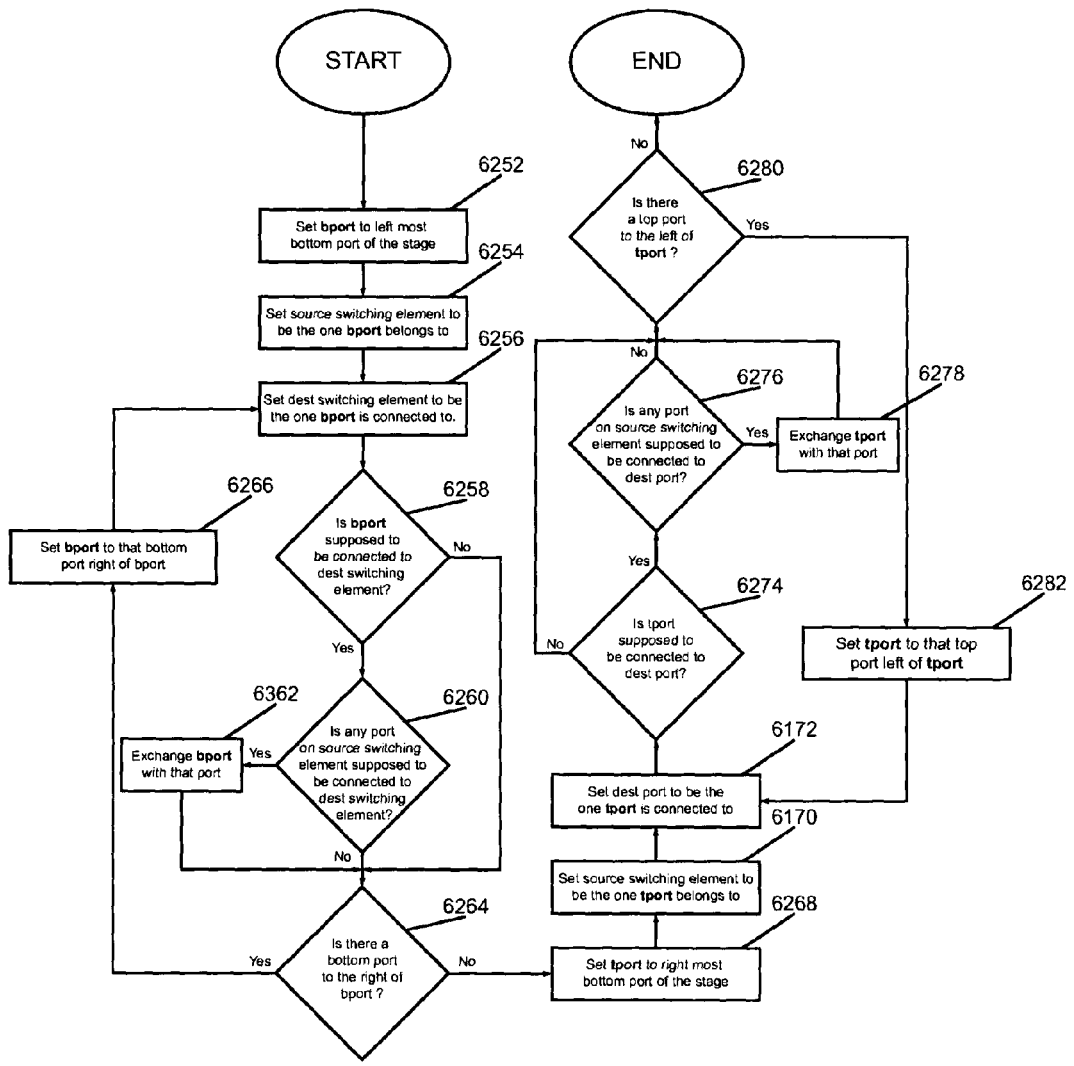
FIG. 18 shows flowchart for the relabeling phase used in the rewiring step.

This example illustrates the method of implementing a logical relabeling. FIG. 18 is a flowchart describing how it can be employed in relabeling the ports attached to an ISIC network. The relabeling step described in FIG. 18 applies only to a single ISIC network which is given by the stage attached directly above the ISIC network. At step 6252, bport is set to the leftmost bottom port of the stage. At step 6254, the source switching element is defined to be the switching element to which bport is attached. At step 6256, the destination switching element is defined to be the switching element to which bport is connected to, if connected at all. If bport is supposed to be connected to the destination switching element, i.e., its corresponding port belongs to the destination switching element as determined in step 6258, then no relabeling is performed, thereby ending this iteration. Otherwise, if any port on the sources switching network is supposed to be connected to the destination switching element as determined in step 6260, then that port is logically swapped with bport. At step 6264, the iteration ends and repeats by setting bport to the bottom port right of the old bport value at step 6266 unless bport is determined at step 6264 to be the rightmost bottom port of the stage. This concludes the first phase of the relabeling step. The second phase begins at step 6268, where tport is set to the rightmost top port of the stage below the one given to the relabeling method (call it the subsequent stage as a shorthand). At step 6170, the source switching element is set to be the switching element tport belongs to. At step 6172, the destination port is set to be the port tport is connected to. It should be noted here that the first phase insures that the bottom ports are connected to the correct switching element in the subsequent stage. Now, the objective is to insure the correct top port on the subsequent stage is connected to the correct port, i.e., its corresponding port. At 6274, a determination is made as to whether tport is supposed to be connected to its destination port, i.e., the destination port is tport's corresponding port. If so, that ends this iteration at step 6280. Otherwise, a determination is made as to whether any port on the source switching element has a corresponding port matching the destination port at step 6276. If so, that port is logically swapped with tport at step 6278. The iteration ends at 6280, and repeats by setting tport to the top port left of the old tport value at step 6282 unless tport is determined at step 6280 to be the leftmost bottom port of the subsequent stage, in which case the relabeling phase for the stage is complete.

It should be noted that though scanning bottom ports from left to right and top ports from right to left is used in FIG. 18, the ordering is arbitrary. Linear scanning such as left to right and vice versa are simpler to implement in software.

Figure 21A:
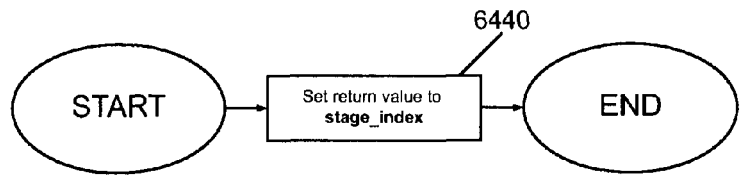
FIG. 21A and FIG. 21B show the flowcharts for two embodiments of the stage selection subroutines used in the rewiring step.
Figure 21B:
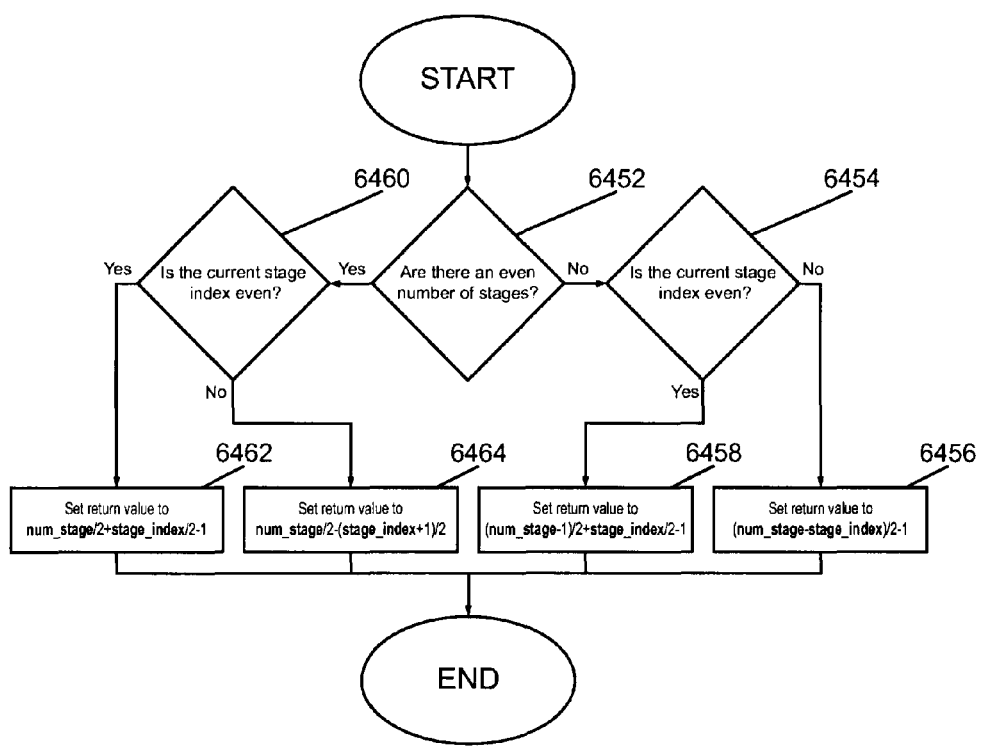

As described above, the embodiment of the rewiring step depicted in FIG. 20B requires two subroutines stage_select and port_select. The purpose of the stage_select subroutine is to offer an order of rewiring the ISIC networks. By convention, the term rewiring a stage actually refers to rewiring the ISIC network coupled directly below the stage, rather than specifying an ISIC network by referring to it as the ISIC network located between stage n and stage n+1. The purpose of the port_select subroutine is to select a port "within the ISIC network," that is more precisely to select from either the bottom ports of the selected stage or from the top ports of the stage immediately below the selected stage. FIG. 21A and FIG. 21B describe two embodiments of the stage_select subroutine. In FIG. 21A, the stages are selected according to their index, so the ISIC networks are rewired from top to bottom. In FIG. 21B, the stages are selected with the middlemost stage first, then alternating above and below the middlemost stage, progressively selecting a stage farther and farther away from the middlemost stage, until all stages are described. The latter generally exhibits better redundancy throughout the rewiring process. Many other embodiments of stage_selection can be employed as well.

Figure 22A:
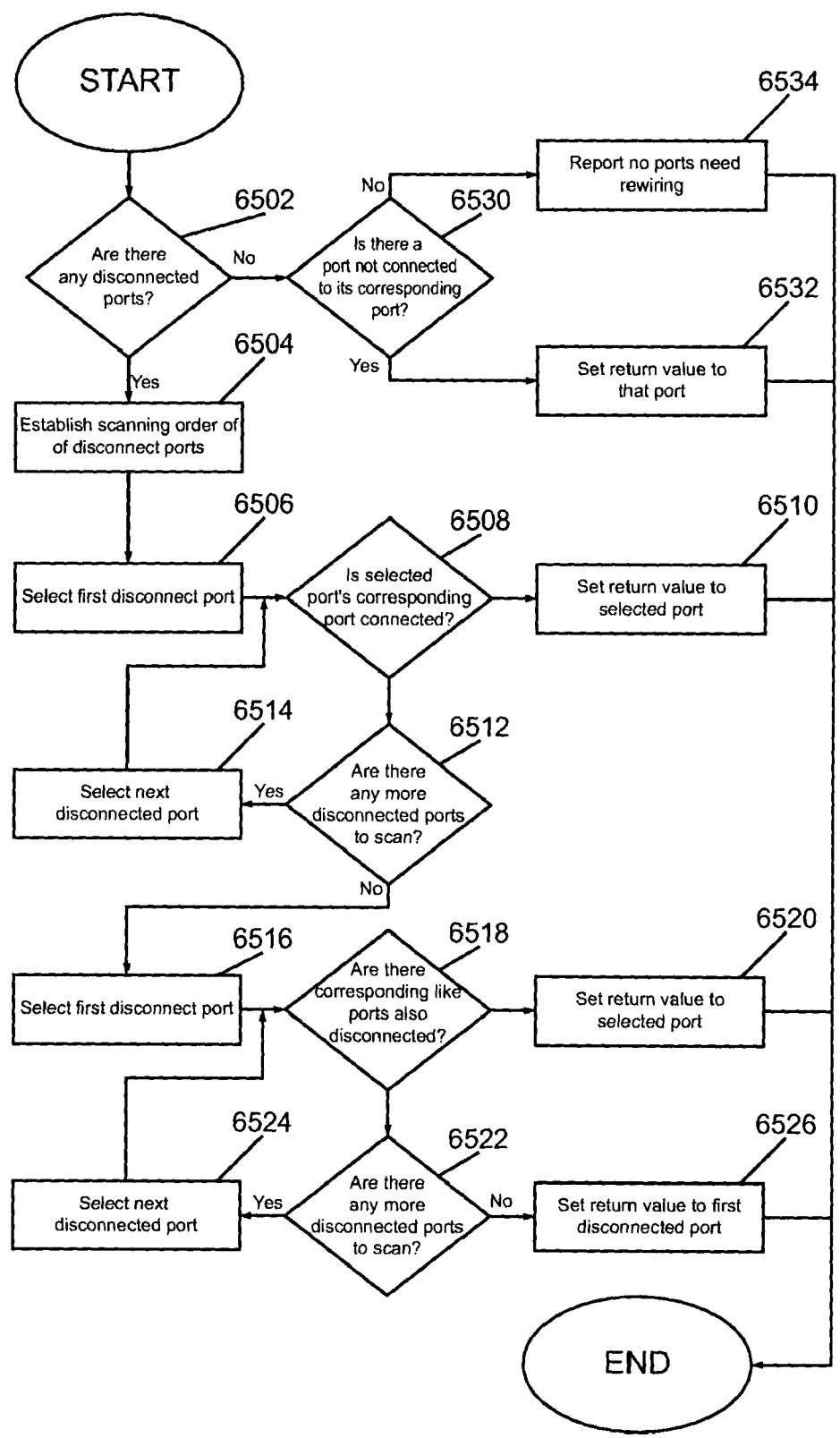
FIG. 22A, FIG. 22B and FIG. 22C show the flowcharts for three embodiments of the port selection subroutines used in the rewiring step.

There are an arbitrary number of port_select subroutines. Set forth here are three exemplars. FIG. 22A depicts one exemplary embodiment of the port_select subroutines. First, at step 6502, a determination is made as to whether there are any ports that are not connected. If none exist, the subroutine jumps to step 6530. At step 6504, a scanning order of all disconnected ports is established, for example, lexicographical ordering with top port before bottom port and left port before right port. The iteration is initialized in step 6506 by setting the test port to the first port in this ordering that is not connected. At step 6508, a determination is made as to whether the test port's corresponding port is connected; if not, the test port is selected in step 6510, ending the subroutine. Otherwise, the testing repeats for the next test port. If there are ports to be scanned as determined by 6512, the next port is selected in the scanning order that is not connected to its corresponding port in step 6514. If the there are no more ports to be scanned, the scan order is reset at 6516 by setting the test port to the first port in the scanning order that is not connected. At step 6518, a determination is made as to whether switching element to which the test port's corresponding port belongs already has a like port disconnected; that is, if test port is a bottom port, is there another bottom port disconnected, and likewise if test port is a top port. If not, then the test port is selected in step 6520 and the subroutine ends. Otherwise, the testing repeats for the next test port. If there are ports to be scanned as determined by 6522, the next port is selected in the scanning order that is not connected to its corresponding port in step 6524. If the there are no more ports to be scanned, then the first disconnected port in the scanning order is selected, and the subroutine ends. At step 6530, a determination is made as to whether there is a port not connected to its corresponding port. If so, the first one in the scanning order is selected at step 6532, and the subroutine ends. If not, there are no ports in need of rewiring, and the subroutine indicates that in step 6534.

Figure 22B:
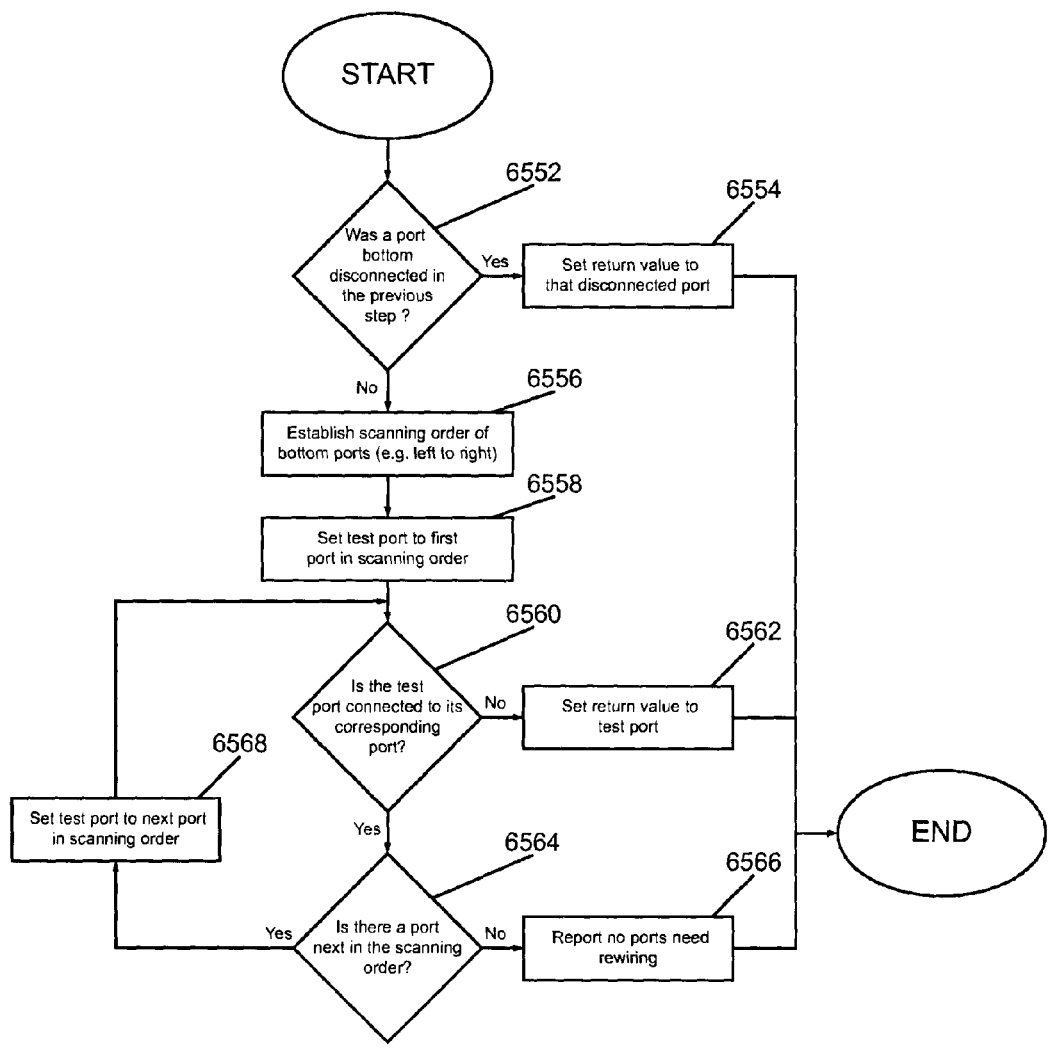

FIG. 22B depicts a simpler embodiment of the port_select subroutine. At step 6552, a determination is made as to whether there was a bottom port disconnected in the previous call to the subroutine (if there was one). If there was, at step 6554, the disconnected port is selected and possibly a new bottom port is disconnected as a result of rewiring the selected port. That disconnected port can be saved for the next call to the subroutine. If no bottom port was previously disconnected, or if this is the first call to the subroutine, a scanning order of bottom ports is established at step 6556. At step 6558, the test port is set to the first port in the scanning order. If the test port is not connected to its corresponding port, the test port is selected, and any bottom port that is disconnected as a result of the rewiring of the selected port is saved for the next call; otherwise, the iteration continues if at step 6560 it is determined that there is another port in the scanning order. If not, the subroutine ends at 6562, with the notification that there are no ports requiring rewiring. Otherwise, the iteration repeats by setting the test port to the next port in the scanning order.

Figure 22C:
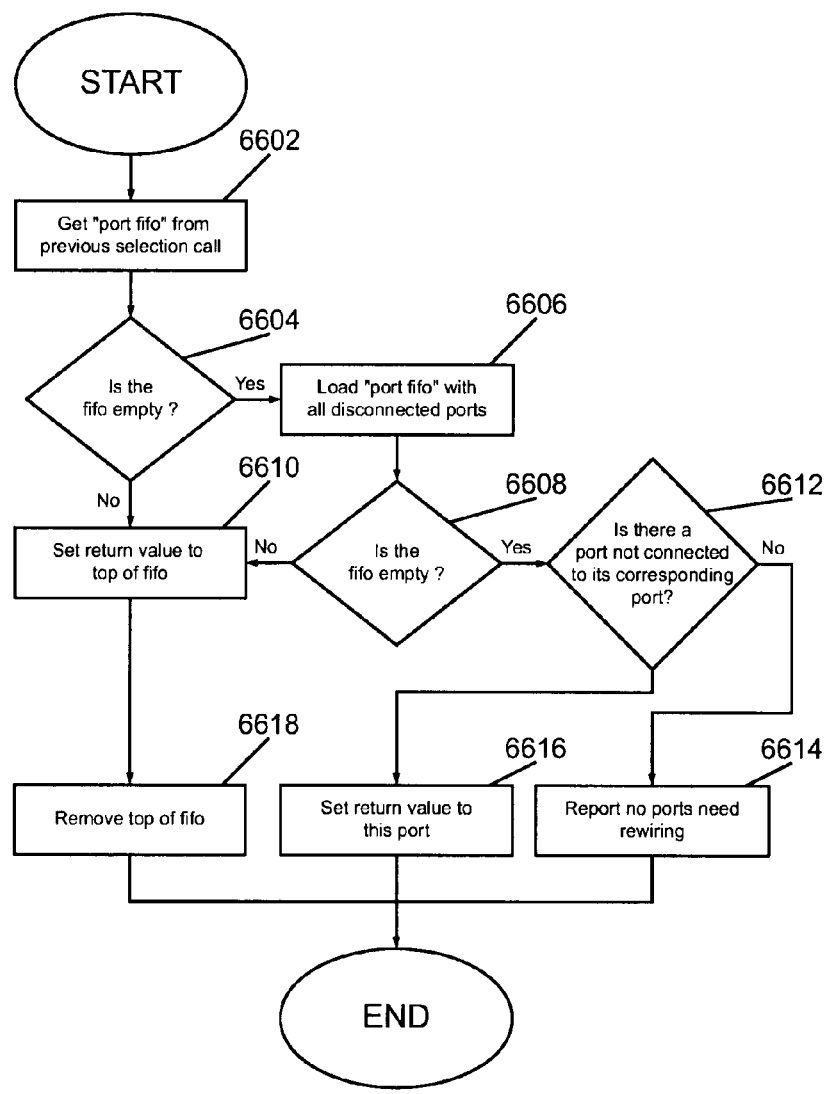

FIG. 22C depicts an elaborate embodiment of the port_select subroutine. In this embodiment, a first-in first-out (FIFO) queue is used. At step 6602, the FIFO is retrieved from possible previous calls to the subroutine. At step 6604, the FIFO is checked if it is empty. If it is empty, it is reloaded at step 6606 with all the ports that are disconnected. At step 6608, the FIFO is checked again. If it is still empty, a determination is made at step 6612 to determine if there is a port not connected to its corresponding port. If not, no ports require rewiring, and the subroutine issues a notification at step 6614. If there is a port not connected to its corresponding port, that port is selected at step 6616 and the subroutine ends. If the FIFO is not found to be empty at either 6604 or 6608, the port at the top of the FIFO is selected at step 6610. The top entry of the FIFO is removed at step 6618, and the subroutine ends.

As described above, the unsplicing or "splicing out" step is essentially the reverse of the splicing. This step is only used if there are unwanted stages that need to be downgraded out of the switching network. When this is the case, all the preceding steps employ the intermediate reconfiguration architecture as a guide for determining topological quantities, such as the corresponding ports, rather than the post-reconfiguration architecture.

Figure 23A:
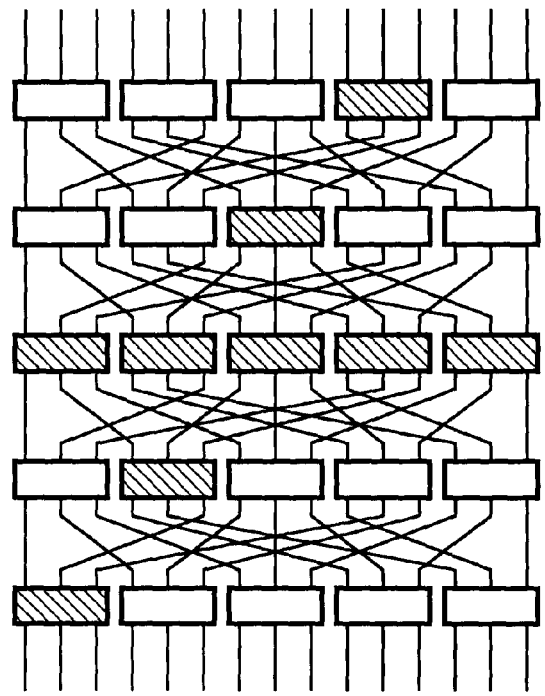
FIG. 23A depicts a 30-port 5-stage RBCCG switching network about the be downgraded.
Figure 23B:
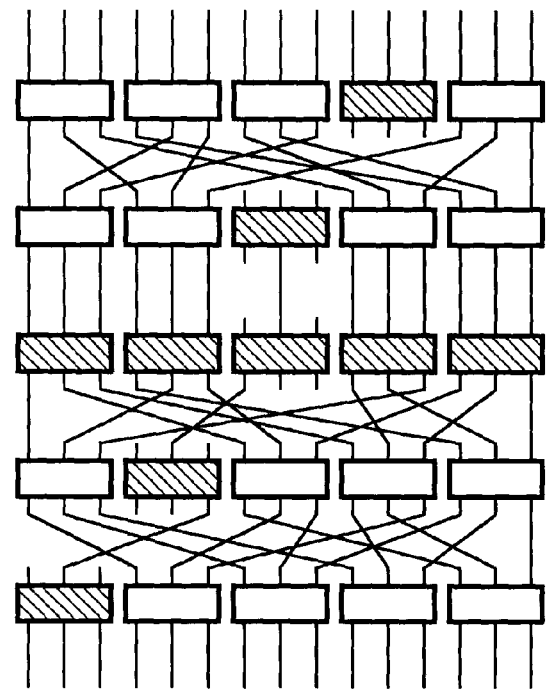
FIG. 23B depicts the intermediate architecture in the downgrade process.

FIG. 23A depicts a 30-port 5 stage balanced RBCCG switching network slated to be downgraded to a 24-port 4 stage balanced RBCCG switching network by removing the switching elements marked with hatching. Careful calculations show that FIG. 23B represents the intermediate reconfiguration switching network. This was determined essentially by taking the true post-reconfiguration architecture (not the intermediate one) and splicing in the switching elements that are being removed. Basically, this is derived from reversing the upgrade process.

The unsplicing operation is described as follows, if a proper intermediate reconfiguration switching network is derived. The top ports of the upper most stage being unspliced are iterated through perhaps using a left to right ordering. The matching bottom ports of the lower most stage being unspliced are also identified. If both top port i of the upper most stage and bottom port i of the lower most stage are both connected, both connections are broken and the bottom port to which top port i of the upper most stage is connected and the top port to which bottom port i of the lower most stage is connected should be connected together. If either top port i of the upper most stage or bottom port i of the lower most stage are not connected, the unsplicing for that i can be skipped. In this embodiment, the value of i runs through all values from 0 to W×F−1. The result of the unsplicing is shown in FIG. 23C.

The following three examples apply the reconfiguration process set forth above to the three basic modes of upgrading a multistage switching network: a stage or row upgrade, a width upgrade, and a fanout upgrade.

Figure 24B:
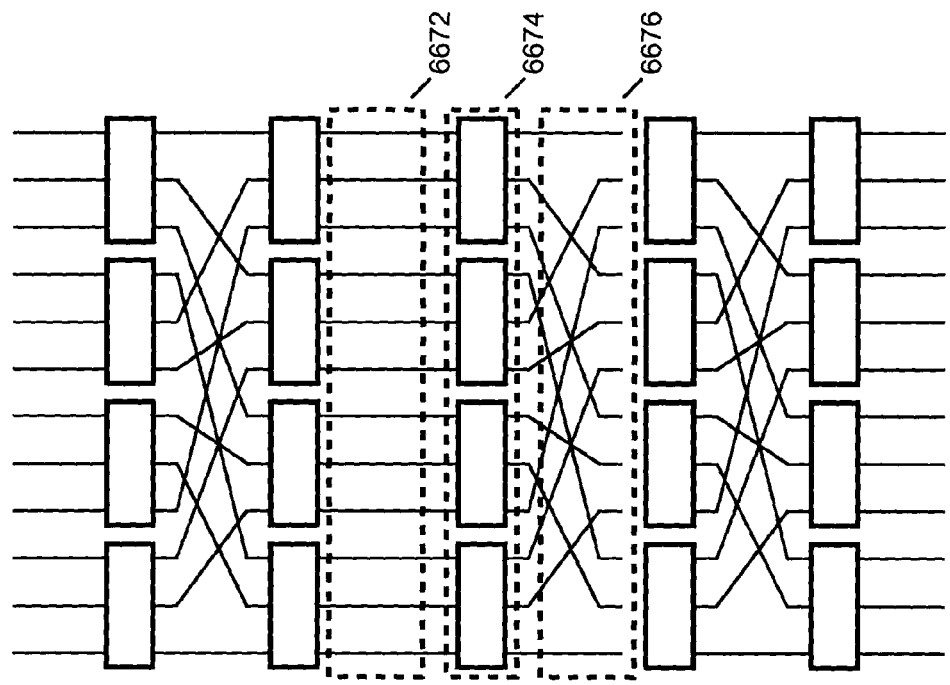
FIG. 24A, FIG. 24B, FIG. 24C show a 24-port RBCCG multistage switching network with four stages upgraded to a 24-port RBCCG multistage switching network with five stages.
Figure 24A:
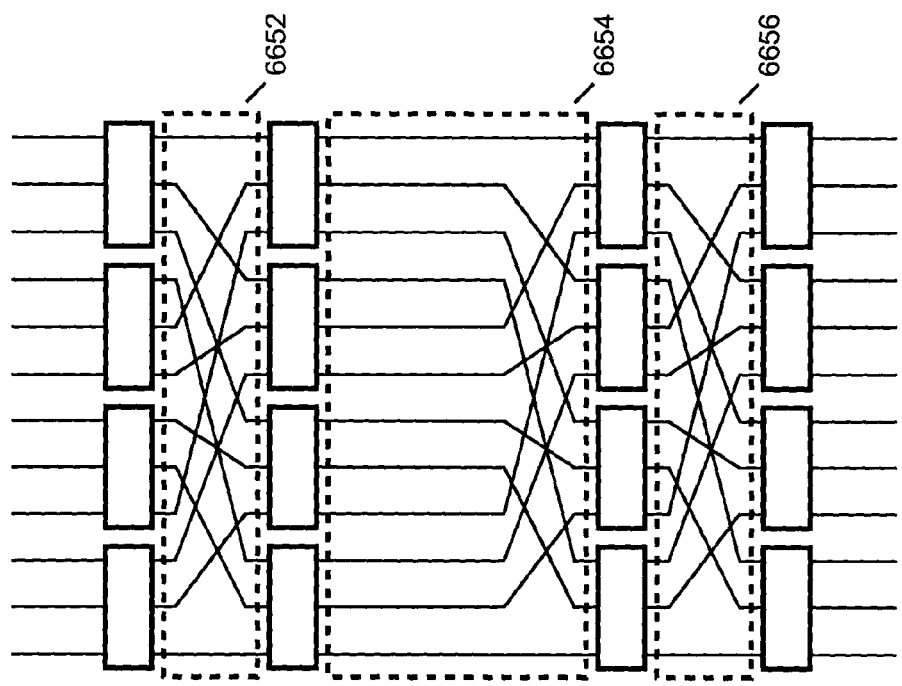
Figure 24C:
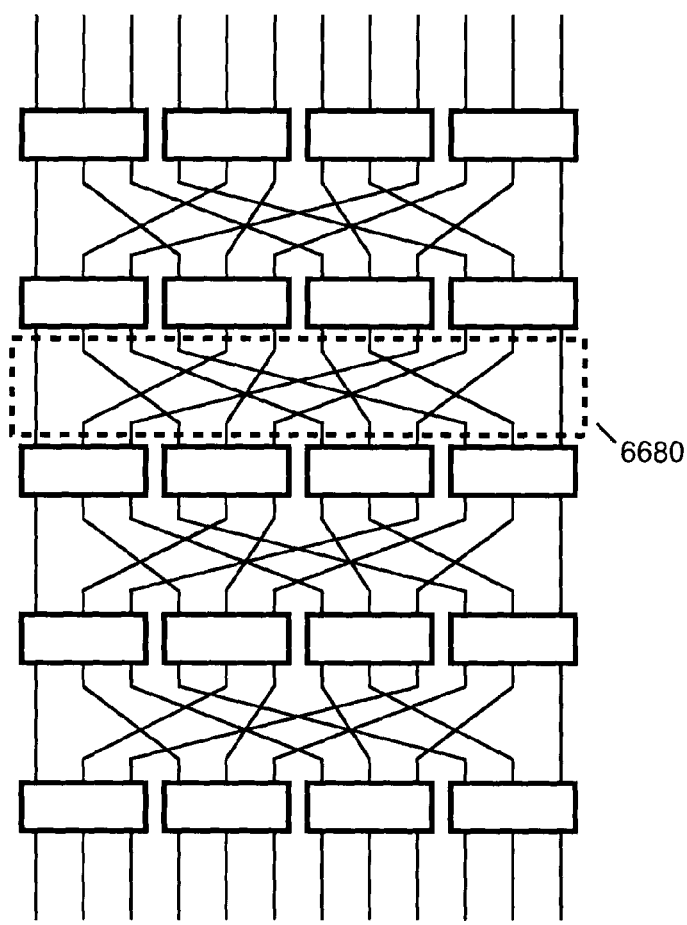

The first example is that of a stage upgrade, whereby an extra stage is added to a multistage switching network. FIG. 24A shows a pre-reconfiguration switching network, which is a 24-port 4 stage balanced RBCCG switching network with ISIC networks, 6552, 6554, and 6556. They are identical, but 6554 is drawn in an elongated manner for clarity when indicating where the new stage of switching elements is to be inserted. There are no external ports that need to be deactivated. There are no pre-connections that can be performed. The result of the network after the splicing step is shown in FIG. 24B, where ISIC network 6654 is systematically broken and reformed into new ISIC networks 6672 and 6676 in order to insert new stage 6674. After the rewiring step, the switching network matches the post-reconfiguration architecture as shown in FIG. 24C, where ISIC network 6672 is rewired to ISIC network 6680. The result is a 24-port 5 stage balanced RBCCG switching network. A stage upgrade process was also set forth in prior application, U.S. patent application Ser. No. 09/897,263.

Figure 25A:
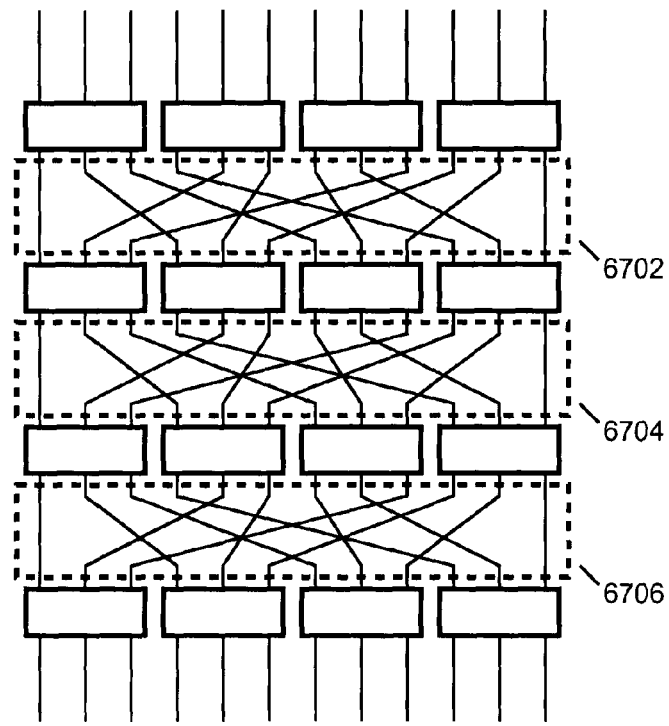
FIG. 25A and FIG. 25B show a 24 port RBCCG multistage switching network with four switching elements per stage upgraded to a 30-port RBCCG multistage switching network with five switching elements per stage.
Figure 25B:
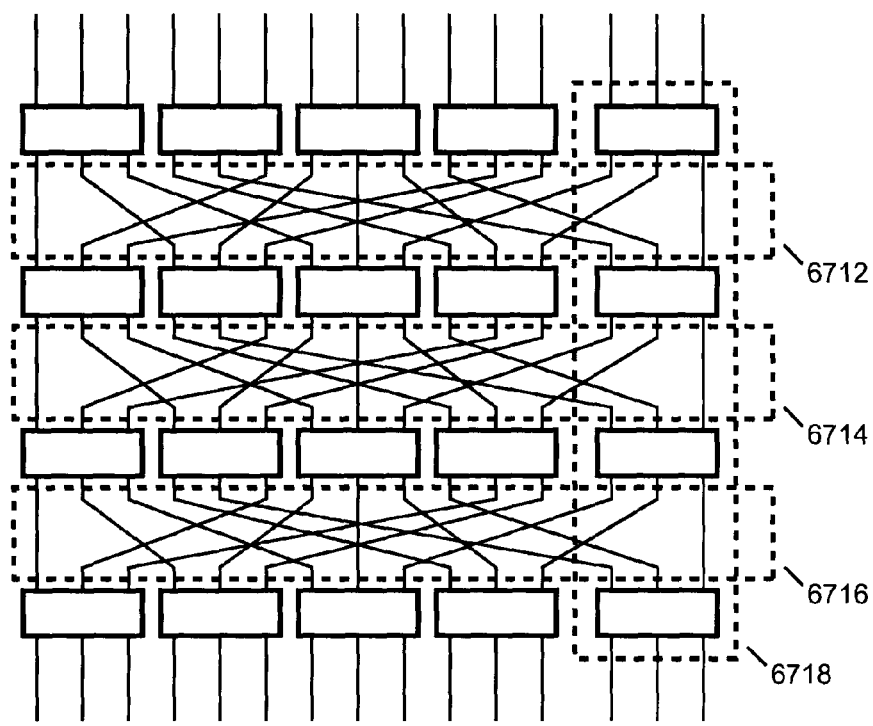

The next example is that of a width upgrade. FIG. 25A shows a pre-reconfiguration switching network of a 24-port 4 stage balanced RBCCG network with ISIC networks, 6702, 6704, and 6706. Through the process set forth above, the switching network is transformed into the wider post-reconfiguration 30-port 4 stage balanced RBCCG switching network depicted in FIG. 25B, where new switching elements 6718 are added and ISIC networks 6702, 6704, and 6706 are reconfigured into ISIC networks 6712, 6714, and 6716, respectively. A width upgrade process is also set forth in U.S. Pat. No. 7,123,612.

Figure 26A:
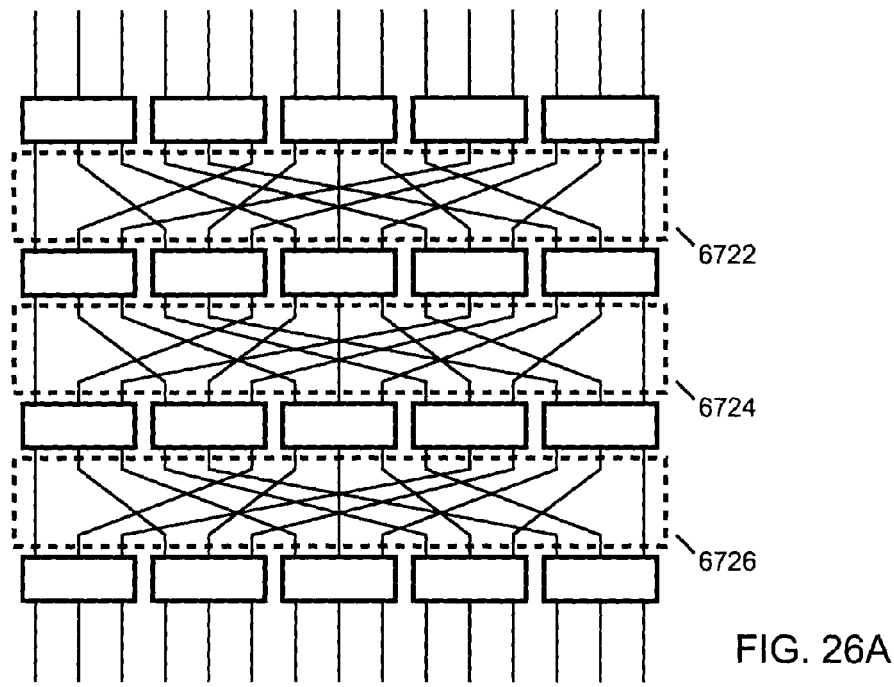
FIG. 26A and FIG. 26B show a 30-port RBCCG multistage switching network with a fanout of three for each switching element upgraded to a 40-port RBCCG multistage switching network with a fanout of four for each switching element.
Figure 26B:
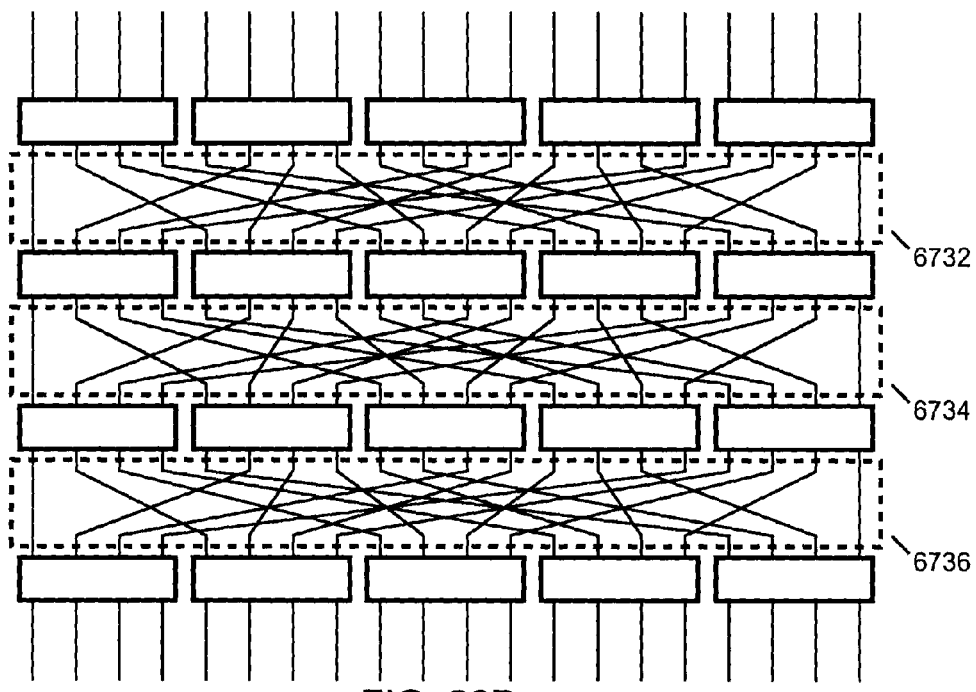

The next example is that of a fanout upgrade. FIG. 26A shows a pre-reconfiguration switching network of a 30-port 5 stage balanced RBCCG network with a per switching element fanout of 3. It comprises ISIC networks 6722, 6724, and 6726. Through the process set forth above, the switching network is transformed into the post-reconfiguration 40-port 4 stage balanced RBCCG switching network with a per switching element fanout of 4 depicted in FIG. 26B where ISIC networks 6722, 6724 and 6726 are reconfigured into ISIC networks 6732, 6734, and 6736, respectively. A fanout upgrade process is also set forth in U.S. Pat. No. 7,075,942.

Thus far the examples given reconfigure RBCCG switching networks. The reconfiguration process can apply in the same manner for other multistage interconnection networks, provided that sufficient fault tolerance exists and a routing algorithm is implemented that accounts for the change of the architecture during the upgrade process.

Figure 27:
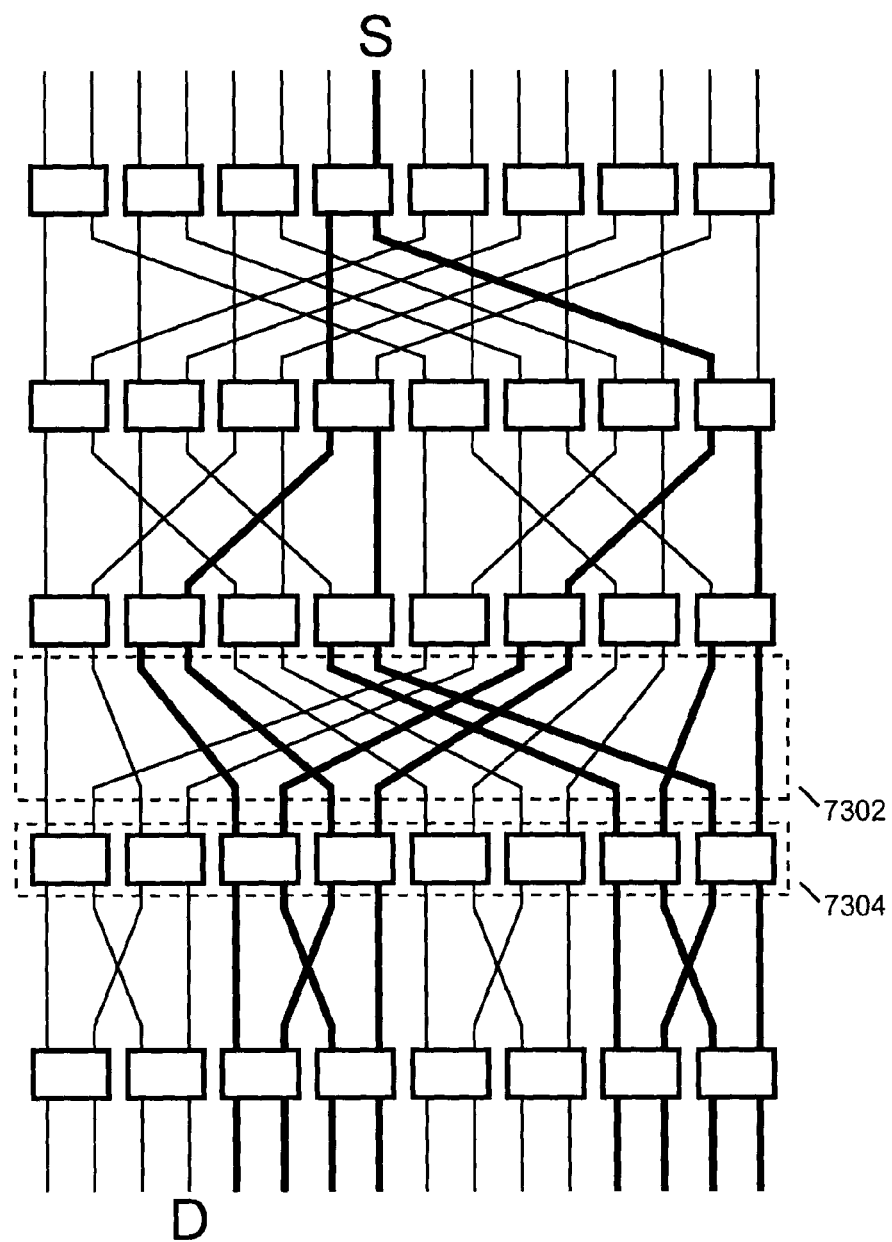
FIG. 27 shows how the internal insertion of a cyclic group ISIC (CGISIC) into a Banyan network can destroy functional connectivity.

As with any reconfiguration process, the post-reconfiguration architecture must be a viable switching network architecture. For example, it is known that the insertion of an extra stage with an extra ISIC network into a functionally connected Banyan network such as the one depicted in FIG. 1B can destroy the functionally connected property of the network, despite the fact that an extra stage usually gives path redundancy. FIG. 27 depicts a Banyan network with an extra stage 7304 and an extra ISIC network 7302 which is a CGI-SIC network. Though the Banyan network from which this network is derived from is functionally connected, the hybrid network is not, as proof, one should note there is no path from port S to port D. All paths originating from port S to the external ports on the last stage are shown in bold, clearly, port D is not one that can be reached.

As a general rule, for a switching network that is a hybrid switching network, having additional stages coupled with CGISIC networks such as those depicted in FIGS. 29A-29H, where the extra stage is added to either the top or bottom of the network are upgradeable. In such a hybrid switching network, such as the one depicted in FIG. 28A, an extra stage can be inserted anywhere adjacent to the CGISIC network 7402 used for augmentation as indicated by arrow 7406. In the splicing process, the connections can be broken by disconnecting the top ports or bottom ports of switching elements in stage 7404, depending on the embodiment of the splicing algorithm used.

Figure 28B:
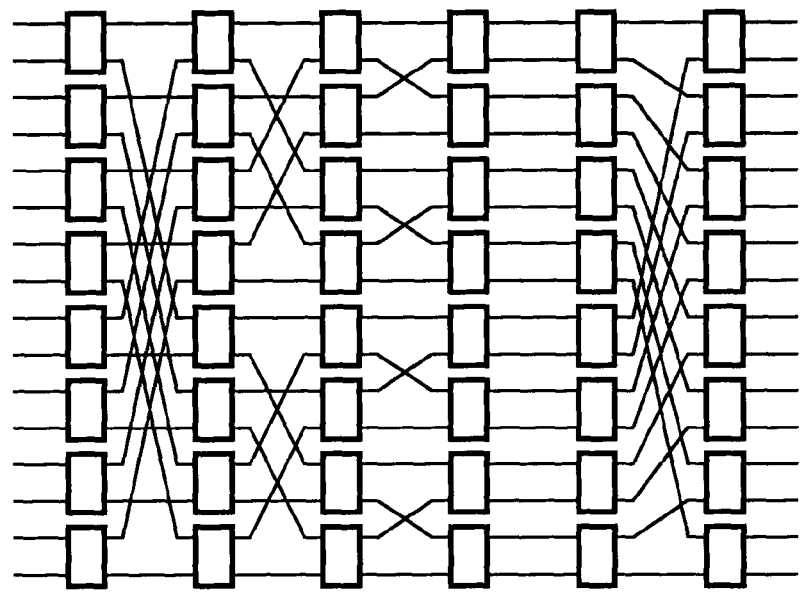
FIG. 28A, FIG. 28B, FIG. 28C and FIG. 28D show the process of stage upgrades for hybrid architectures.
Figure 28A:
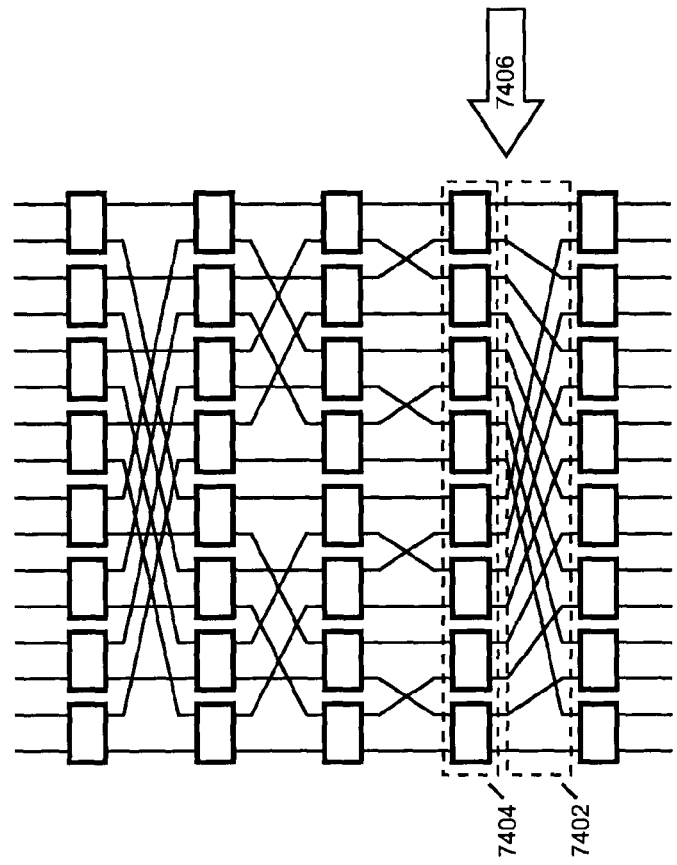
Figure 28D:
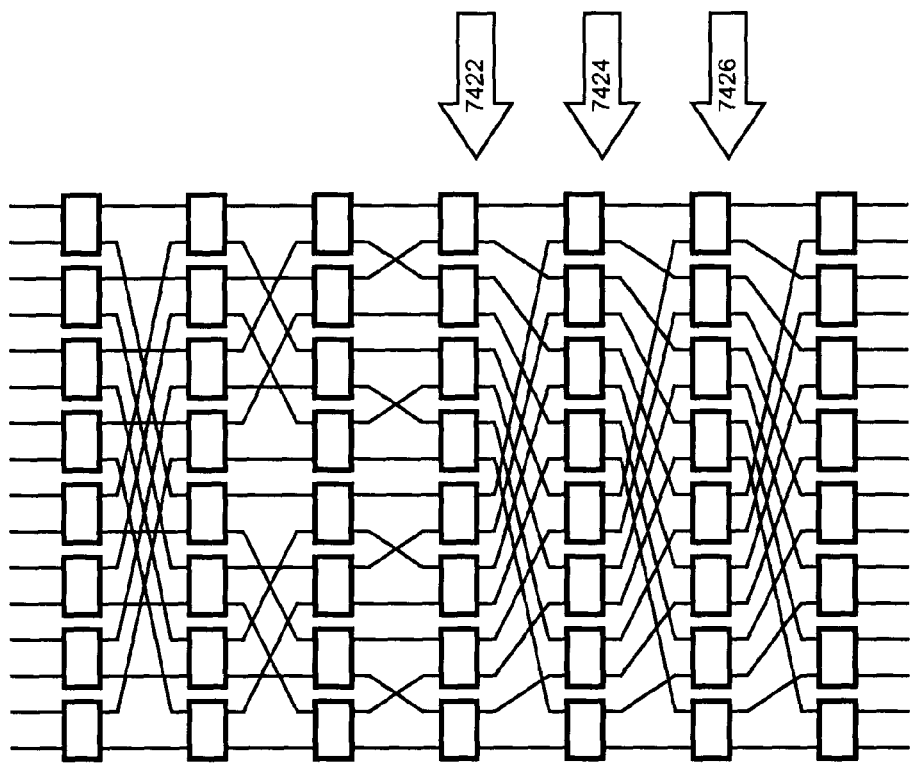
Figure 28C:
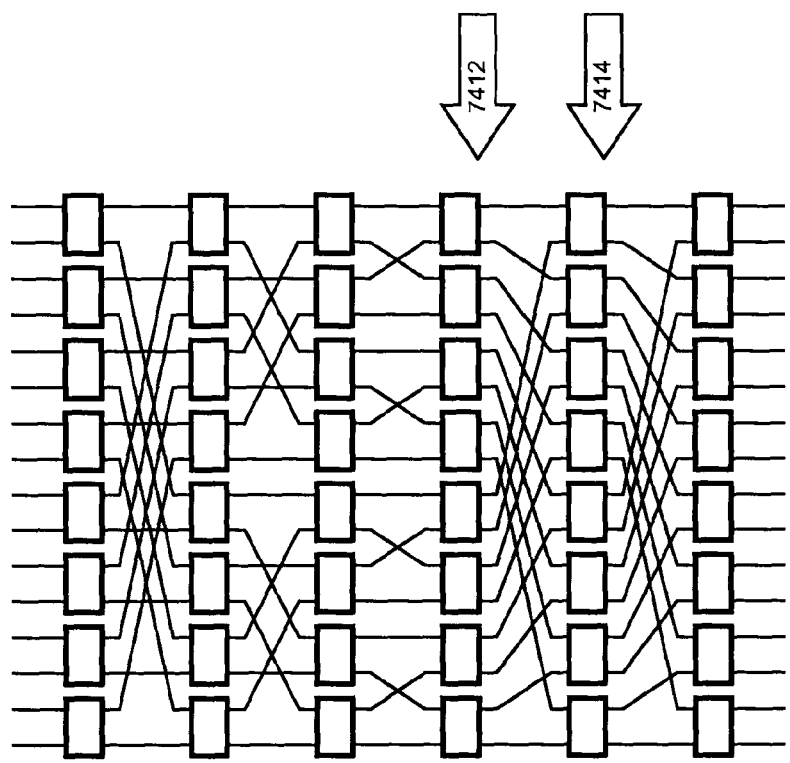
Figure 29D:
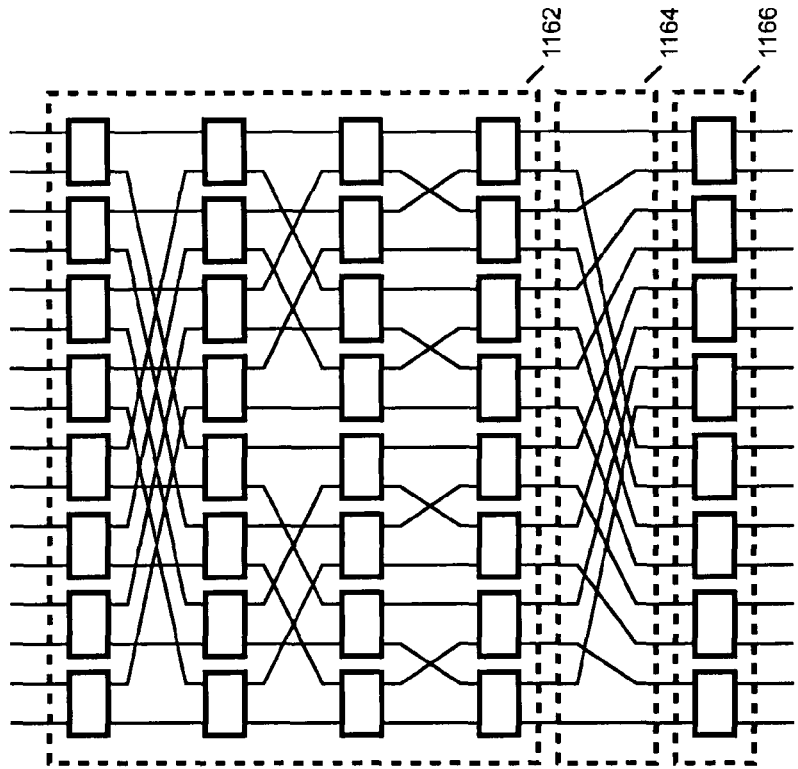
FIG. 29D shows a 32-port Banyan network augmented with an extra inverted CGISIC network stage at the bottom of the network.
Figure 29C:
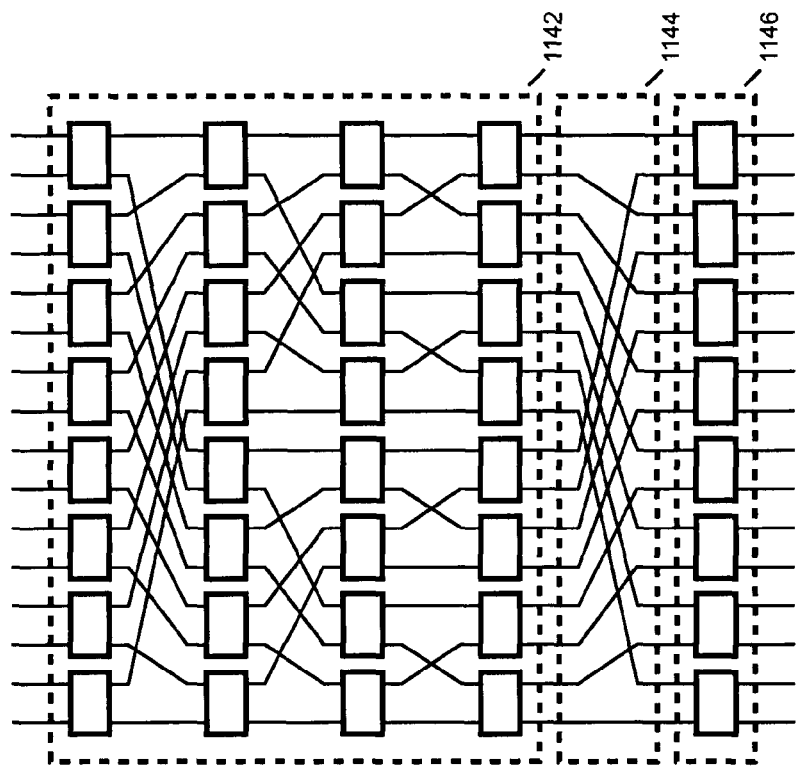
FIG. 29C shows a 32-port delta network augmented with an extra CGISIC network stage at the bottom of the network.
Figure 29F:
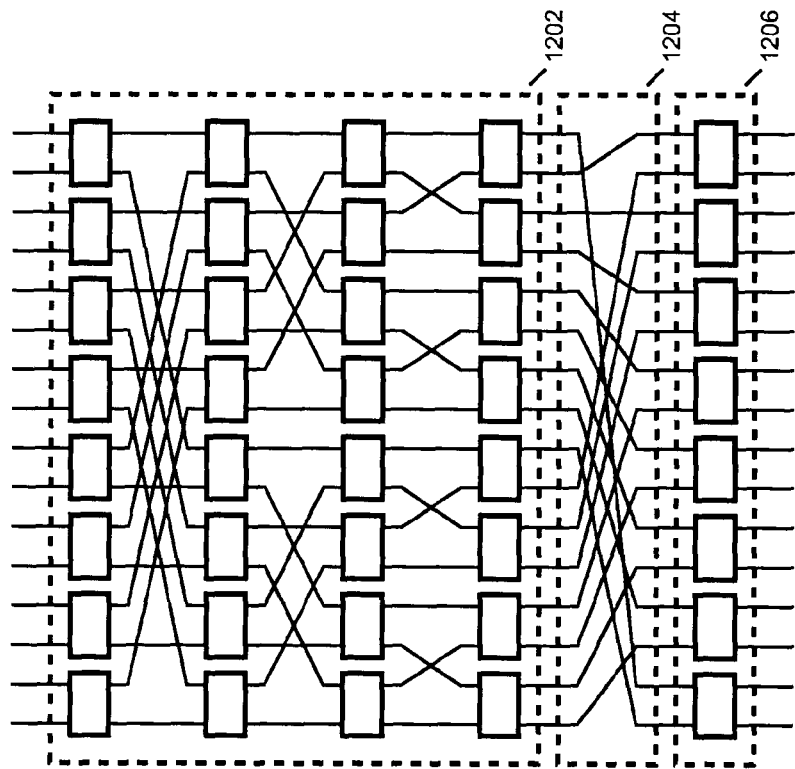
FIG. 29F shows a 32-port Banyan network augmented with an extra asymmetric CGISIC network stage at the bottom of the network.
Figure 29E:
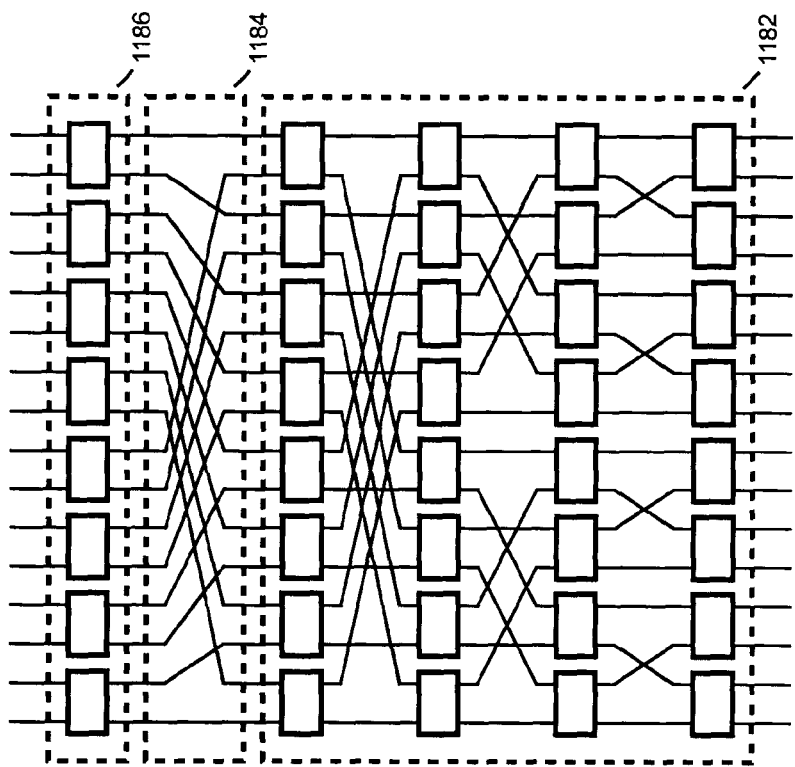
FIG. 29E shows a 32-port Banyan network augmented with an extra CGISIC network stage at the top of the network.
Figure 29G:
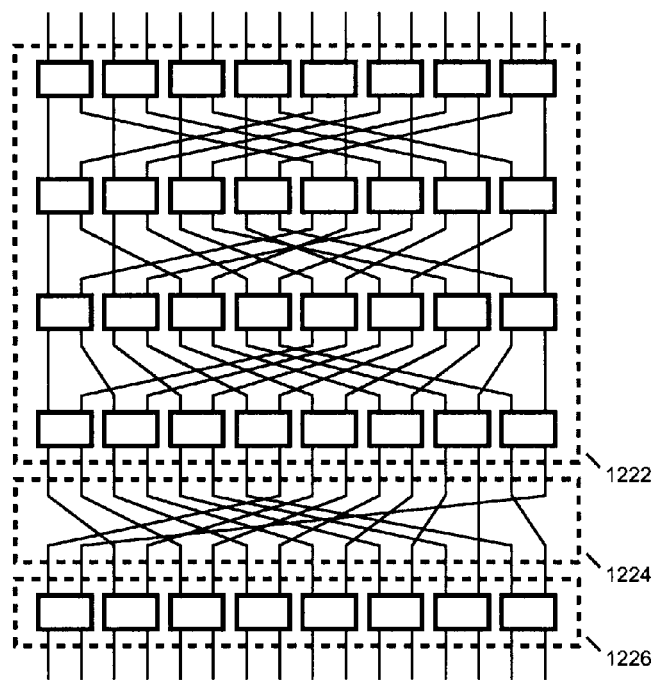
FIG. 29G shows a 32-port fast Fourier transform derived network augmented with an extra asymmetric CGISIC network stage at the bottom of the network.
Figure 29H:
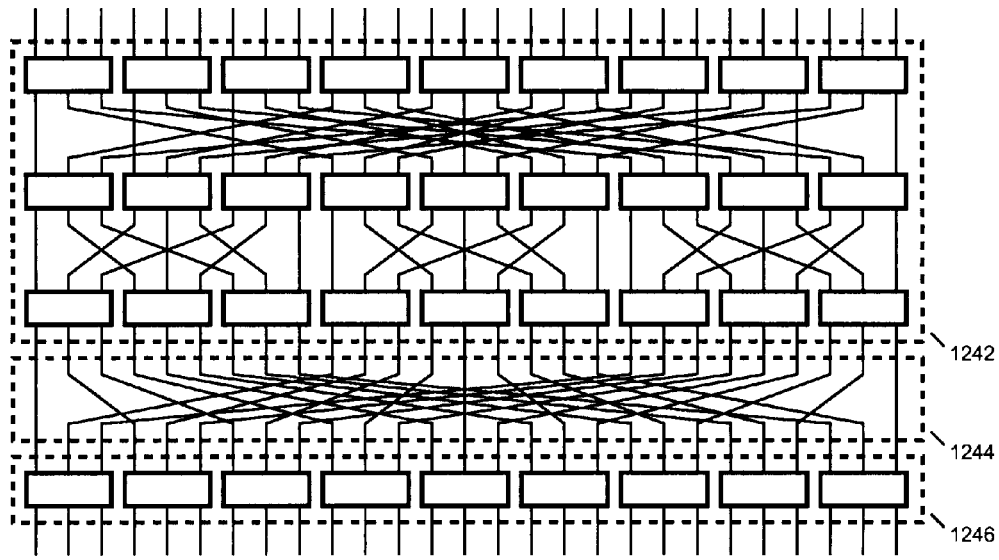
FIG. 29H shows a 54-port trinary Banyan network augmented with an extra trinary CGISIC network stage at the bottom of the network.

FIG. 28B shows the result after the splicing operation in accordance with the description above. FIG. 28C shows the resultant switching network after the upgrade process is complete; in particular, after the rewiring operation is completed. The rewiring operation can be performed based on the descriptions set forth above.

Arrows 7412 and 7414 in FIG. 28C indicate insertion locations for the addition of still another stage. The result would be the switching network depicted in FIG. 28D where arrows 7422, 7424, and 7426 indicate insertion locations for the further addition of another stage.

Figure 30A:
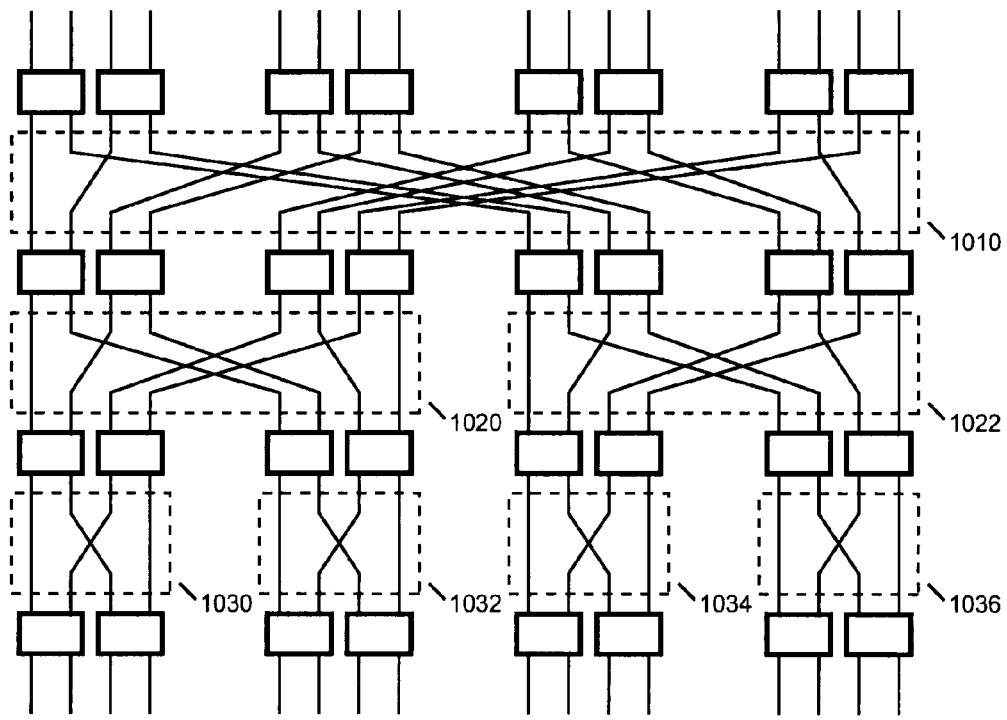
FIG. 30A shows a 32-port delta network.
Figure 30B:
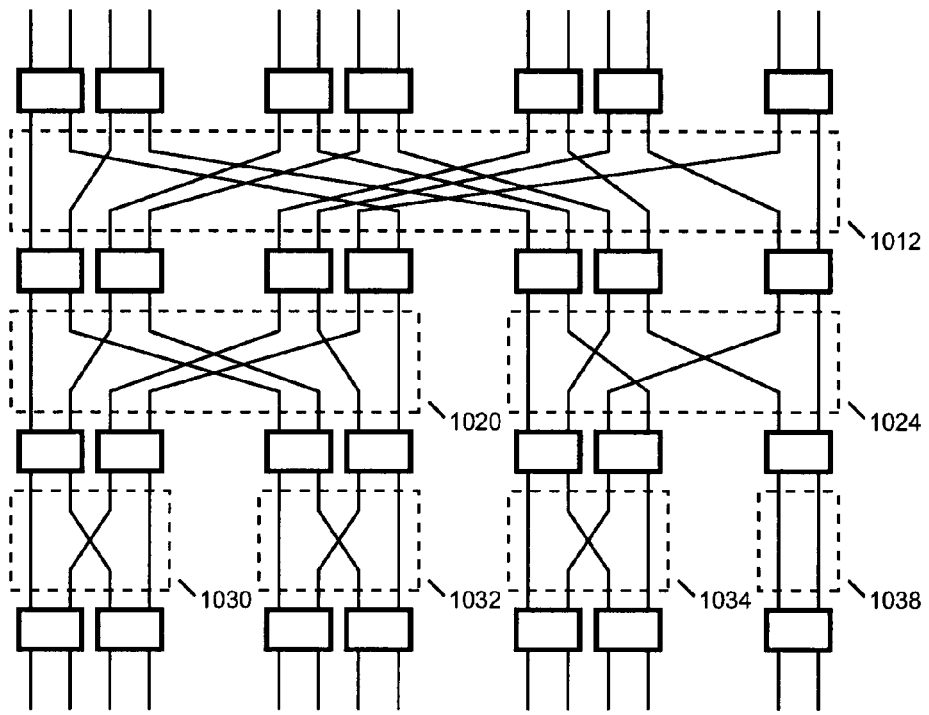
FIG. 30B shows a delta network modified to 28-ports.
Figure 30C:
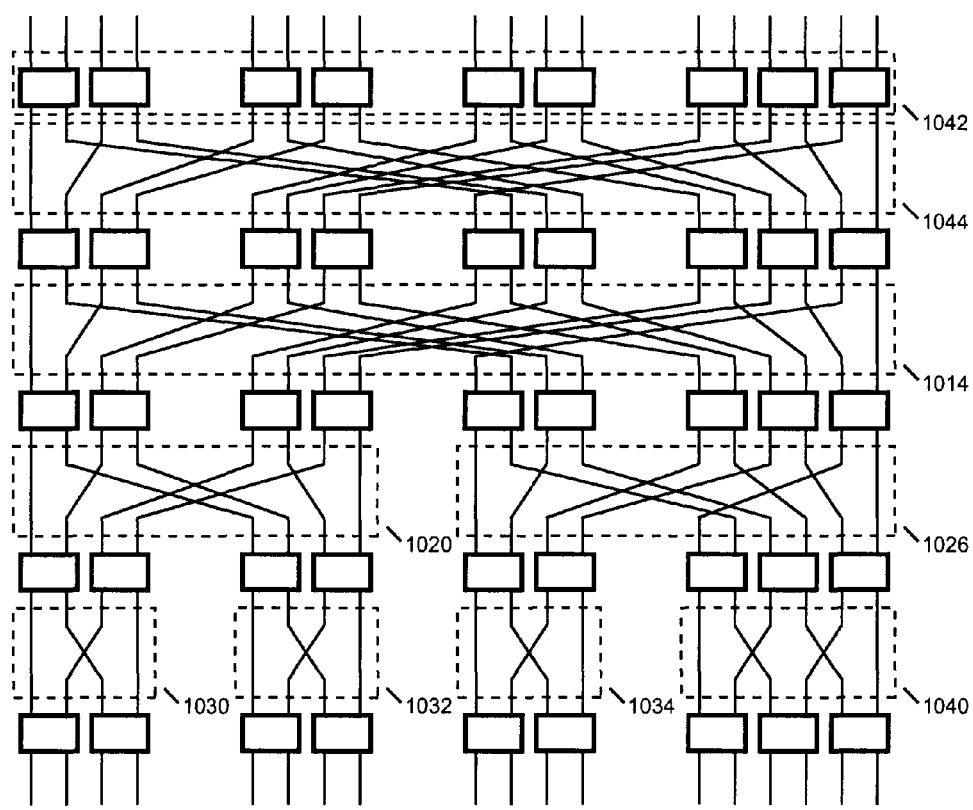
FIG. 30C shows a delta network modified to 36-ports comprising an extra CGISIC network stage.

As for changes in fanout or width, the reconfiguration process set forth above can be applied, provided there is sufficient fault tolerance. For example, the delta network of FIG. 30A can be reconfigured to either the switching network of FIG. 30B or FIG. 30C. However, the switching network FIG. 30C is not functionally connected, and FIG. 30A does not have sufficient fault tolerance to guarantee no interruption of service during the reconfiguration process; that is, during the reconfiguration process, the switching network can fail to be functionally connected. Nonetheless, the reconfiguration process set forth above tends to minimize the impact of the lack of functional connectivity. Furthermore, if the switching networks depicted in FIG. 30A, FIG. 30B and FIG. 30C were augmented by an extra stage and a CGISIC network, the reconfiguration process set forth above can be used to make the transformation between any two of those switching networks without interruption of service.

Naturally, another use of the reconfiguration process would be to transform a hybrid switching network, which lacks symmetry and is more cumbersome to design and describe, into a RBCCG switching network, which is easier to describe and possesses greater symmetry, which can lead to a much more manageable upgrade path.

The reconfiguration process set forth above can also be applied to the Cartesian product of any of the scalable switching networks described above, provided there is sufficient fault tolerance in the pre-reconfiguration and post-reconfiguration switching networks.

Figure 33A:
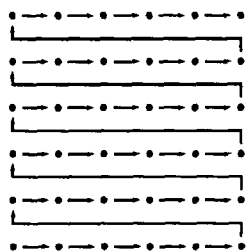
FIG. 33A, FIG. 33B and FIG. 33C show three systematic method of scanning ports in a two dimensional switching network.
Figure 33B:
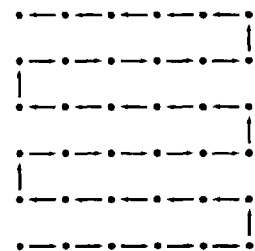
Figure 33C:
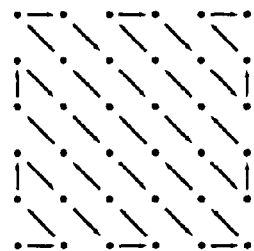

The reconfiguration Cartesian product networks can be described in terms of changing the various fanouts and widths of the network, as well as the number of stages. For example in the two dimensional RBCCG networks set forth above, the fanouts $F_1$ and $F_2$, the widths $W_1$ and $W_2$ as well as the height H, can be changed. The reconfiguration process is as set forth above, except the specific embodiments regarding port selection should be adapted for the context. For example, in selecting the port in the one-dimensional RBCCG network, the ports are scanned from left to right to find the best candidate port to manipulate first. With a two-dimensional (or higher dimensional) multistage switching network, this description does not fit. Any systematic scanning method can be used, including but not limited to, raster scanning, serpentine scanning, and zig-zag scanning, shown in FIG. 33A, FIG. 33B and FIG. 33C respectively.

For clarity, the ISIC networks are omitted from the diagrams to follow, but should be assumed to included as part of the switching networks described. FIG. 31A shows an expansion by a single vertical slice analogous to a column expansion in a one-dimensional RBCCG. This causes an increase in the number of switching elements in the $x_1$ direction. Though not shown, the same kind of expansion could also be implemented in the $x_2$ direction.

Figure 31B:
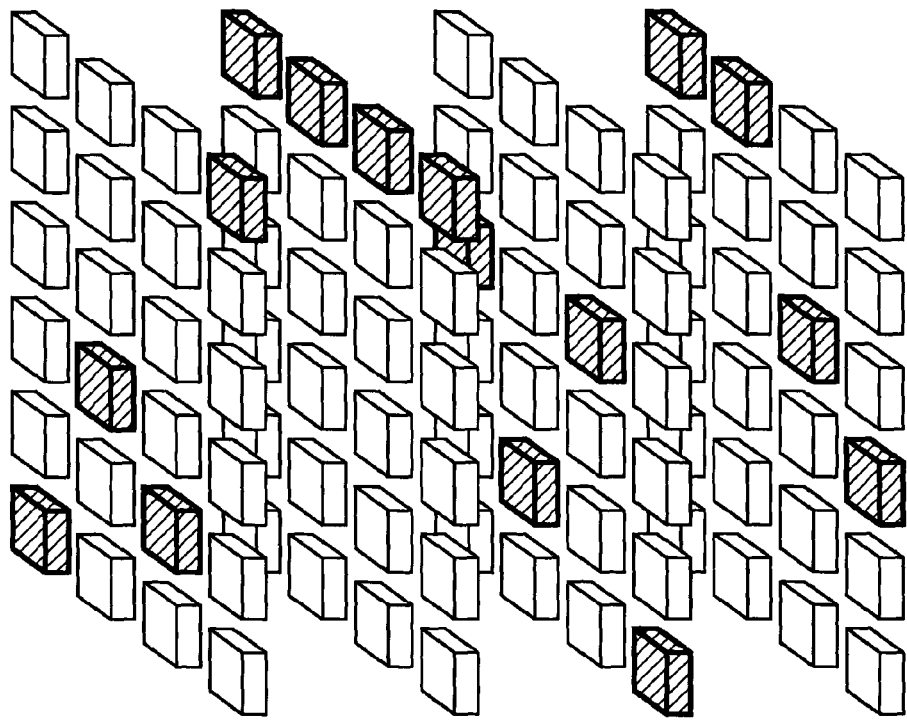
FIG. 31B shows a two-dimensional RBCCG network expanded in width by the addition of switching elements in arbitrary positions.
Figure 31A:
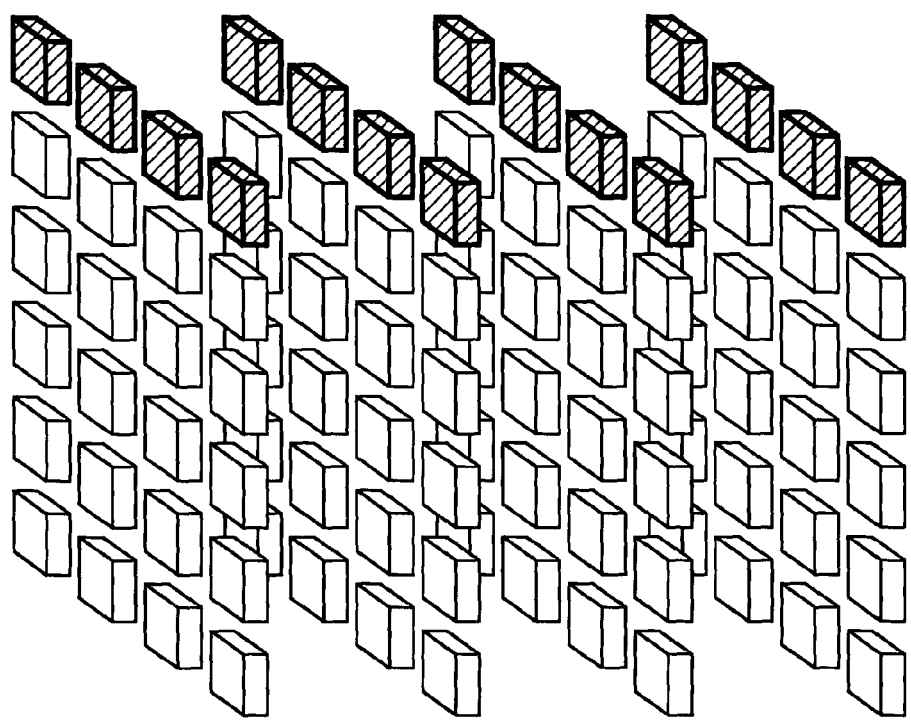
FIG. 31A shows a two-dimensional RBCCG network expanded in width by the addition of a "planar column" of switching elements.
Figure 31D:
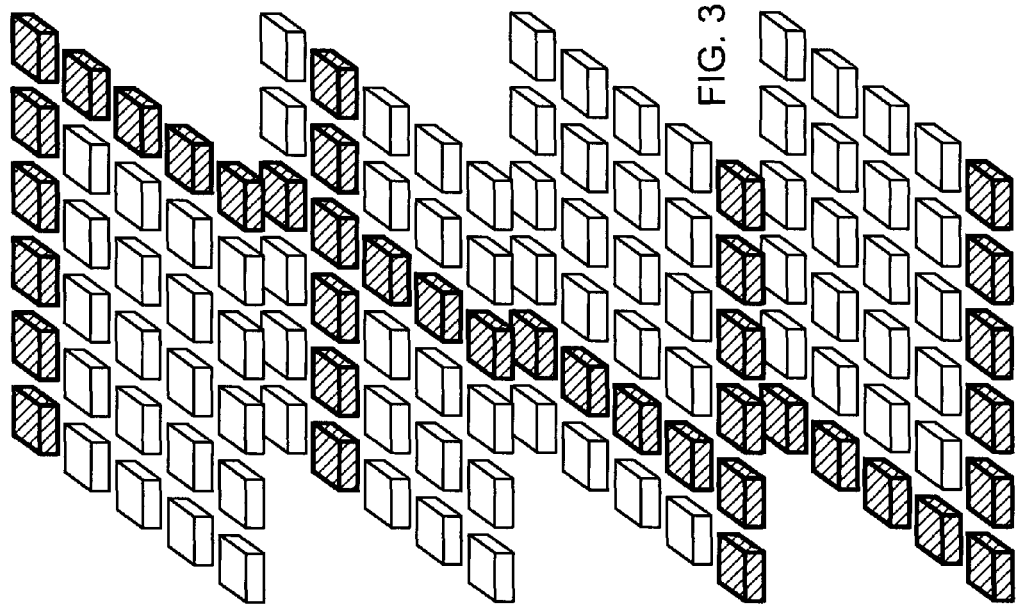
FIG. 31D shows a two-dimensional RBCCG network expanded in both "widths" by the addition of switching elements in arbitrary positions.
Figure 31C:
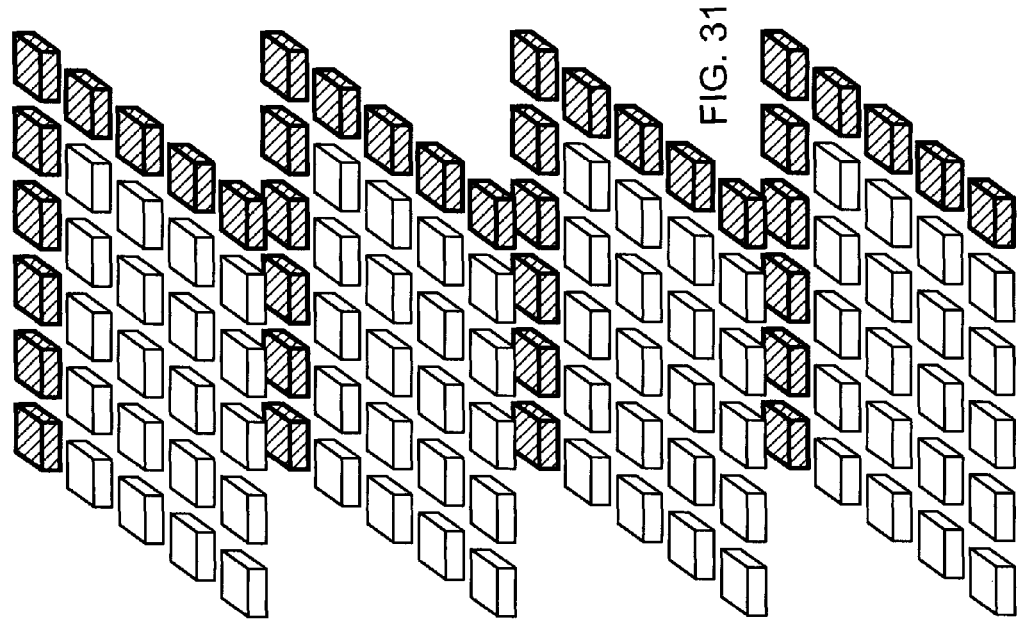
FIG. 31C shows a two-dimensional RBCCG network expanded in both "widths" by the addition of two perpendicular "planar columns" of switching elements.

FIG. 31B shows a more arbitrary width expansion where the $W_1$ width is expanded by one but the placements are completely arbitrary; similarly, this could be applied to expansion to the $W_2$ width. FIG. 31C shows an expansion in both the $W_1$ and $W_2$ widths using a method analogous to column upgrades. FIG. 31D shows an expansion in both the $W_1$ and $W_2$ widths, but in a more arbitrary fashion. In FIG. 31A, FIG. 31B, FIG. 31C and FIG. 31D, the ISIC networks are not shown to simplify the diagram and the new switching elements are highlighted by hatching.

Figure 32B:
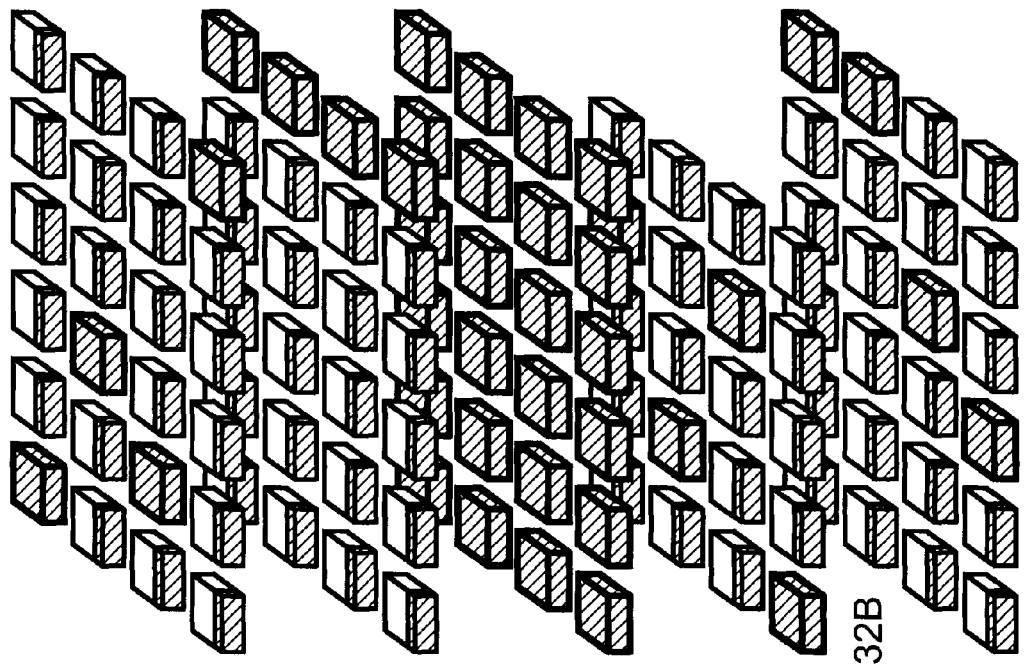
FIG. 32A and FIG. 32B show a simultaneous upgrade in fan-out, width and height.
Figure 32A:
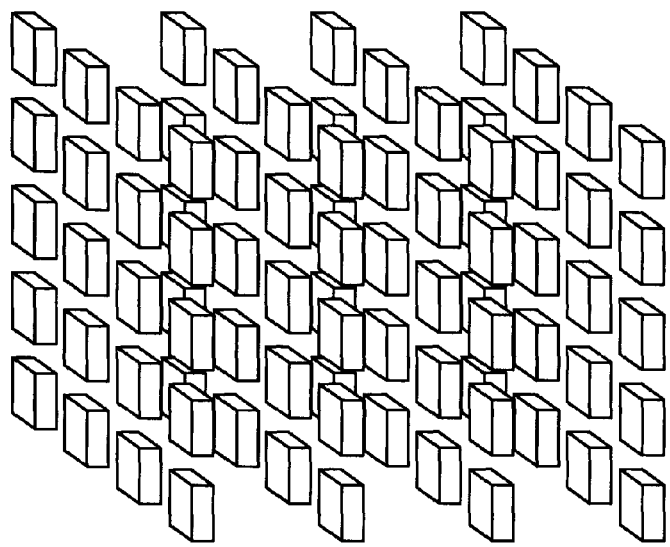

FIG. 32A and FIG. 32B show a simultaneous upgrade in fanout, width, and height. FIG. 32A shows the pre-reconfiguration switching network architecture, and FIG. 32B shows the post-reconfiguration architecture. In particular, the width is increased by one in the $x_1$ direction, and the fanout is increased by a fixed amount (no value is specifically shown, but any increase is legitimate) in the $x_2$ direction. Additionally, an extra stage of switching elements is inserted between stages 2 and 3. In FIG. 32B, the increased fanout is denoted by hatching and added switching elements are highlighted by hatching.

Figure 34:
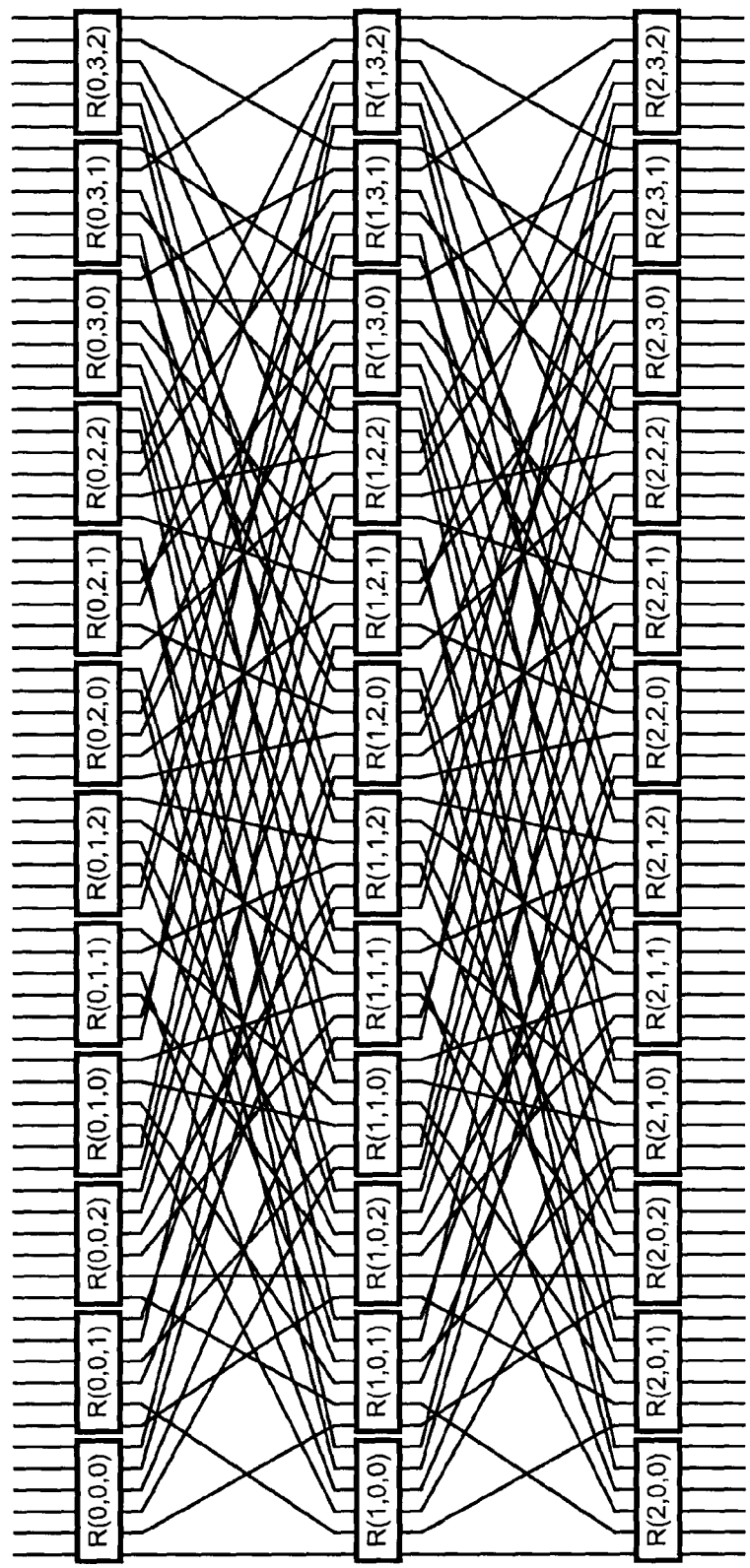
FIG. 34 shows the same complete 144-port two-dimensional Cartesian product RBCCG network but in a "flattened" form, where all the ports and switching elements are drawn in raster scan order.

Furthermore, when considered in its flattened form like that depicted in FIG. 34, a Cartesian product network can be treated as a one-dimensional multistage switching network, and it can be transformed with the reconfiguration process set forth above to any other viable one-dimensional multistage switching network.

Figure 35:
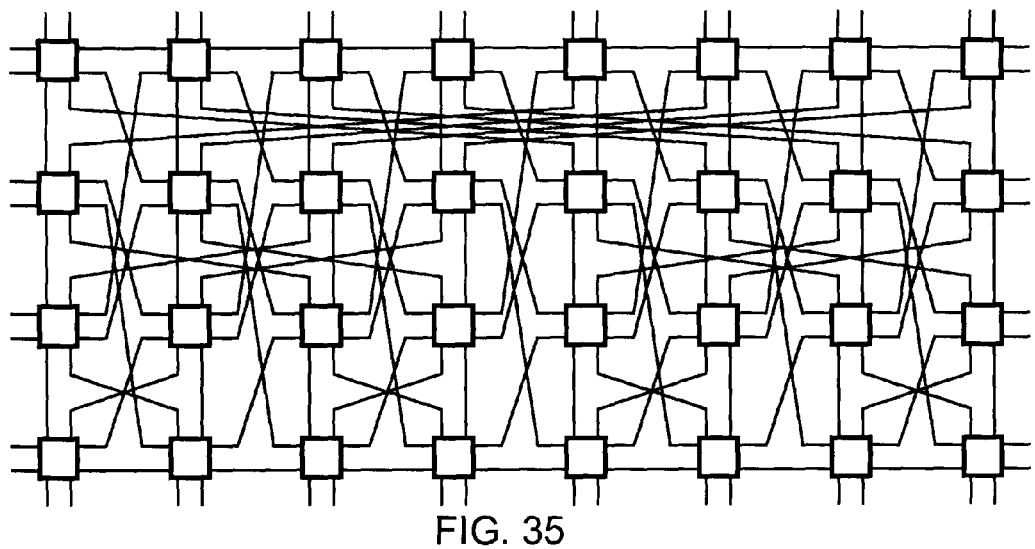
FIG. 35 shows a perpendicular overlay of a 32-port Banyan network and a 16-port, 8-stage RBCCG network.

The overlaid switching networks can be reconfigured using the process set forth above. The fault tolerance requirements are more relaxed in this architecture. Because of the alternate paths that exploit connections in both the IRIC and ICIC networks, fault tolerance of the switching network is magnified over that of the source multistage switching network. An overlaid switching network with its IRIC derived from the ISIC network of a Banyan such as the one shown in FIG. 35 can be upgraded in width, though there is insufficient fault tolerance in a Banyan network to upgrade a Banyan network as a multistage switching network, because the overlaid network draws additional fault tolerance from connections in the ICIC networks.

In order to simply the description, an exemplar depicting a simple upgrade in width is presented. To properly apply the process set forth above for multistage switching networks to overlaid switching networks, it should be noted that in upgrading the multistage switching networks, after the preliminary shuffling of hardware, focus is on the rewiring of the ISIC networks. In an overlaid switching network, after initial shuffling of hardware, the focus of the upgrade process is on rewiring the IRIC and ICIC networks.

Figure 36A:
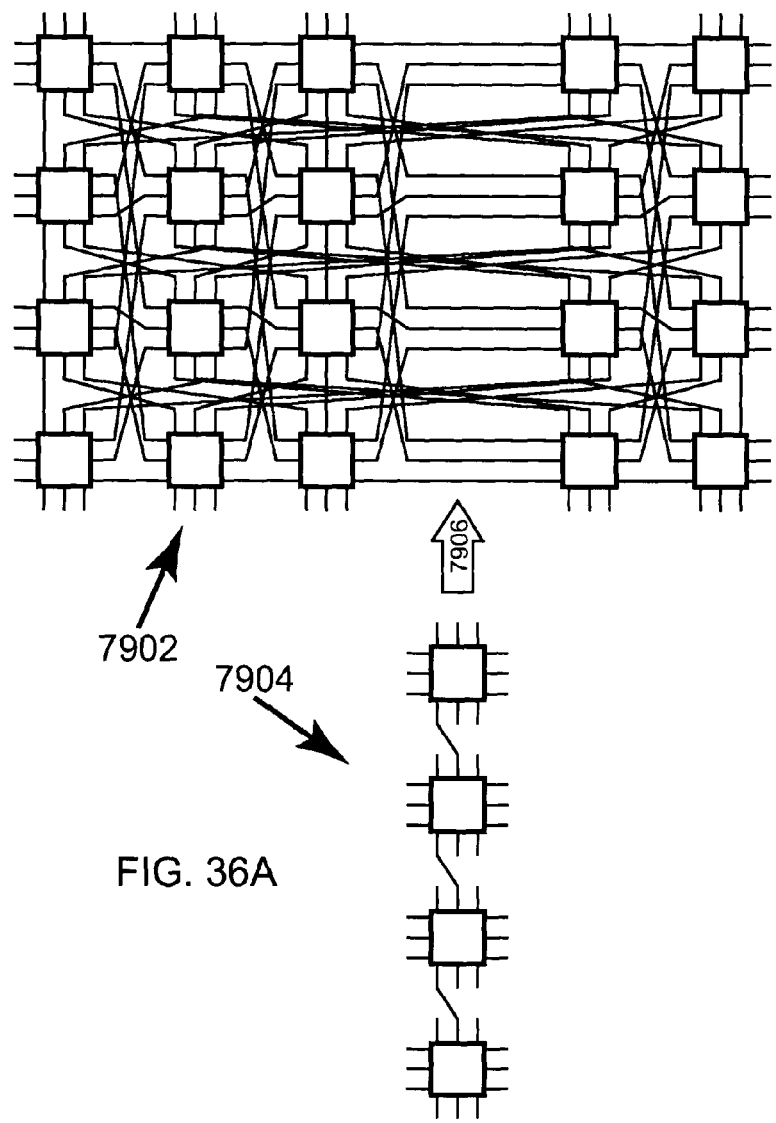
FIG. 36A, FIG. 36B, FIG. 36C, FIG. 36D, FIG. 36E, and FIG. 36F show an upgrade by increasing the width of an overlaid double RBCCG network.

FIG. 36A shows an overlaid switching network 7902 formed by overlaying an RBCCG network with 5 columns and 4 rows onto an RBCCG network with 4 columns and 5 rows, both with a fanout per switching element of 3. Since this is an upgrade, there are no external ports that need to be deactivated. Next, a column 7904 of switching elements is prepared for insertion, by making any connections between them that are to be made in the post-reconfiguration switching network. Thus far, the process matches that performed if one were to upgrade by width with respect to the IRIC networks.

Since both the IRIC and ICIC networks require reconfiguration, one could simply perform a width upgrade, considering the overlaid network as multistage switching networks, with the rows as the stages and the IRIC networks as ISIC networks. Then, perform a stage upgrade, considering the overlaid network as a multistage switching network, with the columns as the stages and the ICIC networks as the ISIC networks. In either order as proscribed, the process set forth for reconfiguring a multistage switching networks. In that regard, the stage upgrade is recommended to be performed first because typically a stage upgrade tends to increase redundancy in the switching network, while a width upgrade tends to decrease redundancy and increase throughput.

Figure 36B:
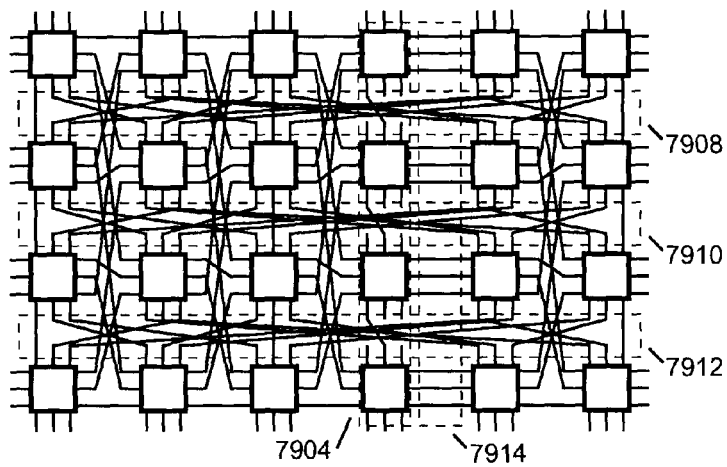

In the example of FIG. 36A, a different tactic is adopted. To increase the overall redundancy of the network, column 7904 is spliced into the network at the location indicated by arrow 7906 in accordance with the splicing step set forth above, resulting in FIG. 36B.

At this point, the general description of the rewiring step set forth above could be broadened. The step for a multistage switching network is to select a port that needs rewiring, break any existing connection, and connect the port to the corresponding port in accordance with the post-reconfiguration switching network, where the specific embodiments break the port selection into organized steps. This description now applies to left ports and right ports in addition to the top ports and bottom ports of a multistage switching network. The example given here first rewires the ICIC networks, selecting the center-most ICIC network 7910 first, and then proceeds outward to the other ICIC networks 7908 and 7912, then the IRIC network 7914. The reason for selecting the ICIC networks first is that some of the switching elements have top and bottom ports that are disconnected. By connecting them properly by rewiring the ICIC networks first, the network increases its redundancy. When such redundancy during the upgrade process is not critical, another order of rewiring can be used.

Figure 36C:
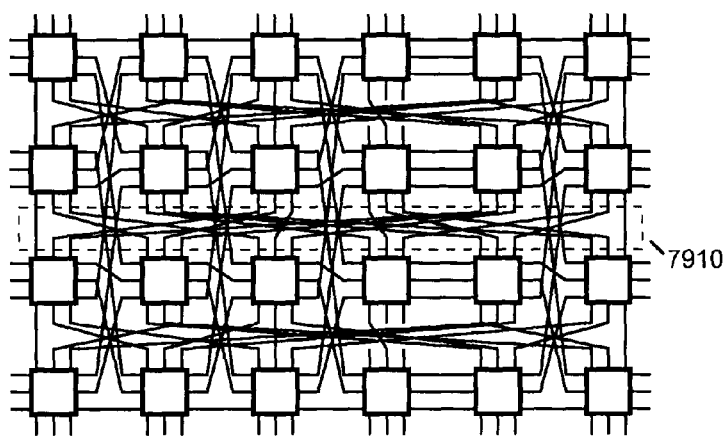
Figure 36D:
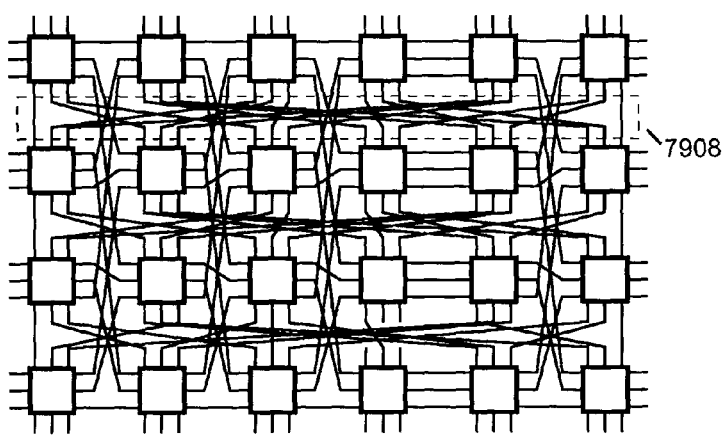
Figure 36E:
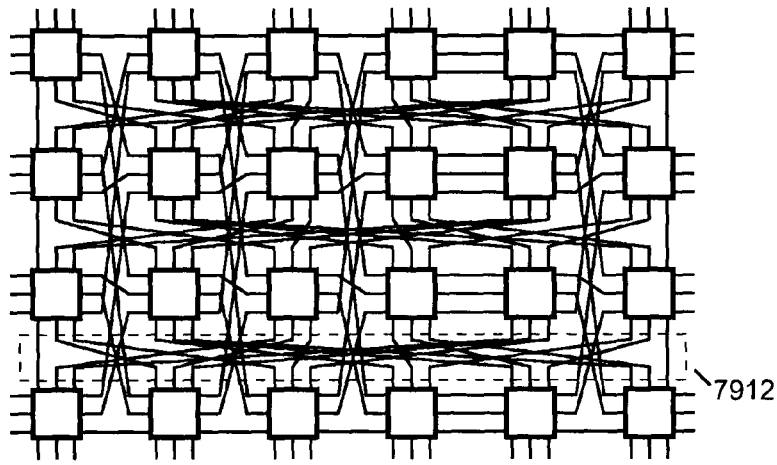
Figure 36F:
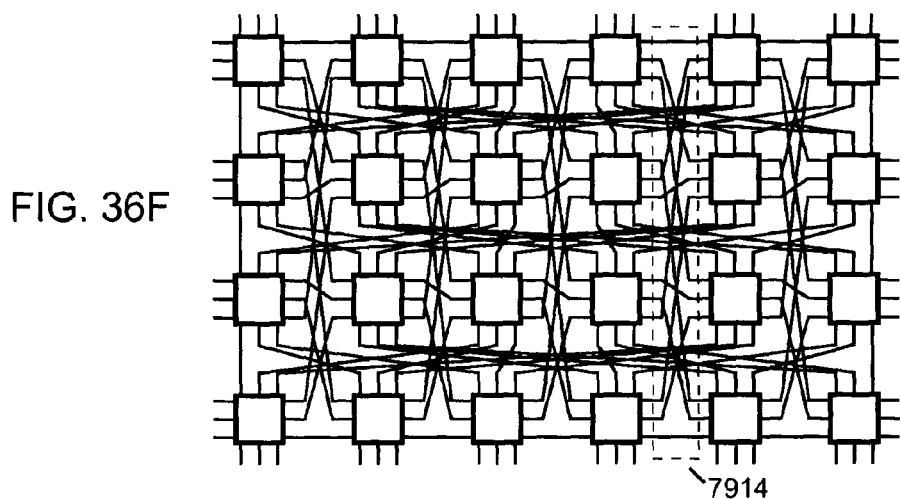

FIG. 36C shows the switching network after ICIC network 7910 is rewired. FIG. 36D shows the switching network after ICIC 7908 is rewired. FIG. 36E shows the switching network after ICIC 7912 is rewired. FIG. 36F shows the switching network after IRIC 7914 is rewired. Connecting and activating the external ports introduced by column 7904 and allowing traffic to flow through them completes the upgrade process.

Figure 37A:
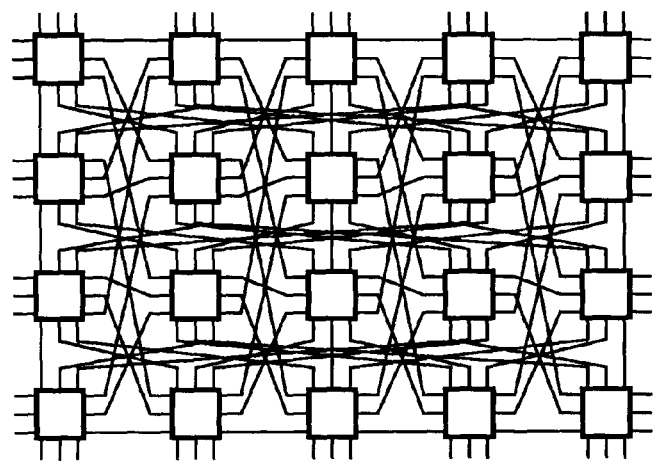
Figure 37E:
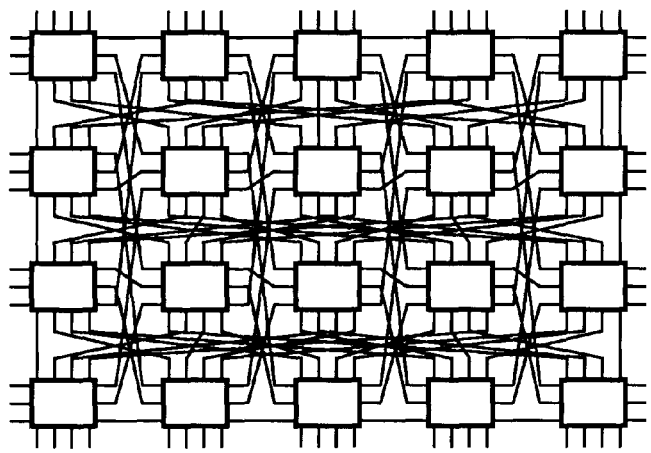
Figure 37F:
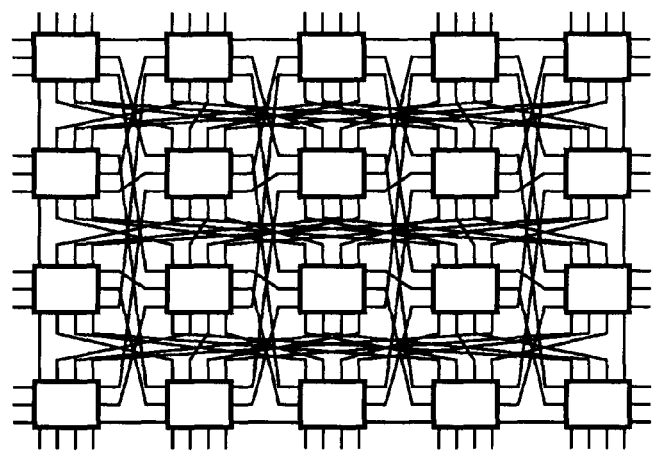

A few additional examples of reconfiguration of overlaid switching networks is given. FIG. 37A shows the same RBCCG network as in FIG. 36A. FIG. 37B shows the addition of new top and bottom ports to each switching element in preparation for a fanout upgrade. FIG. 37C shows the forming of all connections, in accordance with the post-reconfiguration switching network, which can be made without breaking existing connections; specifically the rightmost top and bottom ports of the rightmost switching elements are connected to the adjacent row's switching element. Only the IRIC networks need to be rewired, so the step follows identically the rewiring step as set forth above. For simplicity's sake, the optional relabeling is not performed here. FIG. 37D shows the result of rewiring the IRIC network between row 1 and row 2. FIG. 37E shows the result of rewiring the IRIC network between row 0 and row 1. FIG. 37F shows the result of rewiring the row 2 and row 3. Upon connecting and activating the new external ports introduced by the upgrade so that traffic is allowed to flow through them, the upgrade process is completed. It should be noted that the switching element rows are numbered from the 0 to 3 with row 0 at the top.

Due to the two dimensional layout of the overlaid architecture, it can be desirable to "take the fanout" from one direction and "give it to another." More precisely stated, if an RBCCG network of per switching element fanout $F_1$ is overlaid on an RBCCG network of per switching element fanout $F_2$, this network can be converted without addition of hardware to a network with the same dimensions except with per switching element fanouts of $F_1+1$ and $F_2-1$.

Figure 38A:
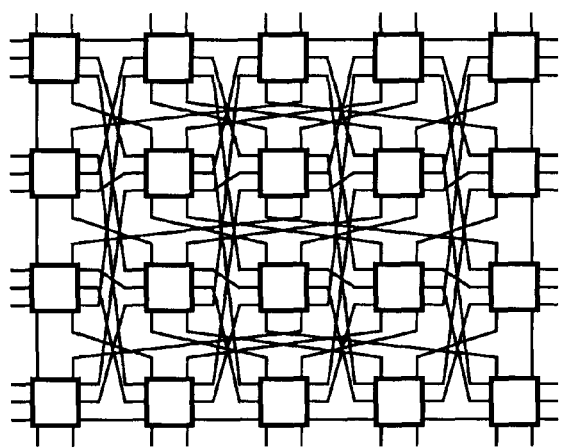
FIG. 38A, FIG. 38B, FIG. 38C, and FIG. 38D show an architectural conversion of the fan-out in one direction to fan-out in the perpendicular direction of an overlaid double RBCCG network.

FIG. 38A shows an overlaid switching network formed from a 5 column 4 row RBCCG network with a fanout of 2, overlaid on a 5 column 4 row RBCCG network with a fanout of 3. The reconfiguration is to convert it to an overlaid switching network formed from a 5 column 4 row RBCCG network with a fanout of 3, overlaid onto a 5 column 4 row RBCCG network with a fanout of 2.

Figure 38B:
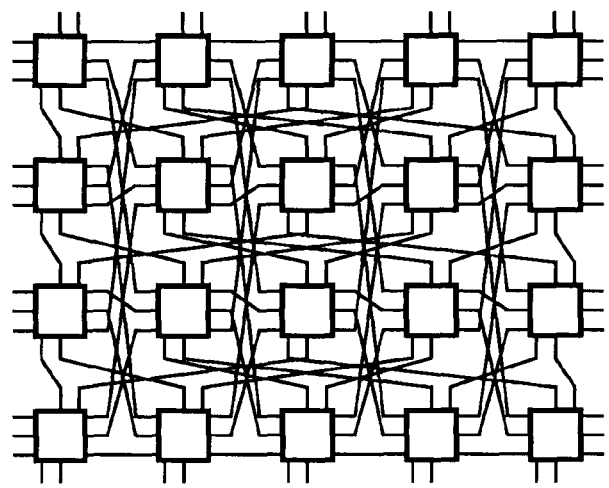
Figure 38C:
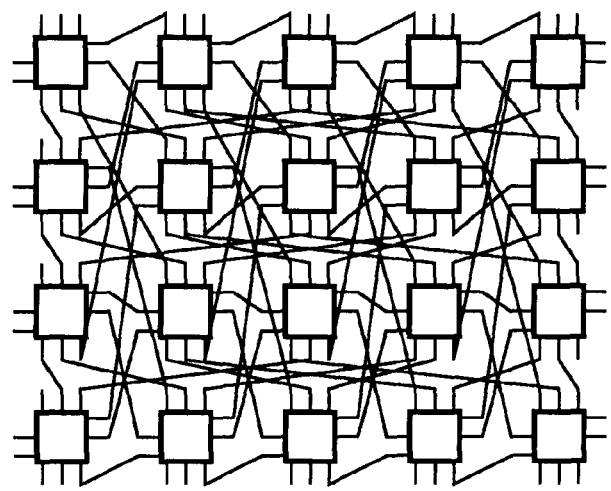
Figure 38D:
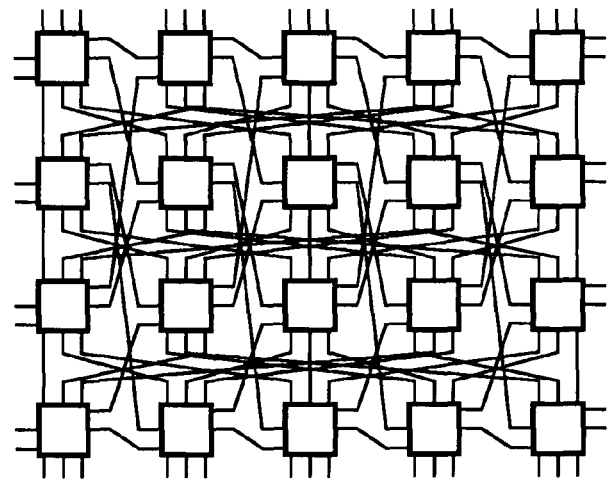

FIG. 38B shows the same switching network shown in FIG. 38A, but drawn a little differently. FIG. 38C shows a left port for each switching element reassigned as a top port, and a right port for each switching element reassigned as a bottom port. Before proceeding to the rewiring step, traffic to ports that were originally external but will cease to be should be shut off, traffic should be diverted from them, and the ports should be disconnected. The rewiring step set forth above can be applied with some modification. Generally, the upgrade procedure comprises the steps of selecting a port not correctly connected to its corresponding port, as defined by the post-reconfiguration architecture, and rewiring it to the corresponding port, breaking any existing connection when necessary. The choice of which port to select depends of various factors. Most commonly, the desire to minimize service disruption takes precedence, so one could select a port which doesn't require the breaking of an existing connection, or, failing that, select a port that is available due to breaking a connection on the previous iteration. The resultant rewired switching network is shown in FIG. 38D. Any former internal ports that have become external ports in this process can become active, wired to external sources, and have traffic flow through them. The scalable switching networks described above can be upgraded in a non-stop manner; however this upgrade must be done in a certain order to minimize the affect on the traffic carrying capacity of the network. Although the systems and methods set forth below are given in terms of an upgrade procedure, it should be understood that these systems and methods can be applied to the general reconfiguration processes described above.

Several methods are described which either facilitate or implement these upgrade procedures. All the techniques below employ common software elements to work effectively. First, the software needs to detect the current architecture, and generate the upgraded target architecture and from that, derive the set of steps required for the non-disruptive upgrade, for example, as derived from the post-reconfiguration architecture.

Second, the software needs to monitor the process of the upgrade procedure. Current software such as OpenView by HP and NetCool performs this functionality using the Simple Network Management Protocol (SNMP) or other supervisory protocols.

Third, the software needs to poll and verify individual connections. One method is to instruct the specific switching element to check the status of a connection associated with a particular port. This check can be done at the physical level by testing to see if there is any light on an optical connection. This can also be done at the protocol level by checking to see if point-to-point protocol (PPP) is running. The switching element can then either report directly back to the software or include the information in a supervisory protocol message. Another method for the software to verify the individual connection is to trace traffic through specific routes in the scalable switching network with a program similar to the UNIX™ traceroute program.

Fourth, as an optional enhancement, the software could further comprise a module which instructs a switching element to divert traffic flow to the line card or port associated with the connection to be broken, and to terminate the traffic flow from the line card or port associated with the connection to be broken. Similarly, it can instruct a switching element to resume traffic flow to and from a line card or port associated with a connection to be established. Though not necessary, this would further limit disruption to the service during the upgrade process.

Using the software described above, one could monitor the progress of an upgrade, as well as receive instructions for what connection to move. For instance, a technician running the software could be instructed to disconnect port 1 on switching element 5, and reconnect that fiber to vacant port 2 on switching element 3. Then the software can check to see if that connection was properly made, and indicate that to the technician.

Figure 39:
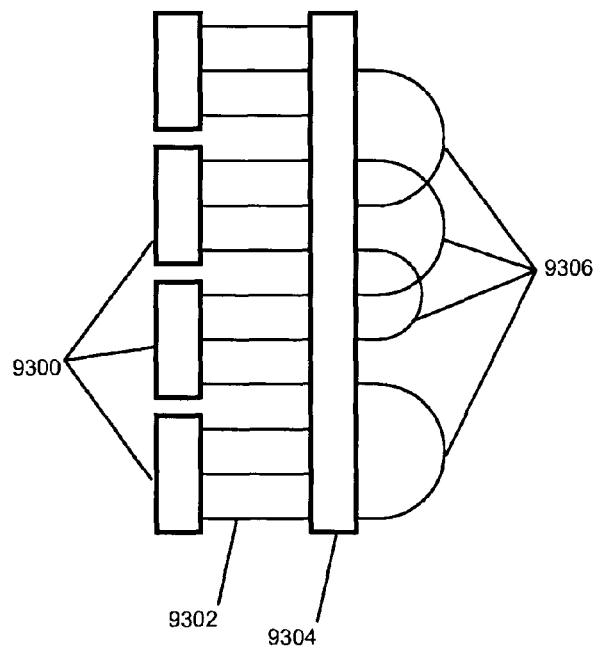
FIG. 39 shows a practical implementation of scalable switching network whereby switching elements are connected to a patch panel and the connections are completed through a series of jumper cables.

FIG. 39 shows a physical implementation of a scalable switching network. The switching elements 9300 are connected via some cables (most likely optical fiber) 9302 to a patch panel 9304. The patch panel is connected to a series of (optical fiber) jumpers 9306. These jumpers are connected back to the patch panel. For one switching element to connect to another switching element, it must connect through a cable to the patch panel, then through a jumper back to the patch panel, and finally through another cable to the second switching element. Clearly, in such a scheme, one need only change the jumpers to rewire the connections between the switching elements.

Figure 40:
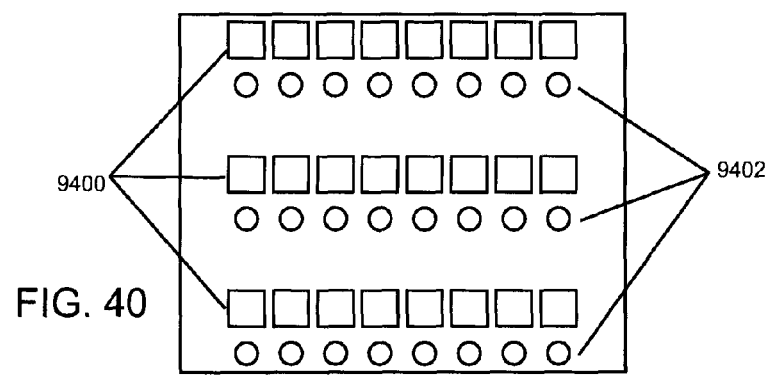
FIG. 40 shows a typical patch panel augmented by indicator lights.

FIG. 40 shows a schematic of a patch panel. The patch panel comprises connectors to the switching elements (not shown) in the rear, connectors 9400 for the jumpers in front, and indicator lights 9402. These lights are connected to some kind of central driver which can be addressed by a computer. Each connector 9400 has a light associated with it. Such a patch panel is commercially available from vendors such as Siemens.

The software described above can further comprise a module, which can drive these lights which serves as a guide to instruct the technician which connection to move during the upgrade process. Some convention should be established in order to instruct the technician of the actions. This can be accomplished if the lights have colors, or by varying the lighting states of the light such as a steady light, a fast blinking light, and a slow blinking light. If colors are available, additional states can be created by alternating colors in a blinking mode. An indication convention should be established to indicate a "disconnect me," "connect me" and "error in connection."

The technician can be directed through the upgrade or reconfiguration through the process described in FIG. 42. The order of operation can be determined by a computer configured to operate the process in FIG. 42. For example, the connection to be manipulated in the step "determine next connection to be established" can be determined by a computer with the pre-reconfiguration architecture and post-reconfiguration architecture programmed. From those two switching networks and the current state of the present switching network, the computer can determine based on the reconfiguration process set forth above, the next connection to be established. Furthermore, this computer can be in communication with the switching network and can monitor whether the correct connection is made. In one embodiment, the computer can back a technician out of an erroneous connection being established or broken.

In a typical operation of an embodiment of this method, a technician invokes the software application described and then proceeds to the patch panel. An indicator light instructs him to make a connection or to disconnect a port. Once each step is successfully completed, he can receive acknowledgment that the step was successfully undertaken. After the entire upgrade is complete, there could be a convention indicating all is successful, such as all the lights on all ports blinking for 10 seconds.

In the previous embodiment of upgrade assistance, the technician performs a rather mechanical operation. Due to the length and perhaps tedium of such an procedure, it can be desirable to replace the technician in the procedure with a robot.

Without going into any extreme detail in robotics, a robotic arm could be attached to each patch panel and be controlled by the same central software which was guiding the technician in the previous embodiment. So rather than indicating to the technician which connection to make or break, a robotic arm is instructed which changes to make. There should also be a location on the patch panel to store "spare" jumpers. In that during some of the upgrade process, completely new connections are made or old connections are completely broken.

The robotic technology to implement this has been around for over twenty years, dating back to graphic plotters by Hewlett-Packard that would grab different colored ink pens and manipulate them to certain locations on a plotting package. Such a device has the essential ingredients to perform the upgrade. This type of robotic arm may encounter problems arising from interference with the other jumper cables. However, modern robotics has evolved much further and modern robotics used in mass production manufacturing has devices which can deal with this.

Though the robotic method of the preceding can eliminate much of the human error that can occur in the upgrade process, mechanical processes such as robotics are prone to breakdown, compared to a purely solid state processes. The embodiments described below employ addressable latching switches to perform upgrade processes.

Figure 41:
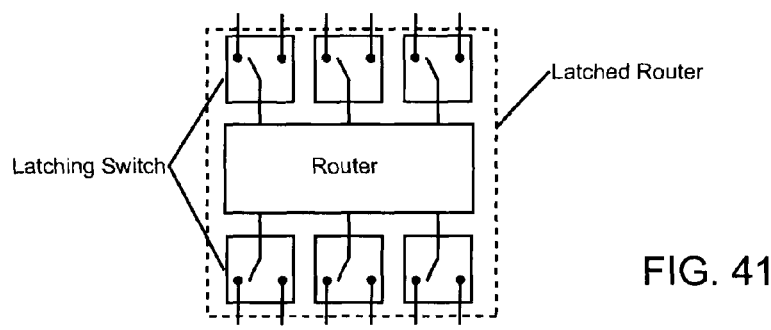
FIG. 41 shows a switching element with latching switches attached to the ports and alternatively shows an embodiment of a "latched router;"

In the first embodiment, the network comprises switching elements for which each port is augmented with a latching switch. For example, FIG. 41 depicts a router comprising latching switches coupled to each port. In alternative embodiments of this enhancement, the latching switch could be built into the router's line cards and addressable by the router, or the latching switch could be appended to the router ports and addressable through a connection directly to the latching switch. The router depicted can be any router or more generally any of the switching elements described. The latching switch can be directed into its switching states by a signal. In this particular embodiment, the latching switch is a single pole double throw switch and can be set to one of two states, referred to as the first state and the second state. Each state directs traffic to one of two ports. It is also desirable, for error checking purposes, for the latching switches to be pollable, that is, with a proper communications module in the software, the current state of a switch is obtainable.

During normal operations, only the first set of ports of the latching switches are connected to the other first set of ports of latching switches corresponding to other routers in such a fashion as to implemented the interconnection networks of the scalable switching architectures described. Though not required, these connections could be implement through the use of a patch panel as described above. During this normal operation, the second set of ports on all the latching switches are all idle and need not have any connections to them.

During the upgrade process, the first step is to wire the second set of ports on the latching switches to the other second set of ports on other routers in the manner of the interconnection network to be upgraded to. Connections can then be broken and established in accordance with the upgrade procedures under the control of the software described above.

Figure 43A:
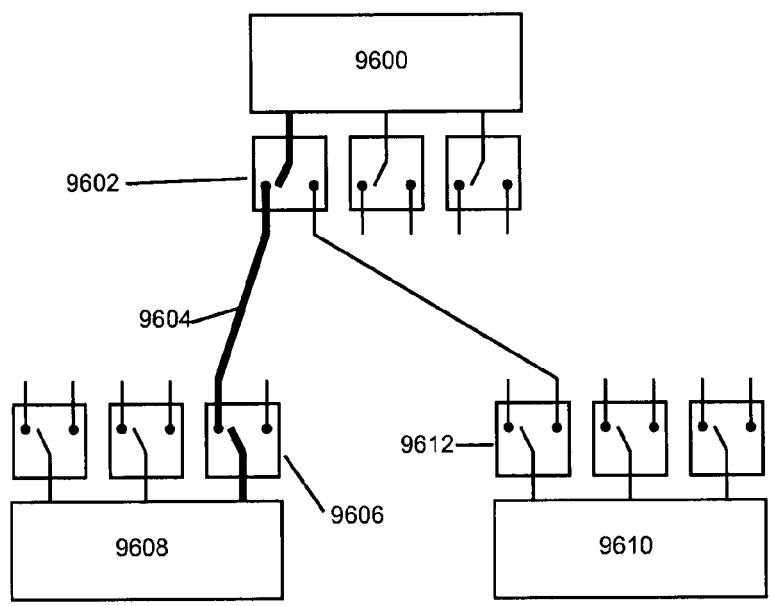
FIG. 43A and FIG. 43B show how latching switches are used to redirect traffic.
Figure 43B:
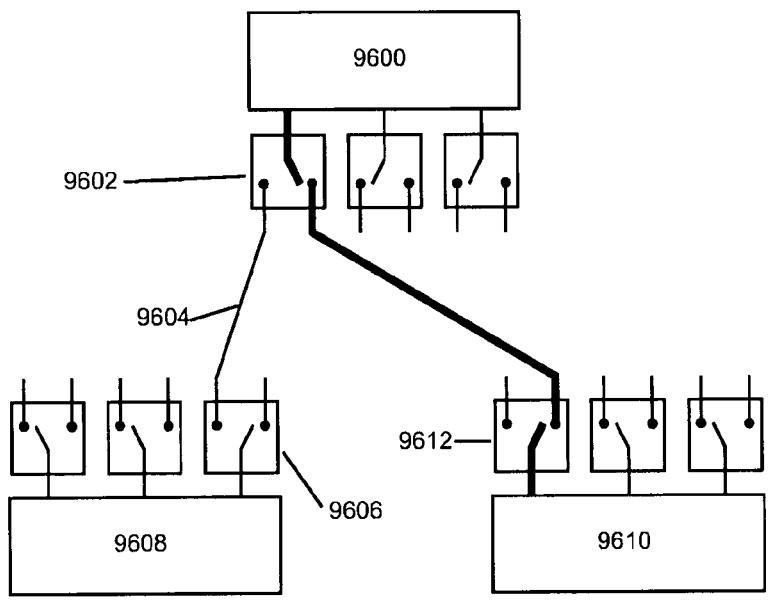

FIG. 43A depicts a pre-upgrade picture where router 9600 is connected through a latching switch 9602, through a connection 9604, to another latching switch 9606 to router 9608. Supposed during the upgrade process router 9600 should be connected to router 9610, then the second ports on latching switch 9602 and 9612 should be connected. When it is necessary to make the make this connection change, latching switch 9602 is thrown to break connection 9604 and latching switch 9612 is thrown to establish the new connection. It should be noted that now the port connected to latching switch 9606 is now broken as a result, but is presumably repaired later in the upgrade process. FIG. 43B depicts an post-upgrade picture when router 9600 is connected to 9610.

After the upgrade process is complete, the interconnections now operate through the second set of ports for each latching switch. Upon the next upgrade, the new network can be wired to the first set of ports for each latching switch.

Figure 44:
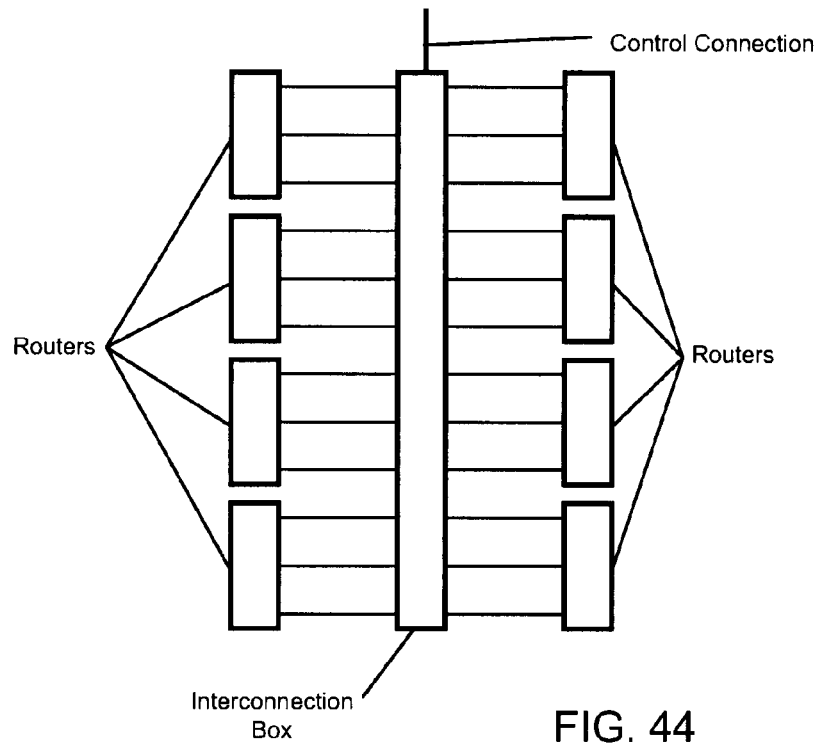
FIG. 44 shows a practical implementation of a scalable switching network whereby switching elements are connected through to an interconnection box.

Another embodiment uses a prepackaged interconnection box. FIG. 44 depicts the overall architecture of this switching network, where routers are all connected to the prepackaged interconnection box. If a router is to communicate with another it must pass into the interconnection box. In this particular design, the need for a patch panel is eliminated, although for practical purpose the connection from the routers through to the interconnection box can pass through a patch panel to simplify the physical layout of the devices.

Figure 45:
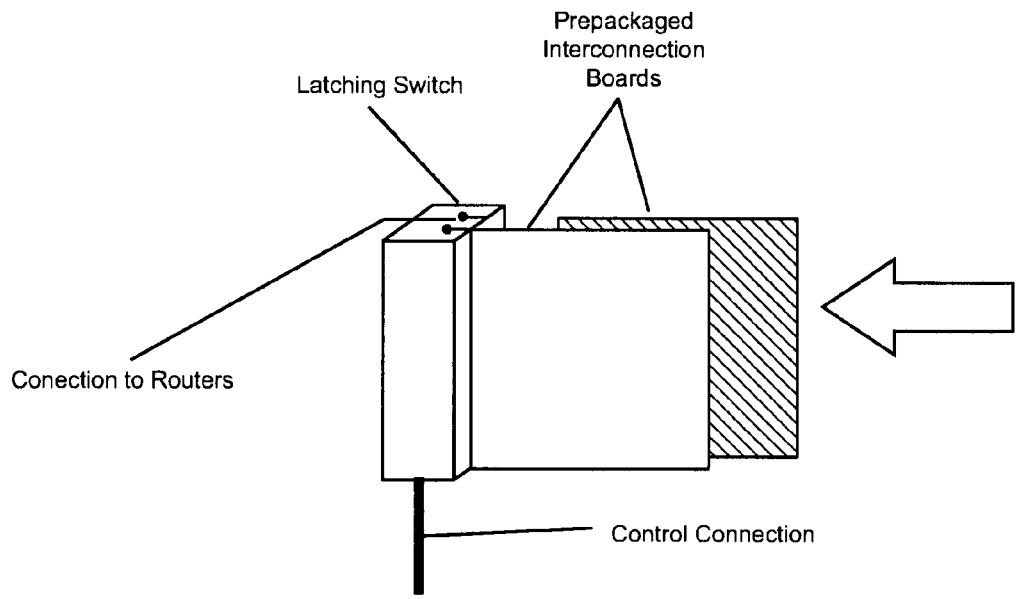
FIG. 45 shows a schematic of an interconnection box, which is designed to have prepackaged interconnection boards to facilitate the upgrade process.

FIG. 45 shows a diagram of the prepackaged interconnection box. It comprises external ports to switching elements, latching switches, internal connectors, and prepackaged interconnections on printed circuit boards. In addition, the latching switches are connected to a communications port so that maintenance and upgrade software can query and manipulate the latching switches. Each external port is connected to a latching switch. The internal connectors are divided into two sets; each set is designed to interface with one interconnection board. Each latching switch is connected to two internal connectors, one in each of the two sets described above.

In operation, the interconnection boards can be inserted into the interconnection box. Current practice is to have slots for the boards to be inserted. Locking safeguards can be implemented to ensure an interconnection board cannot be removed while the system is running During normal operation, traffic would travel from one switching element to the interconnection box; depending on the current state, it would then traverse one set of connectors to an interconnection board, and back from the interconnection board through the same set of connectors out to another switching element.

During the upgrade process, a second interconnection board representing the upgraded interconnection pattern, which can be an ISIC network for a given post-reconfiguration architecture, is inserted into the inactive slot in the interconnection box. At this point, switching elements are connected through latching switches to a current and upgraded interconnection pattern, so the software triggered switching of the latches switches can proceed in the same manner as the above embodiment. After the upgrade process is complete, the original interconnection board can be removed.

Using the interconnection box, to the technician performing the upgrade, the process should appear as follows: The software is invoked. A second interconnection board is inserted into the interconnection box. The technician can trigger the upgrade process or the board insertion could trigger the upgrade process, at which the software redirects traffic, according to the upgrade steps generated one connection at a time, to the second interconnection board. Upon completion, the technician is notified that the process is complete, and the first interconnection board can be removed.

Figure 46:
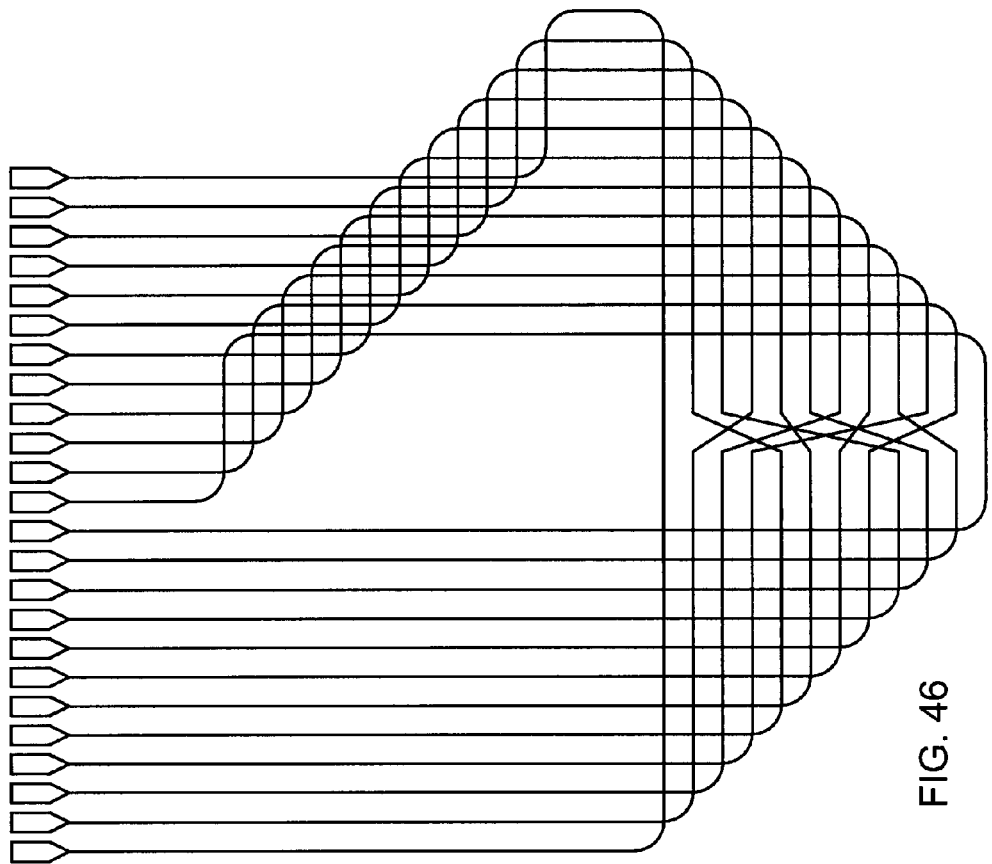
FIG. 46 shows an embodiment of an interconnection board.

FIG. 46 shows a sample embodiment of an interconnection board implemented in optical fiber. Often, optical fiber has restrictions on the turning radii allowed before significant loss of signal occurs. Each fiber is coupled to a pair of connectors by which the interconnection board can be coupled to the interconnection box.

Though the preceding embodiments are directed towards the use of high-speed routers with optical interconnections, latching switches are also available for high speed electronic connections and interconnection boards implemented as simple printed circuit boards are also readily available. Both the preceding embodiments can also be implemented as electronic devices as well as optical.

Latching switches are described above so that no power is required in the first embodiment or in the interconnection box except during the process of upgrading. This also ensures stability during a power outage of the interconnection box. Though latching switches are described for both embodiments, powered switches, that is, switches that require power to maintain a second switching state, can be employed instead. It is far more cumbersome, but in both embodiments the use of powered switches can be substituted by first assembling an identical interconnection pattern connected to the second port on the switches. After the identical interconnection pattern is connected, each connection is transitioned over to the second set of interconnections by a powered switch. Once all the traffic is diverted to the redundant interconnection network, the first set of interconnections is reconfigured to the new upgrade pattern. From this point, the upgrade process is applied in the same manner as described above with the finished architecture wired through the first set of interconnections, at which point, no power need be applied to the switches.

Figure 47:
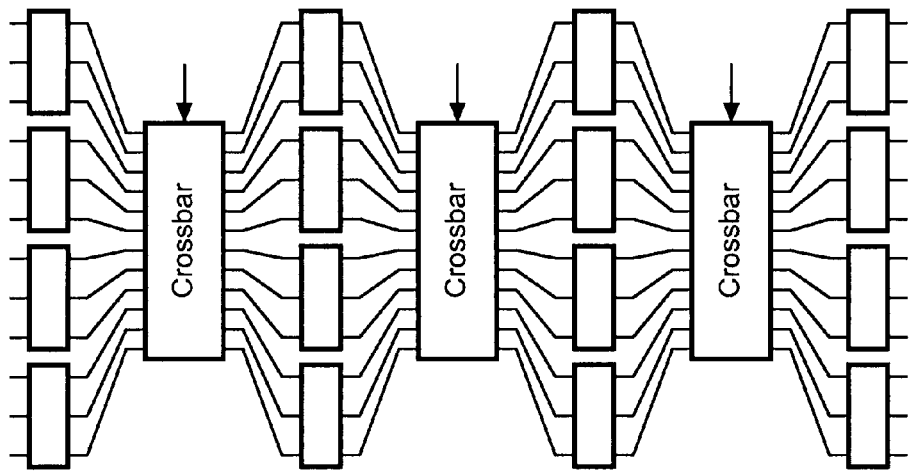
FIG. 47 shows an embodiment of electronically controlled interconnections using an optical crossbar.

As previously discussed, the scalable switching network can be upgraded by controlling and monitoring single pole double throw switches associated with the internal switching element ports. The upgrade procedure can also be accomplished by electronically controlled optical crossbars as shown in FIG. 47. All the bottom ports associated with a particular stage of the scalable switching network can be connected to the inputs of an optical crossbar. All the top ports associated with the subsequent stage of the scalable switching network can be connected to the outputs of the optical crossbar. The electronically controlled optical crossbar can thus connect any bottom port associated with a particular stage of the scalable switching network with any top port associated with the subsequent stage of the scalable switching network. This electronically controlled optical crossbar can be controlled by the same algorithm used to control the patch panel in FIG. 40.

Figure 61:
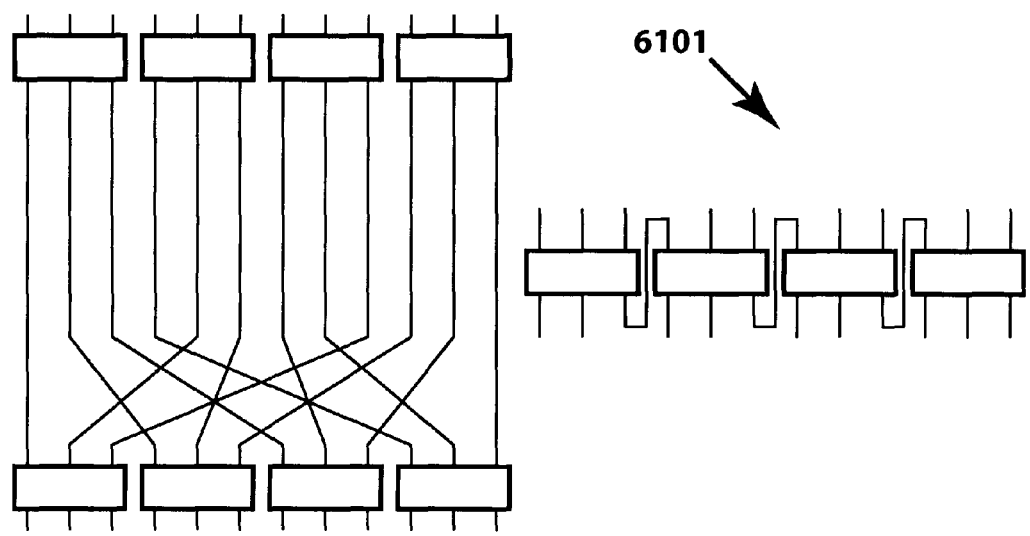
FIG. 61 shows an embodiment of the splicing operation using an unconventional pre-connections.

Returning to the various algorithms for upgrading a scalable switching network, additional redundancy can be enhanced by making additional connections in new hardware as described in U.S. patent application Ser. No. 11/141,789, entitled "Method of adding stages to a scalable switching network," filed on May 31, 2005, which is incorporated herein by reference in its entirety as if set forth in full. For example, during the pre-connection step, additional connections can be made that do not conform to the post-configuration topology. In particular, even when upgrading a multistage interconnection network, temporary connections in the new hardware can be provided in violation of the multistage interconnection network topology. Routing is maintained through dynamic routing tables or equivalent. For example, FIG. 61 shows a row insertion upgrade where the inserted new row 6101 has some top ports connected to some bottom ports of the new row violating the multistage interconnection network topology. However, while in the upgrade process these connections provide extra path redundancy.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

What is claimed:

1. A switching network comprising:
    an array of switching elements, said array of switching elements comprising R rows and C columns, wherein each switching element belongs to a row and a column;
    a first plurality of interconnection networks wherein each interconnection network in the first plurality of interconnection networks connects switching elements in adjacent rows belonging to the array of switching elements and each interconnection network in the first plurality of interconnection networks has a topology matching a topology of an interstage interconnection network within a first multistage interconnection network architecture; and
    a second plurality of interconnection networks wherein each interconnection network in the second plurality of interconnection networks connects switching elements in adjacent columns belonging to the array of switching elements and each interconnection network in the second plurality of interconnection networks has a topology matching a topology of an interstage interconnection network within a second multistage interconnection network architecture,
    wherein R and C are positive integers and the first plurality of interconnection networks and the second plurality of interconnection networks route traffic through the switching network to reduce overall latency.

2. The switching network of claim 1, wherein the first multistage interconnection network architecture is a redundant blocking compensated cyclic group (RBCCG) multistage network.

3. The switching network of claim 1, wherein the second multistage interconnection network architecture is an RBCCG multistage network.

4. The switching network of claim 1, wherein each switching element comprises a left port, a right port, a top port and bottom port wherein each interconnection network in the first plurality of interconnection networks connects top ports comprising the top port of switching elements of a first row to bottom ports comprising the bottom ports of switching elements in a second row, where the first row and second row are adjacent, wherein each interconnection network in the first plurality of interconnection networks connects right ports comprising the right port of switching elements of a first column to left ports comprising left ports of the switching elements in a second column, where the first and second column are adjacent.

5. A method of routing traffic between a first switching element and a destination switching element said method comprising:
    receiving traffic by the first switching element of a RBCCG network which is located at row number k and column number s of the RBCCG network;
    determining a column number d of the destination switching element of RBCCG network which is connected to an external port;
    calculating a port number p of the destination switching element of the RBCCG network; and
    forwarding the traffic to the port number p of the destination switching element,
    wherein p equals an integer quotient of $((d-sF^{H-k}) \mod W+iW)$ divided by $F^{H-k-1}$ and $0 \leq p < F$,
    i is greater than equal to zero and less that F,
    the RBCCG network has a number of rows of W switching elements with H+1 equal to the number of rows;
    each switching element of the RBCCG network has a fanout with F equal to the fanout;
    and k, s, d are non-negative integers and F, W and H are positive integers.

6. The method of claim 5, wherein calculating comprises:
    selecting a value for i;
    determining the integer quotient of $((d-sF^{H-k}) \mod W+iW)$ divided by $F^{H-k-1}$;
    repeating the selecting and determining steps until the integer quotient is less than F;
    assigning the integer quotient top if the integer quotient is less than F.

* * * * *